(12) United States Patent
Konegawa et al.

(10) Patent No.: US 11,016,244 B2
(45) Date of Patent: May 25, 2021

(54) OPTICAL WAVEGUIDE MEMBER CONNECTOR KIT, OPTICAL WAVEGUIDE MEMBER CONNECTOR, AND PRODUCING METHOD THEREOF

(71) Applicant: NITTO DENKO CORPORATION, Osaka (JP)

(72) Inventors: Naoto Konegawa, Osaka (JP); Yuichi Tsujita, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 47 days.

(21) Appl. No.: 16/492,366

(22) PCT Filed: Mar. 29, 2018

(86) PCT No.: PCT/JP2018/013292
§ 371 (c)(1),
(2) Date: Sep. 9, 2019

(87) PCT Pub. No.: WO2018/181729
PCT Pub. Date: Oct. 4, 2018

(65) Prior Publication Data
US 2021/0033786 A1    Feb. 4, 2021

(30) Foreign Application Priority Data

Mar. 31, 2017   (JP) .............................. JP2017-070935
Mar. 29, 2018   (JP) .............................. JP2018-063651

(51) Int. Cl.
G02B 6/122    (2006.01)
G02B 6/13     (2006.01)

(52) U.S. Cl.
CPC .............. *G02B 6/122* (2013.01); *G02B 6/13* (2013.01)

(58) Field of Classification Search
CPC . G02B 6/10; G02B 6/13; G02B 6/122; G02B 6/3676; G02B 6/3855;
(Continued)

(56) References Cited

U.S. PATENT DOCUMENTS

| 2010/0067852 A1 | 3/2010 | Dangel et al. |
| 2016/0238799 A1 | 8/2016 | Fujiwara et al. |
| 2016/0320570 A1 | 11/2016 | Watanabe et al. |

FOREIGN PATENT DOCUMENTS

| JP | 04-52605   | * | 2/1992 |
| JP | 04-052605 A |   | 2/1992 |

(Continued)

OTHER PUBLICATIONS

International Preliminary Report on Patentability issued by WIPO dated Oct. 1, 2019, in connection with International Patent Application No. PCT/JP2018/013292.

(Continued)

*Primary Examiner* — Michael P Mooney
(74) *Attorney, Agent, or Firm* — Edwards Neils LLC; Jean C. Edwards, Esq.

(57) ABSTRACT

An optical waveguide member connector kit includes an optical waveguide member including an optical waveguide and a connector having an accommodation space that is capable of accommodating the optical waveguide member. When the optical waveguide member is accommodated in the accommodation space, the connector has an opening portion reaching the optical waveguide member from the outside of the connector and when the optical waveguide member is accommodated in the accommodation space, at least one of the optical waveguide member and the connector includes a groove communicating with the opening portion facing at least the other side of the optical waveguide member and the connector.

6 Claims, 28 Drawing Sheets

(58) Field of Classification Search
CPC .. G02B 6/3826; G02B 6/3834; G02B 6/3847; G02B 6/3853; G02B 6/3861; G02B 6/3883; G02B 6/3885
USPC .............................. 385/14, 78–87, 129–132
See application file for complete search history.

(56) References Cited

FOREIGN PATENT DOCUMENTS

| | | |
|---|---|---|
| JP | 11-316319 A | 11/1999 |
| JP | 2011-048157 A | 3/2011 |
| JP | 2016-212148 A | 12/2016 |
| WO | 2015/052850 A1 | 4/2015 |

OTHER PUBLICATIONS

International Search Report Issued in PCT/JP2018/013292 dated Jun. 5, 2018.
Written Opinion Issued in PCT/JP2018/013292 dated Jun. 5, 2018.
Office Action, issued by the State Intellectual Property Office of China dated Dec. 22, 2020, in connection with Chinese Patent Application No. 201880023131.8.

\* cited by examiner

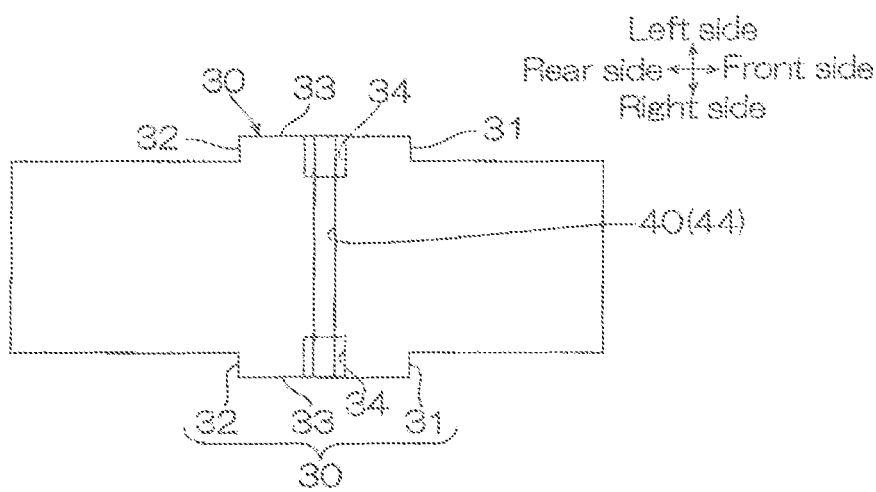
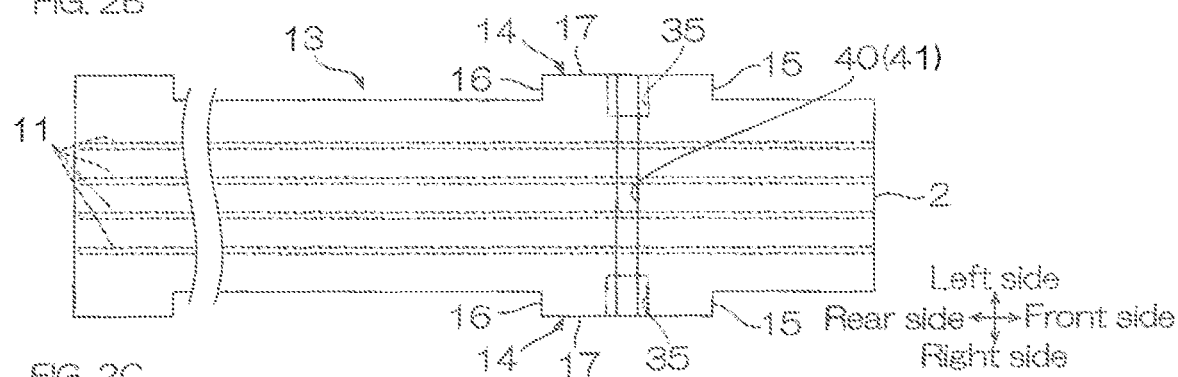
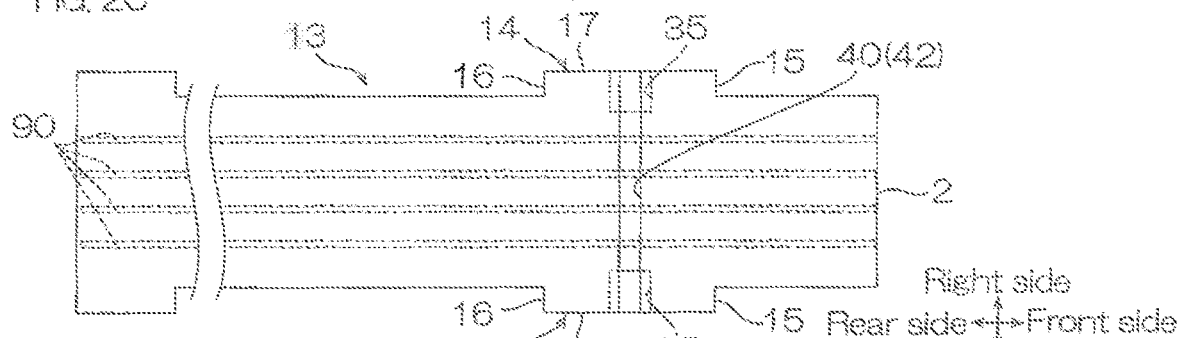
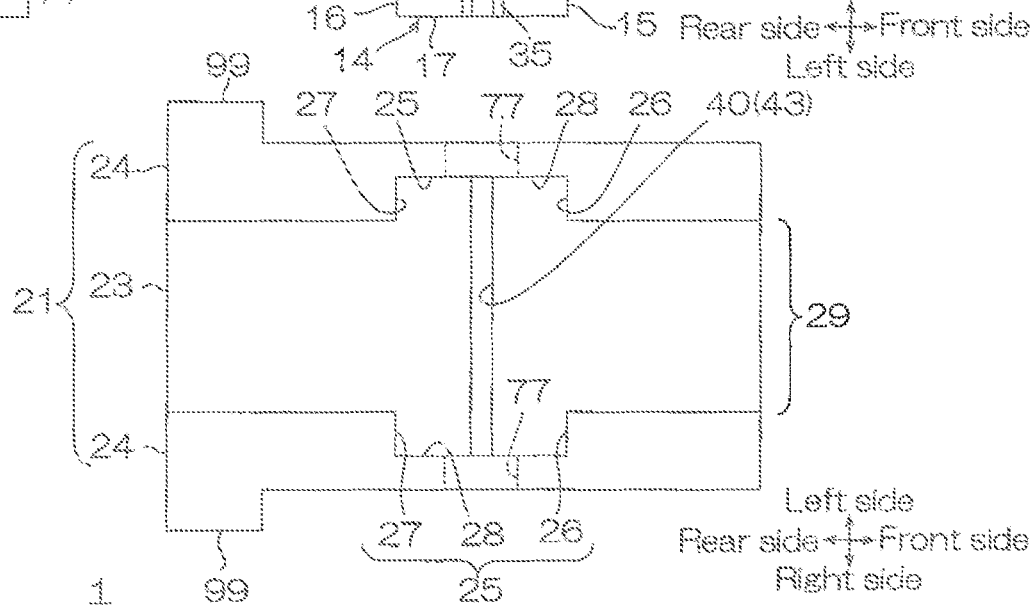

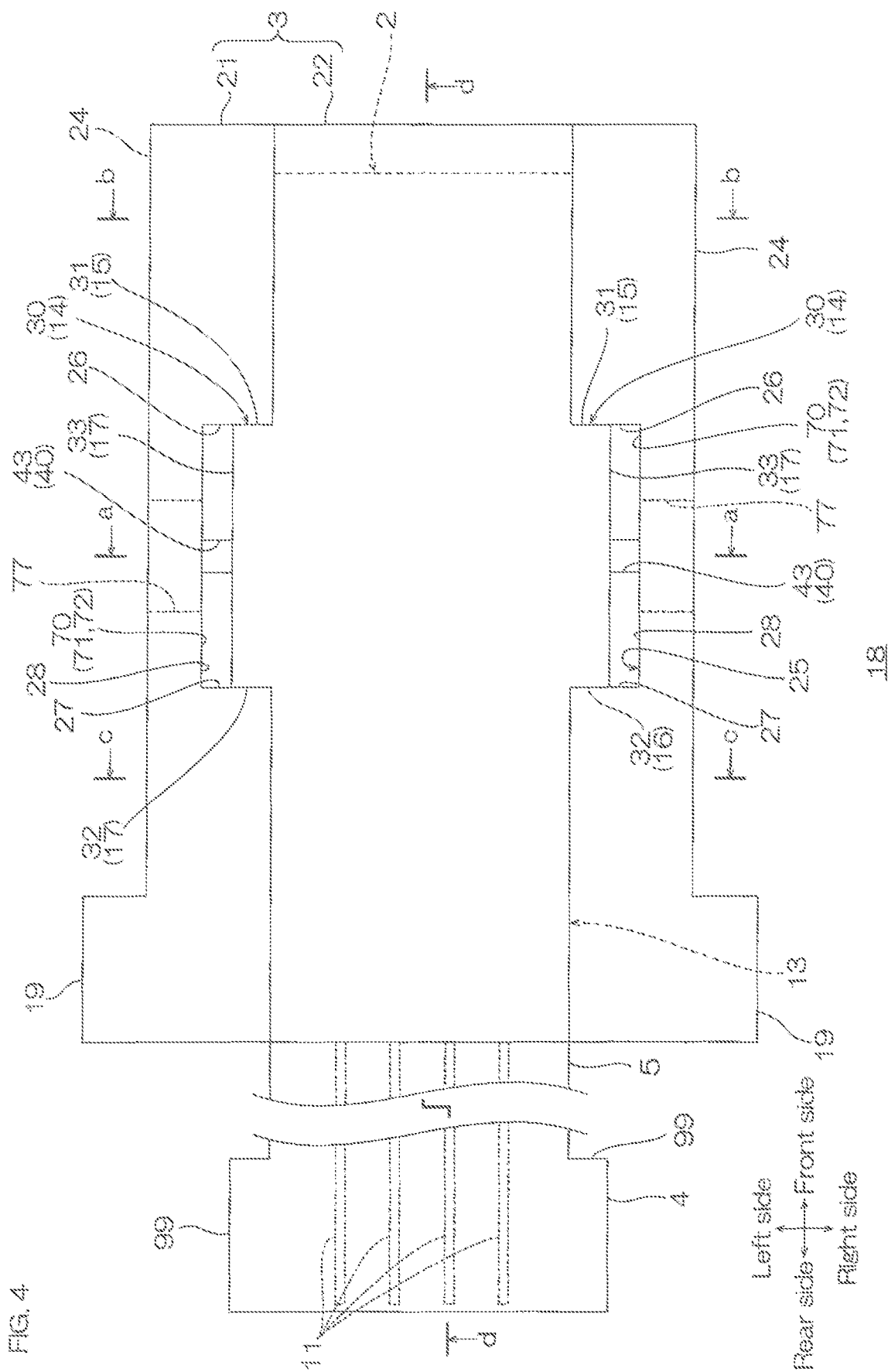

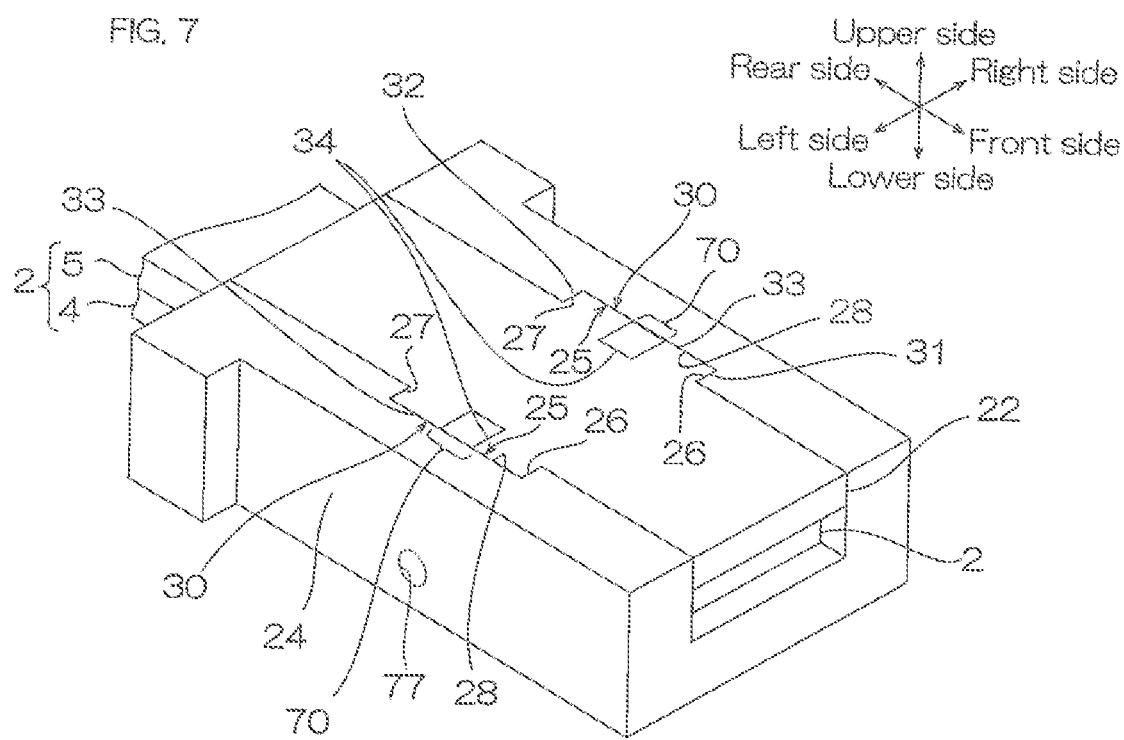

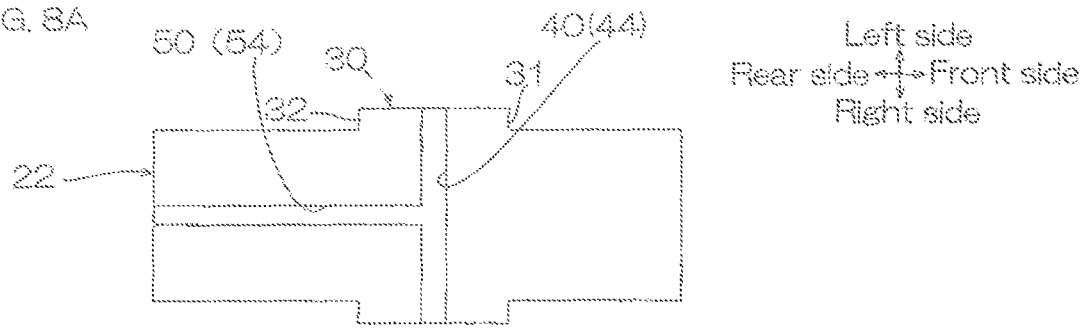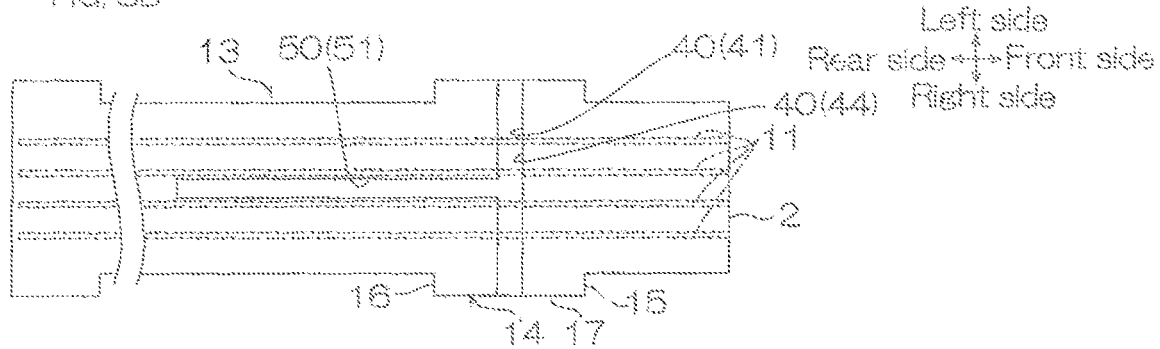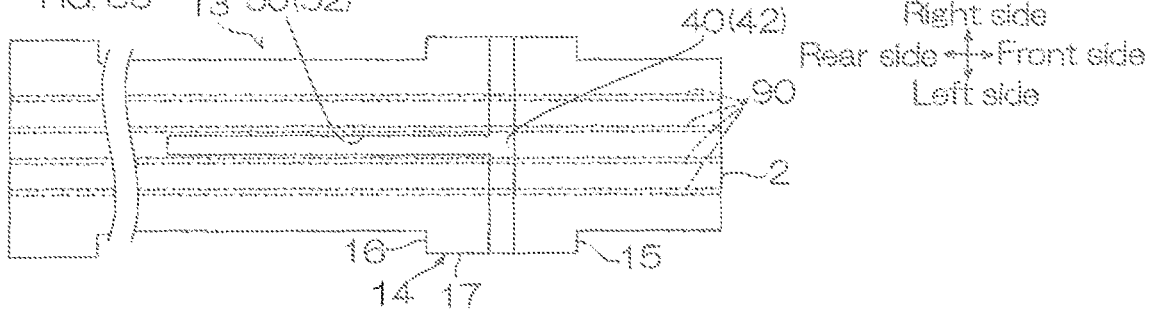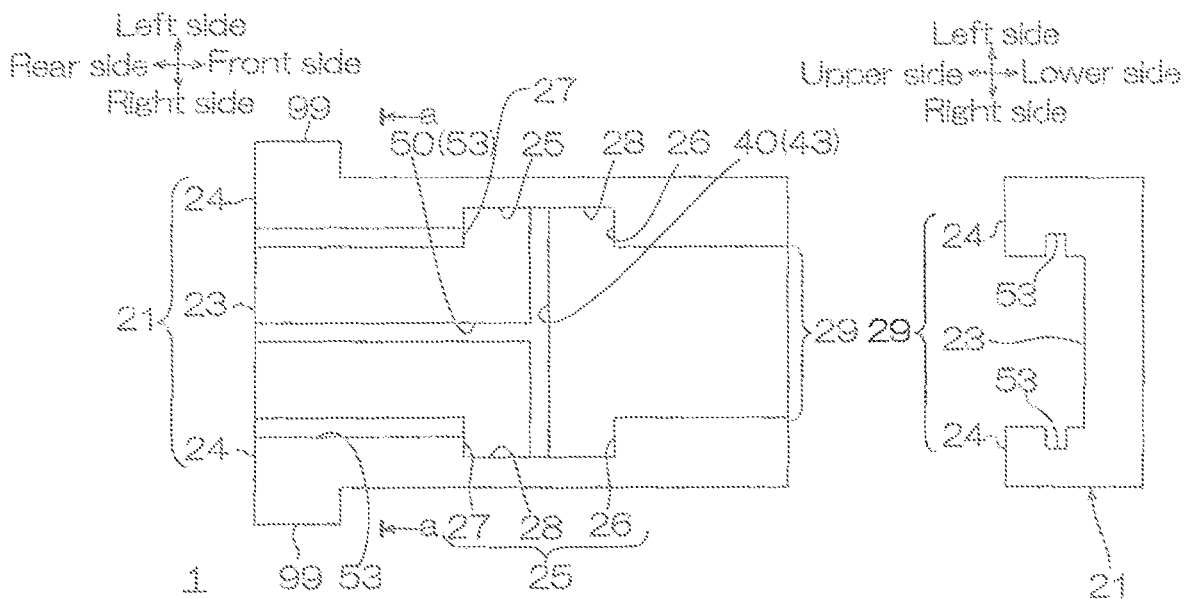

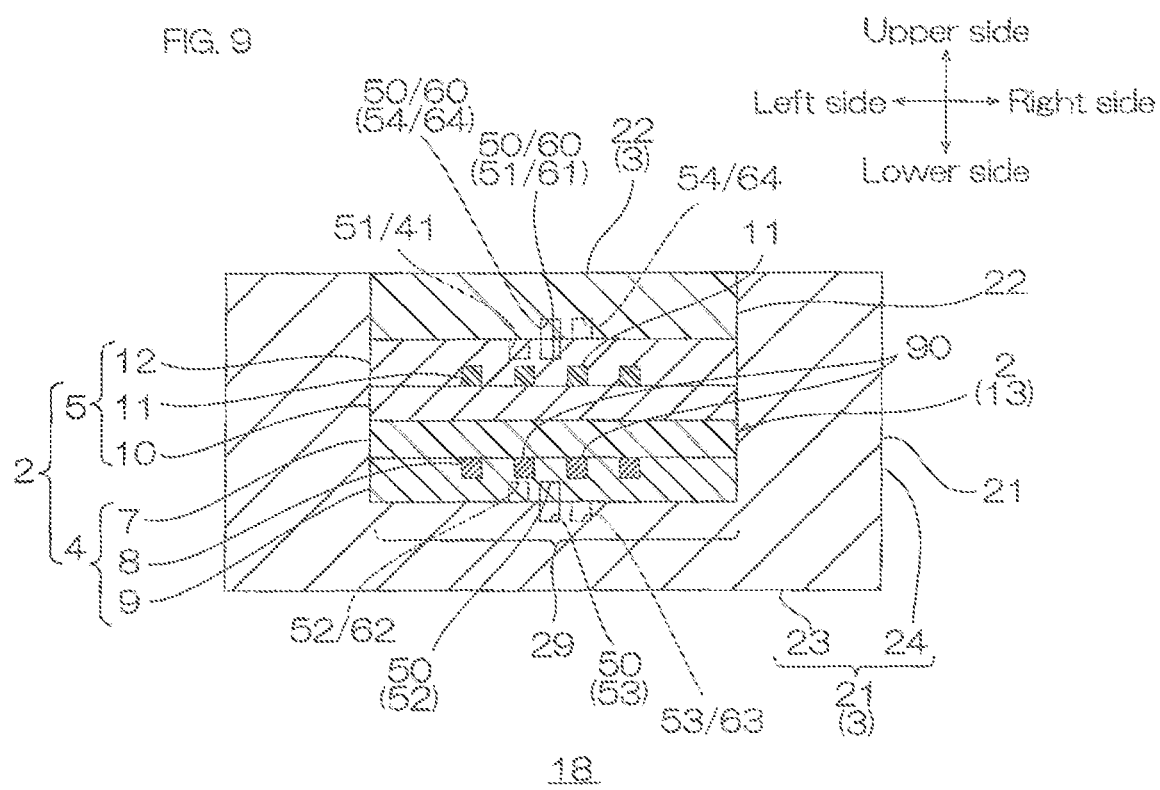

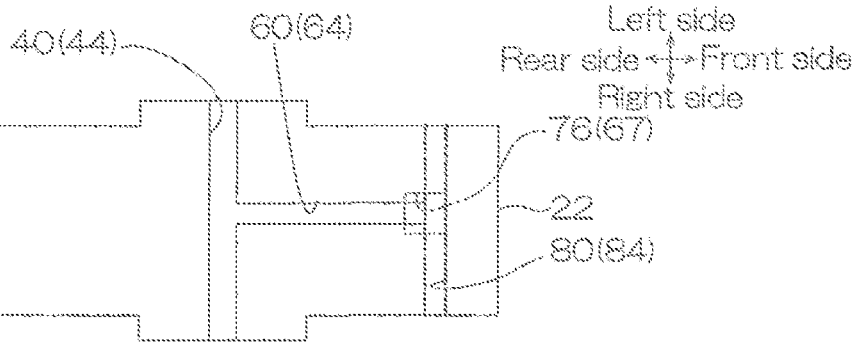
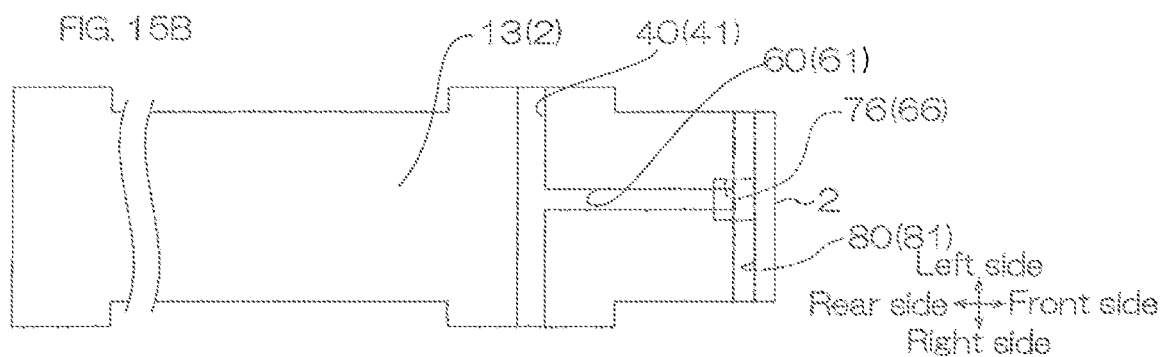
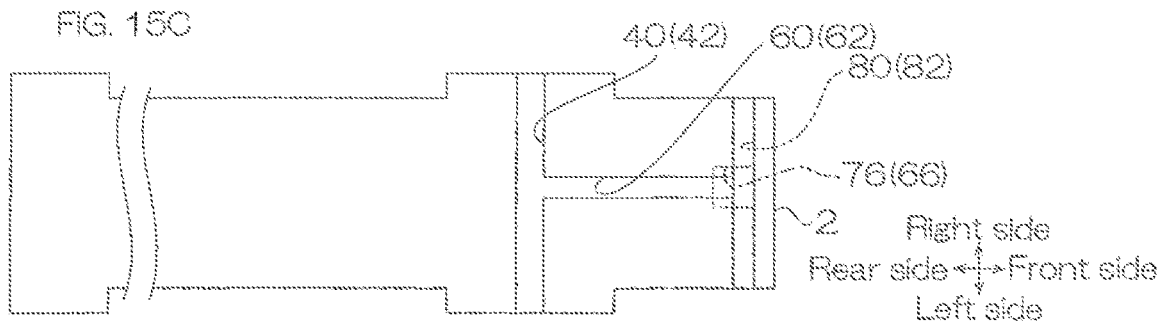
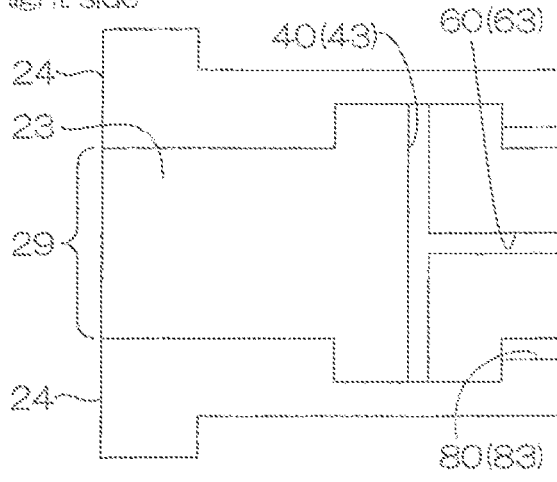
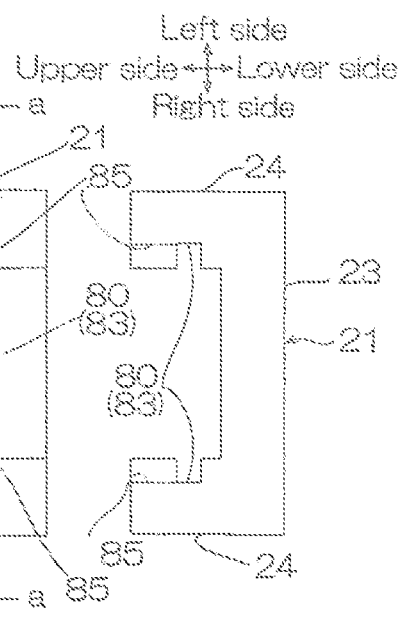

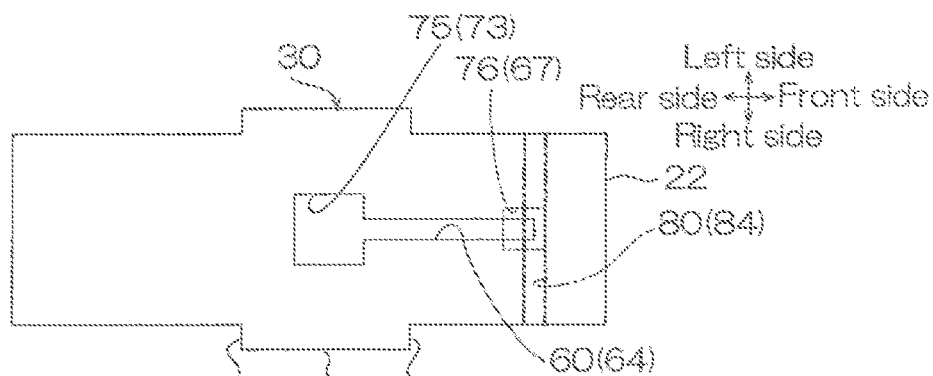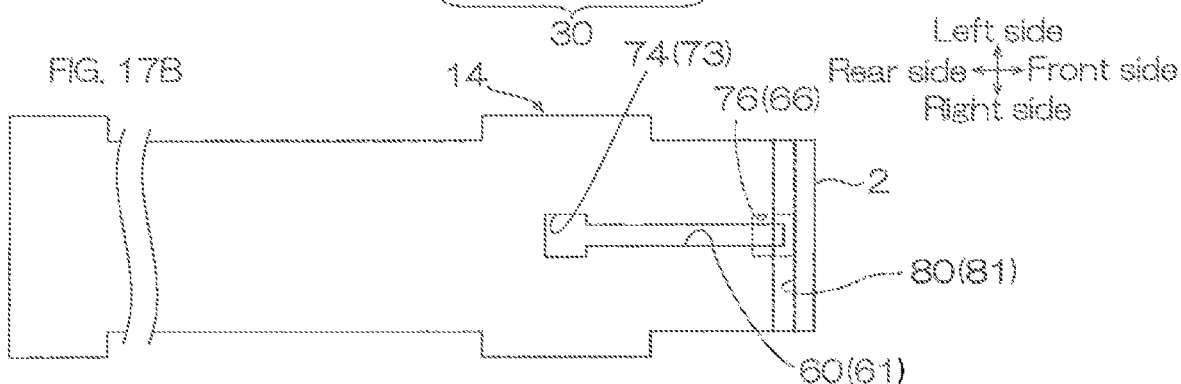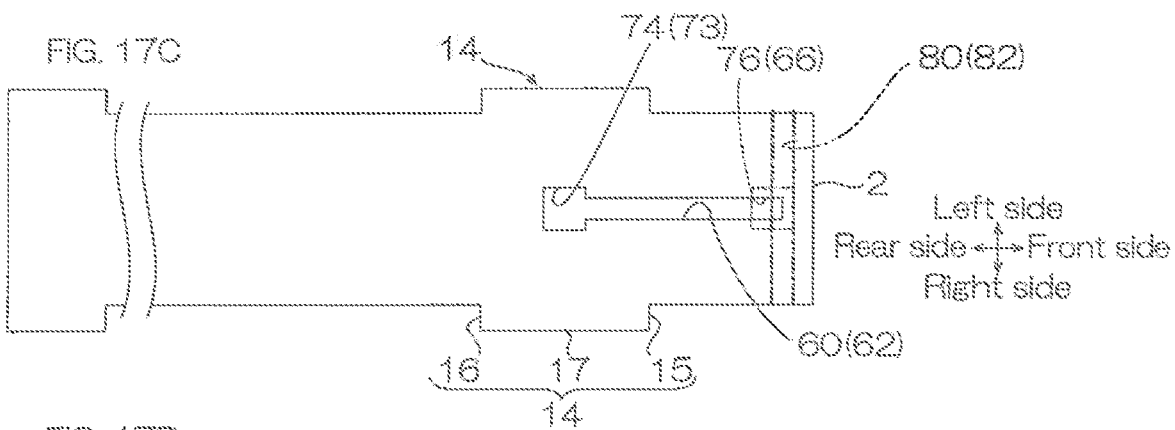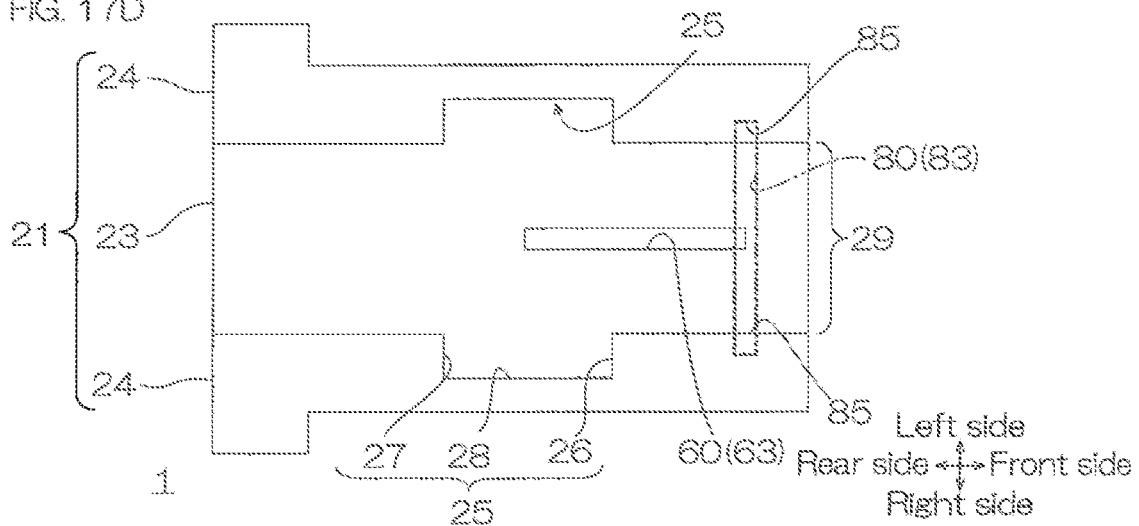

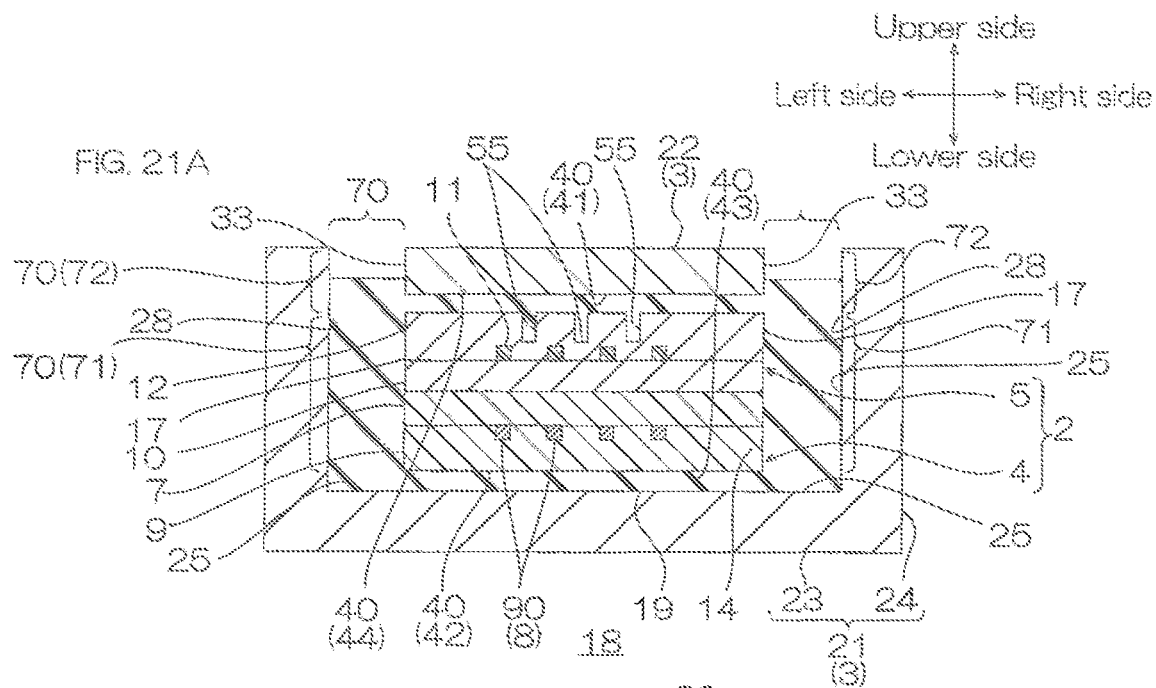
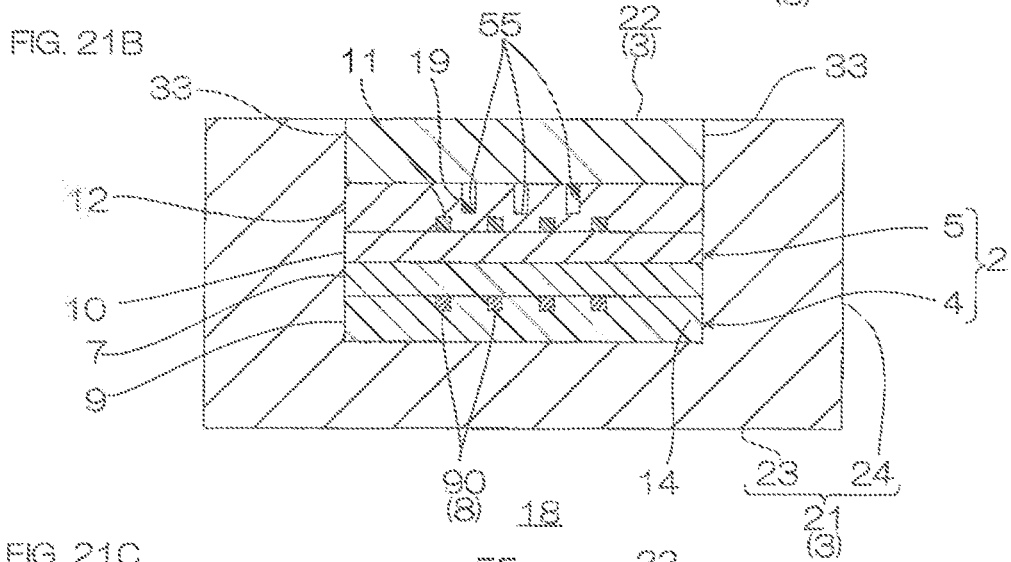
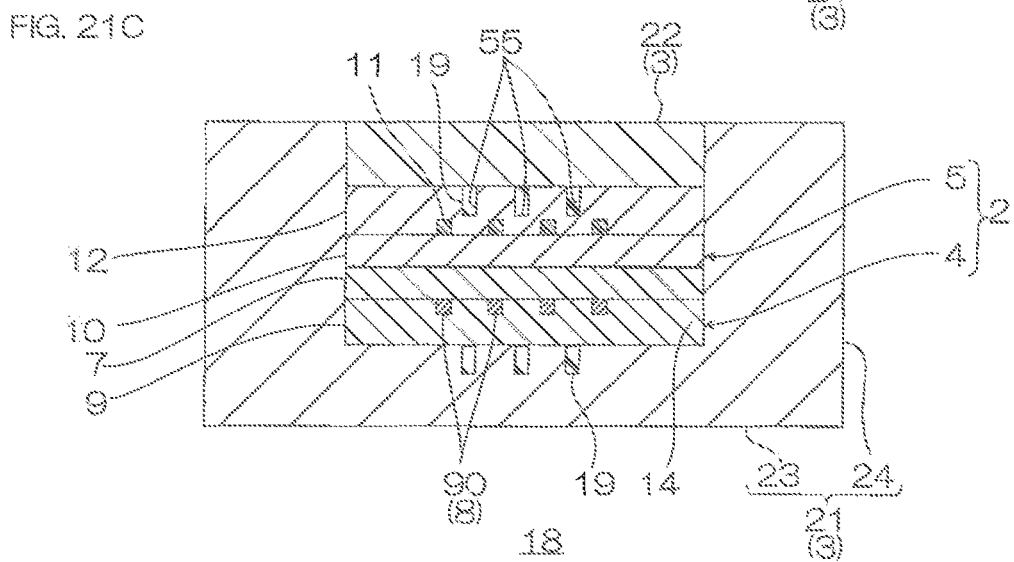

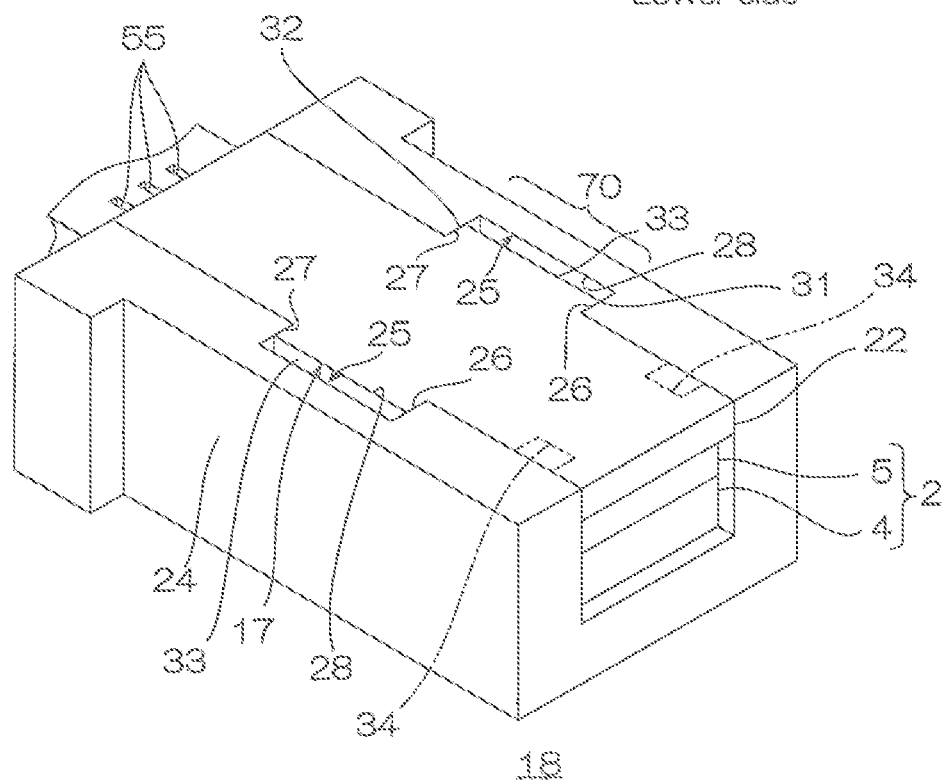

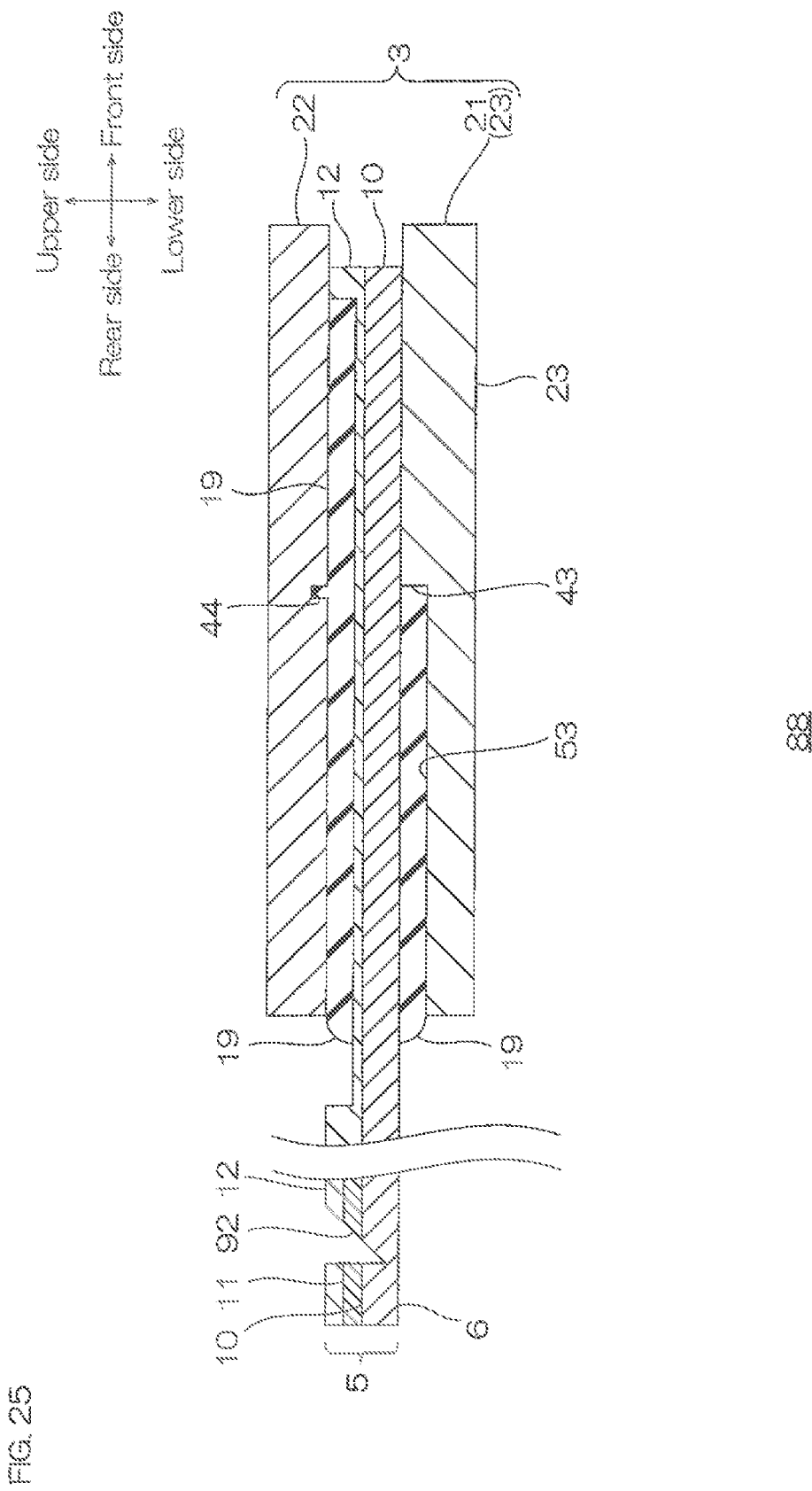

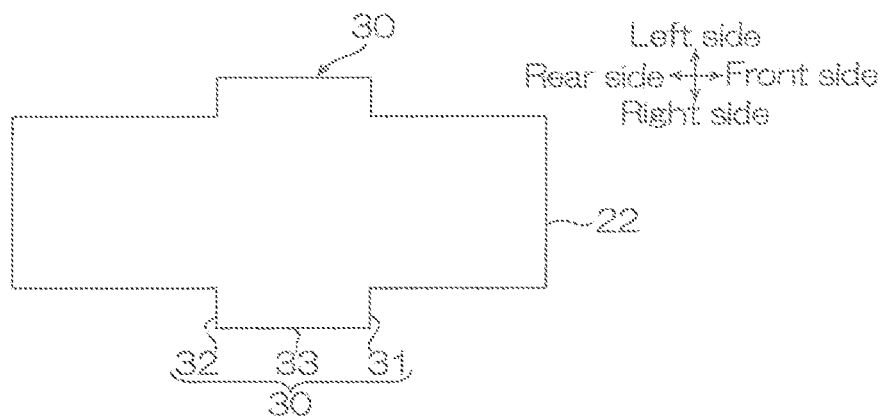
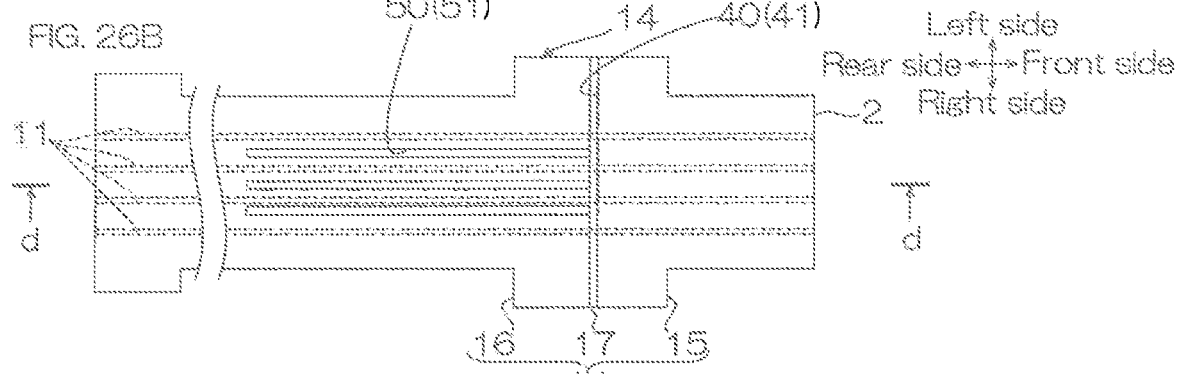
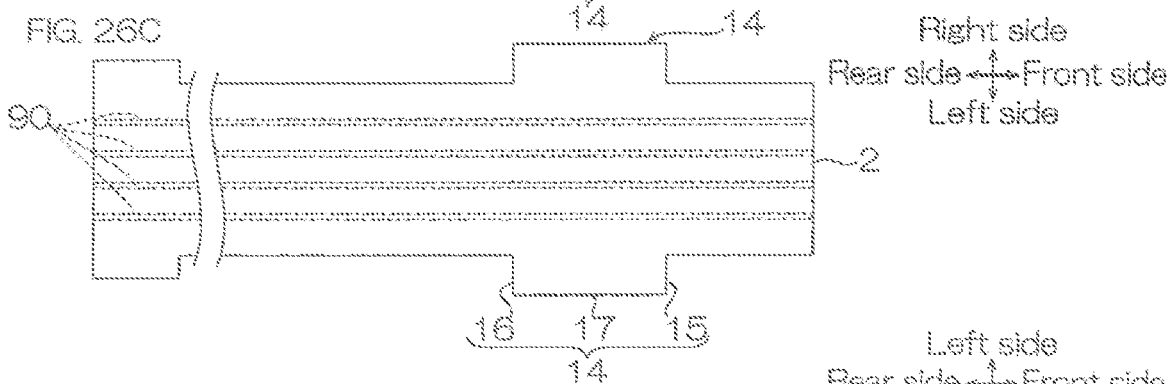
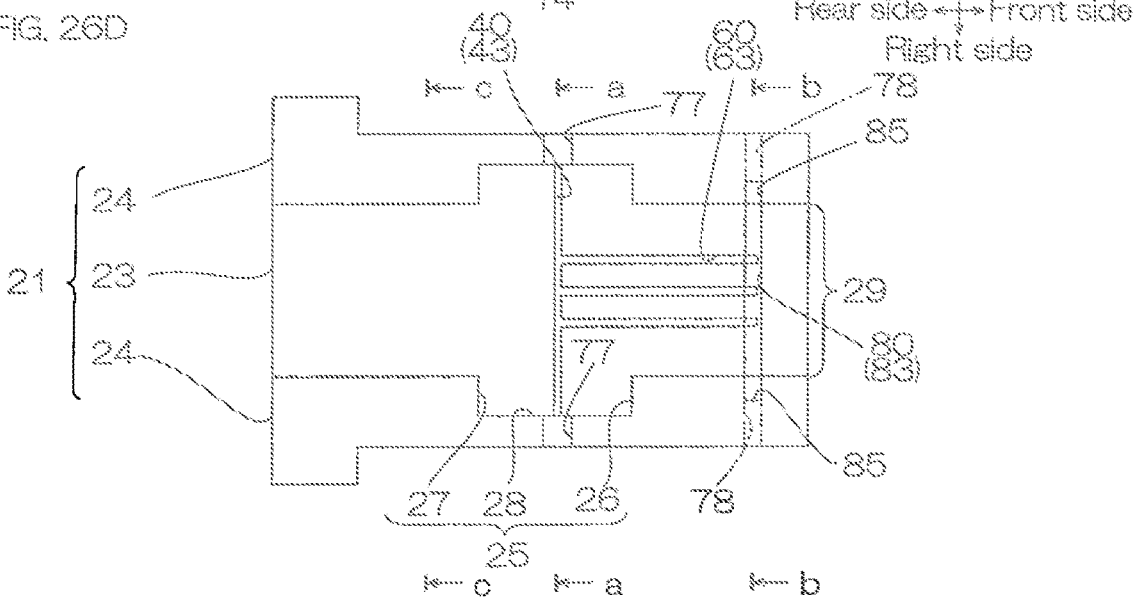

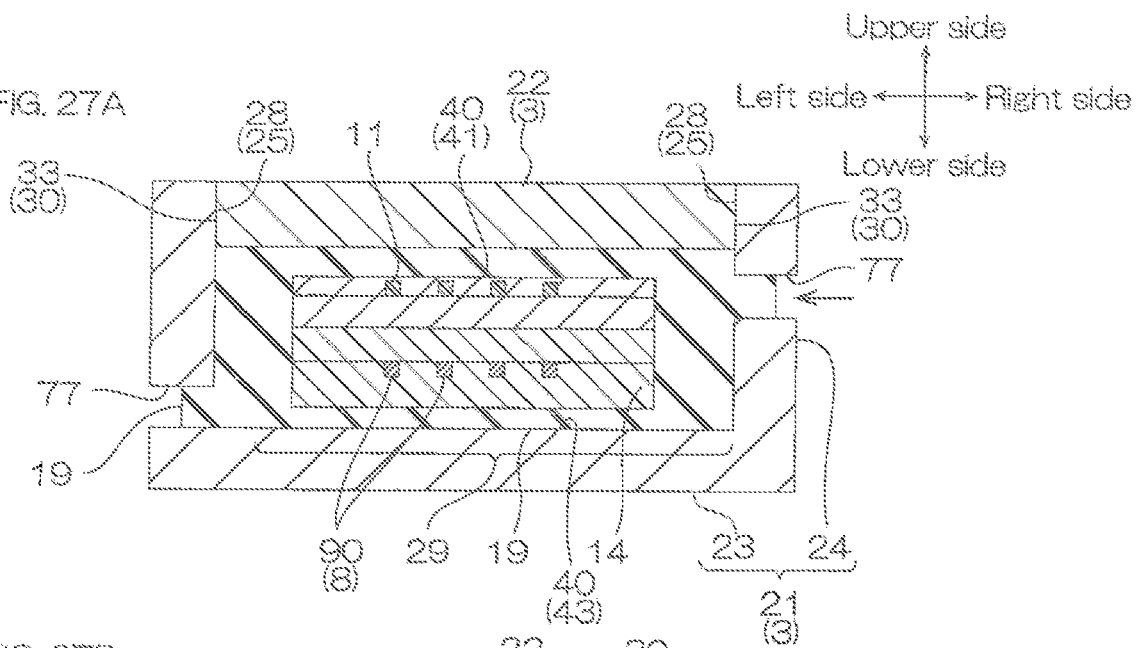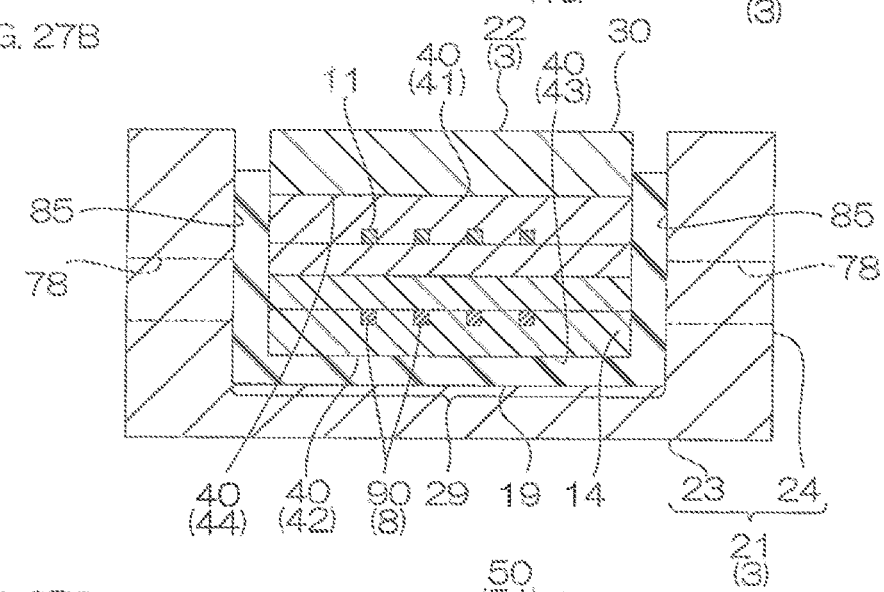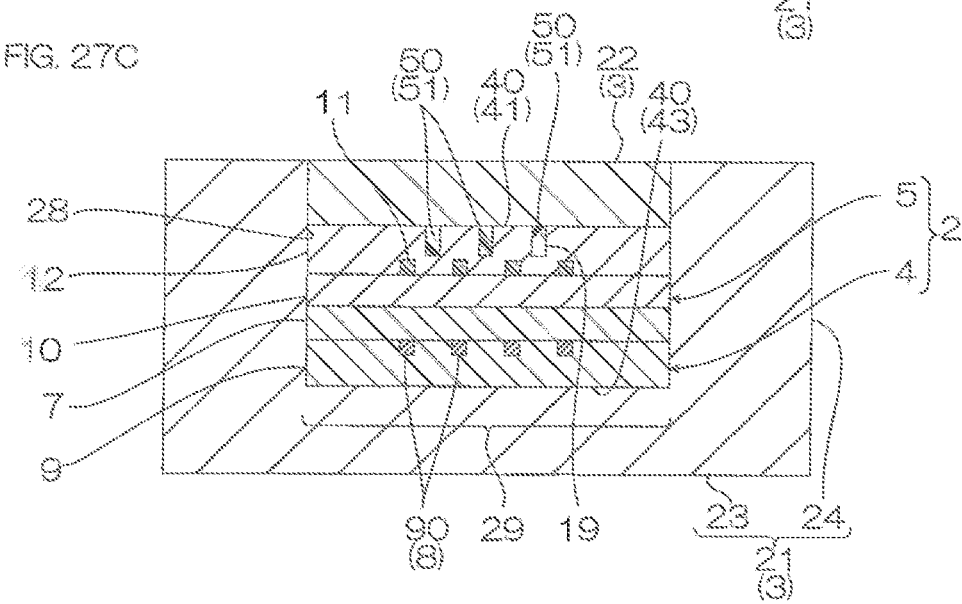

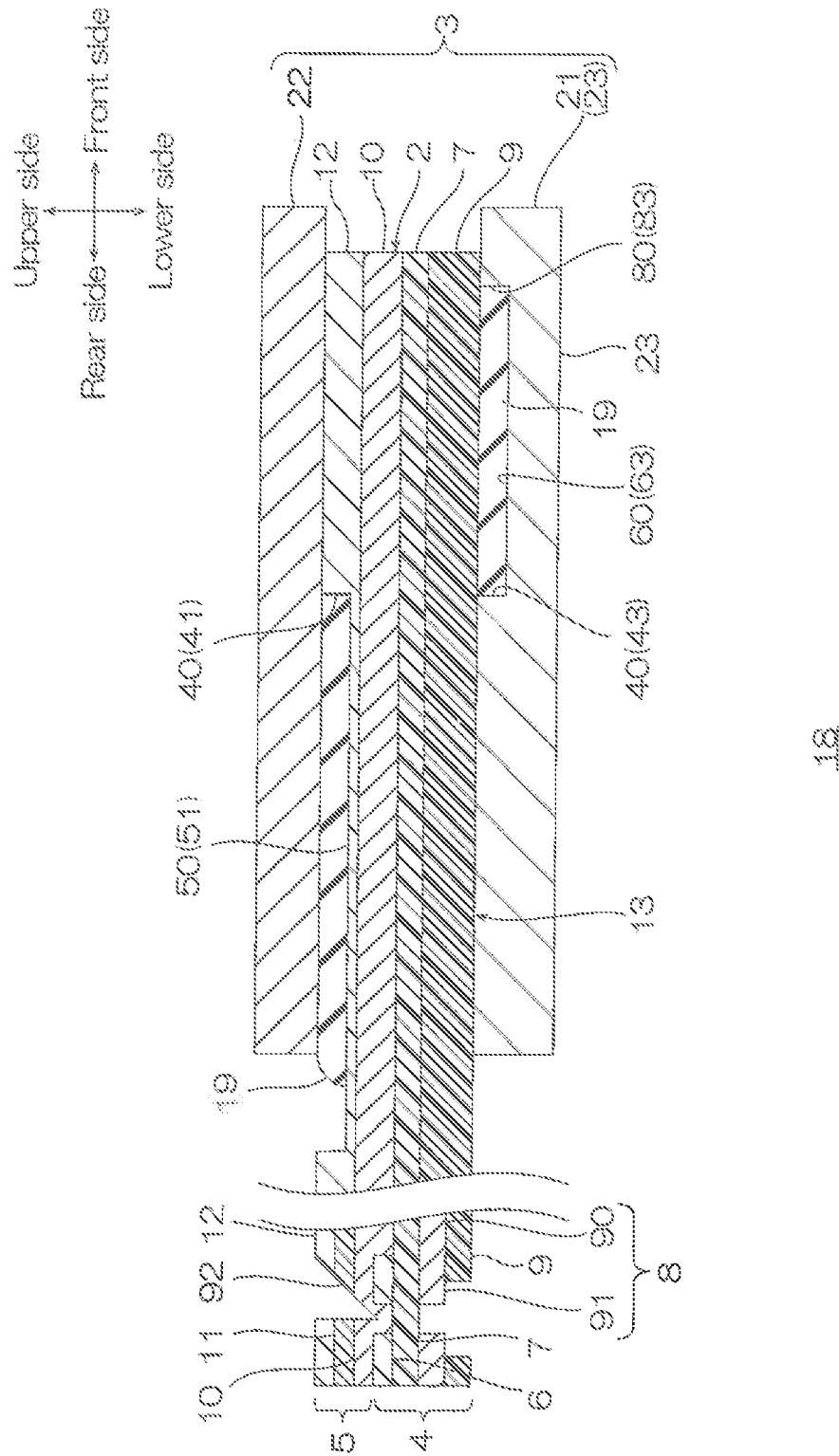

OPTICAL WAVEGUIDE MEMBER CONNECTOR KIT, OPTICAL WAVEGUIDE MEMBER CONNECTOR, AND PRODUCING METHOD THEREOF

CROSS-REFERENCE TO RELATED APPLICATIONS

The present application is a 35 U.S.C. 371 National Stage Entry of PCT/JP2018/013292, filed on Mar. 29, 2018, which claims priority from Japanese Patent Application No. 2017-070935, filed on Mar. 31, 2017, and Japanese Patent Application No. 2018-063651 filed on Mar. 29, 2018, the contents of all of which are herein incorporated by reference in their entirety.

TECHNICAL FIELD

The present invention relates to an optical waveguide member connector kit, an optical waveguide member connector, and a producing method thereof, to be specific, to an optical waveguide member connector kit, a method for producing an optical waveguide member connector using the optical waveguide member connector kit, and an optical waveguide member connector produced by the method for producing an optical waveguide member connector.

BACKGROUND ART

Conventionally, it has been known that an optical waveguide connector is produced by accommodating an optical waveguide in a connector.

A method for fixing the optical waveguide to the optical waveguide connector has been proposed in which the optical waveguide is inserted into a through groove of the optical waveguide connector having the through groove passing through in a front-rear direction and a window portion communicating in an up-down direction along the front-rem direction, and thereafter, a resin material for fixing fills the window portion (ref: for example, Patent Document 1).

CITATION LIST

Patent Document

Patent Document 1: Japanese Unexamined Patent Publication No. 2011-48157

SUMMARY OF THE INVENTION

Problem to be Solved by the Invention

However, in the method of Patent Document 1, there is a disadvantage that the optical waveguide only adheres to the optical waveguide connector by the resin material for fixing filling the window portion, so that the adhesion of the optical waveguide to the optical waveguide connector is not sufficient.

The present invention provides an optical waveguide member connector kit that is capable of improving an adhesive force of an optical waveguide with respect to a connector, an optical waveguide member connector, and a producing method thereof.

Means for Solving the Problem

The present invention (1) includes an optical waveguide member connector kit including an optical waveguide member including an optical waveguide and a connector having an accommodation space that is capable of accommodating the optical waveguide member, wherein when the optical waveguide member is accommodated in the accommodation space, the connector has an opening portion reaching the optical waveguide member from the outside of the connector and when the optical waveguide member is accommodated in the accommodation space, at least one of the optical waveguide member and the connector includes a groove communicating with the opening portion and facing at least the other side of the optical waveguide member and the connector.

In the optical waveguide member connector kit, when the optical waveguide is accommodated in the accommodation space, at least one of the optical waveguide member and the connector has a groove communicating with the opening portion and facing at least the other side of the optical waveguide member and the connector. Thus, when an adhesive is injected into the opening portion, the adhesive enters the groove from the opening portion. As a result, the adhesive fills the opening portion and furthermore, the groove. The adhesive filling the groove faces at least the other side of the optical waveguide member and the connector, so that the adhesive force of the optical waveguide member with respect to the connector can be improved.

The present invention (2) includes the optical waveguide member connector kit described in (1), wherein the plurality of opening portions are provided so as to communicate with each other via the groove when the optical waveguide member is accommodated in the accommodation space.

In a case where the air remains in the groove, the adhesive does not easily enter the groove, and in the optical waveguide member connector kit, of the plurality of opening portions, when the adhesive enters the groove from one opening portion, the air can be escaped from the other opening portion. Thus, the adhesive can efficiently fill the groove. As a result, the adhesive force of the optical waveguide member with respect to the connector can be furthermore improved.

The present invention (3) includes the optical waveguide member connector kit described in (1) or (2), wherein the connector includes a main body having a wall, and a lid that sandwiches the optical waveguide member between the wall and the lid, when the optical waveguide member is accommodated in the accommodation space.

In the optical waveguide member connector kit, the connector includes the main body having the wall, and the lid, so that when the optical waveguide is accommodated in the accommodation space, the optical waveguide is sandwiched between the wall and the lid, and the positioning of the optical waveguide with respect to the connector can be achieved. Thus, the optical waveguide can accurately adhere to the connector.

The present invention (4) includes the optical waveguide member connector kit described in any one of (1) to (3), wherein the optical waveguide member is an opto-electric hybrid board further including an electric circuit board.

In the optical waveguide member connector kit, the adhesive force of the opto-electric hybrid board with respect to the connector can be improved.

The present invention (5) includes a method for producing an optical waveguide member connector including a first step of accommodating an optical waveguide member of the optical waveguide member connector kit described in any one of (1) to (4) in the accommodation space and a second step of after the first step, adhering the optical waveguide member to a connector by injecting an adhesive having flowability into an opening portion and allowing the adhesive to enter a groove from the opening portion.

In the method for producing an optical waveguide member connector, in the second step, the adhesive can fill the groove along with the opening portion, so that the adhesive force of the optical waveguide member with respect to the connector can be improved.

The present invention (6) includes an optical waveguide member connector including an optical waveguide member and a connector accommodating the optical waveguide member, wherein the connector has an opening portion reaching the optical waveguide member from the outside of the connector, at least one of the optical waveguide member and the connector includes a groove communicating with the opening portion and facing at least the other side of the optical waveguide member and the connector, and an adhesive fills the opening portion and the groove.

In the optical waveguide member connector, the adhesive fills the groove along with the opening portion. Thus, the adhesive three of the optical waveguide member with respect to the connector can be improved.

Effect of the Invention

According to the optical waveguide member connector kit, the optical waveguide member connector, and the producing method thereof of the present invention, the adhesive force of the optical waveguide member with respect to the connector can be improved.

BRIEF DESCRIPTION OF THE DRAWINGS

FIG. 1A illustrating a lid,
FIG. 1B illustrating an opto-electric hybrid board, and
FIG. 1C illustrating a main body.
FIGS. 2A to 2D show plan views and bottom views of an opto-electric hybrid board connector kit shown in FIGS. 1A to 1C:
FIG. 2A illustrating a bottom view of the lid,
FIG. 2B illustrating a plan view of the opto-electric hybrid board,
FIG. 2C illustrating a bottom view of the opto-electric hybrid board, and
FIG. 2D illustrating a plan view of the main body.
FIG. 4 shows a plan view of the opto-electric hybrid board connector shown in FIG. 3.
FIG. 7 shows a perspective view of a modified example of the opto-electric hybrid board connector shown in FIG. 3.
FIGS. 8A to 8D show perspective views of an opto-electric hybrid board connector kit of a second embodiment and a modified example of the present invention:
FIG. 8A illustrating a bottom view of a lid,
FIG. 8B illustrating a plan view of an opto-electric hybrid board,
FIG. 8C illustrating a bottom view of the opto-electric hybrid board,
FIG. 8D illustrating a plan view of a main body, and
FIG. 8E illustrating a modified example shown by a phantom line of FIG. 8D and a cross-sectional view along an a-a line of FIG. 8D.
FIG. 9 shows a cross-sectional view corresponding to the a-a line of FIG. 8D of an opto-electric hybrid board connector produced from the opto-electric hybrid board connector kit shown in FIGS. 8A to 8C.
FIG. 12A illustrating a bottom view of a lid,
FIG. 12B illustrating a plan view of an opto-electric hybrid board,
FIG. 12C illustrating a bottom view of the opto-electric hybrid board, and
FIG. 12D illustrating a plan view of a main body.
FIGS. 15A to 15E show plan views and bottom views of the opto-electric hybrid board connector kit of the third embodiment and a modified example of the present invention:
FIG. 15A illustrating a bottom view of the lid,
FIG. 15B illustrating a plan view of the opto-electric hybrid board,
FIG. 15C illustrating a bottom view of the opto-electric hybrid board,
FIG. 15D illustrating a plan view of the main body, and
FIG. 15E illustrating a modified example shown by a phantom line of FIG. 15D and a cross-sectional view along an a-a line of FIG. 15D.
FIGS. 17A to 17D show plan views and bottom views of the opto-electric hybrid board connector kit of the modified example of the third embodiment of the present invention:
FIG. 17A illustrating a bottom view of the lid,
FIG. 17B illustrating a plan view of the opto-electric hybrid board,
FIG. 17C illustrating a bottom view of the opto-electric hybrid board, and
FIG. 17D illustrating a plan view of the main body.
FIG. 18A illustrating a bottom view of the lid,
FIG. 18B illustrating a plan view of the opto-electric hybrid board,
FIG. 18C illustrating a bottom view of the opto-electric hybrid board, and
FIG. 18D illustrating a plan view of the main body.

FIG. 19A illustrating a bottom view of the lid,

FIG. 19B illustrating a plan view of the opto-electric hybrid board,

FIG. 19C illustrating a bottom view of the opto-electric hybrid board, and

FIG. 19D illustrating a plan view of the main body.

FIG. 20A illustrating a bottom view of a lid,

FIG. 20B illustrating a plan view of an opto-electric hybrid board,

FIG. 20C illustrating a bottom view of the opto-electric hybrid board, and

FIG. 20D illustrating a plan view of a main body.

FIGS. 21A to 21C show cross-sectional views of an opto-electric hybrid board connector produced from the opto-electric hybrid board connector kit shown in FIGS. 20A to 20D:

FIG. 21A illustrating a cross-sectional view along an a-a,

FIG. 21B illustrating a cross-sectional view along a b-b line, and

FIG. 21C illustrating a cross-sectional view along a c-c line.

FIG. 23A illustrating the lid,

FIG. 23B illustrating the opto-electric hybrid board, and

FIG. 23C illustrating the main body.

FIG. 24 shows a perspective view of an opto-electric hybrid board connector produced from the opto-electric hybrid board connector kit shown in FIGS. 23A to 23C.

FIG. 25 shows a cross-sectional view along a longitudinal direction of an opto-electric hybrid board connector produced form an opto-electric hybrid board connector kit of Specific Example 2 of the present invention.

FIGS. 26A to 26D show plan views and bottom views of an opto-electric hybrid board connector kit of Specific Example 3 of the present invention:

FIG. 26A illustrating a bottom view of a lid,

FIG. 26B illustrating a plan view of an opto-electric hybrid board,

FIG. 26C illustrating a bottom view of the opto-electric hybrid board, and

FIG. 26D illustrating a plan view of a main body.

FIGS. 27A to 27C show cross-sectional views of an opto-electric hybrid board connector produced from the opto-electric hybrid board connector kit shown in FIGS. 26A to 26D:

FIG. 27A illustrating a cross-sectional view along an a-a line,

FIG. 27B illustrating a cross-sectional view along a b-b line, and

FIG. 27C illustrating a cross-sectional view along a c-c line.

FIG. 28 shows a cross-sectional view along a d-d line of an opto-electric hybrid board connector produced from the opto-electric hybrid board connector kit shown in FIGS. 26A to 26D.

DESCRIPTION OF EMBODIMENTS

Figure 1A:
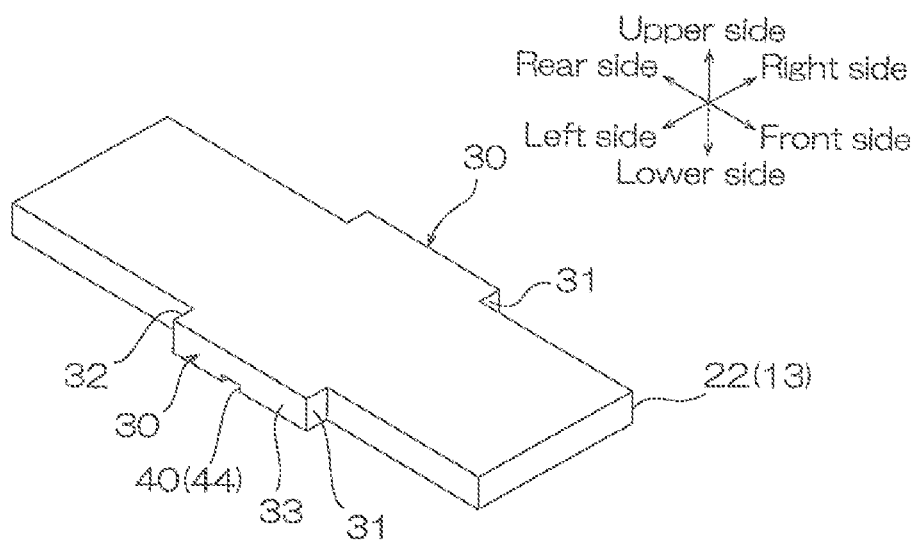
FIGS. 1A to 1C show perspective views of a connector kit of a first embodiment of the present invention.

In FIGS. 2A to 2D, the right-left direction on the plane of the sheet is a front-rear direction (a longitudinal direction, a first direction). The right side on the plane of the sheet is a front side (one side in the longitudinal direction, one side in the first direction), and the left side on the plane of the sheet is a rear side (the other side in the longitudinal direction, the other side in the first direction).

In FIGS. 2A to 2D, the up-down direction on the plane of the sheet is a right-left direction (a width direction, a second direction perpendicular to the first direction). The upper side on the plane of the sheet is a right side (one side in the width direction is one side in the second direction), and the lower side on the plane of the sheet is a left side (the other side in the width direction is the other side in the second direction).

In FIGS. 2A to 2D, the paper thickness direction on the plane of the sheet is an up-down direction (a thickness direction, a third direction perpendicular to the first direction and the second direction) The near side on the plane of the sheet is an upper side (one side in the thickness direction, one side in the third direction), and the far side on the plane of the sheet is a lower side (the other side in the thickness direction, the other side in the third direction).

To be specific, directions are in conformity with direction arrows described in each view.

The definition of the directions does not mean to limit the direction of a connector kit 1 to be described later and an opto-electric hybrid board connector 18 (described later) at the time of its production and its use.

In FIG. 4, an adhesive 19 (described later) is omitted to clearly show the shape and the arrangement of a central horizontal groove 40 (described later). In each of the perspective views, a base insulating layer 7, a cover insulating layer 9, an under clad layer 10, a core layer 11, and an over clad layer 12 (described later) are omitted to clearly show the shape and the arrangement of an electric circuit board 4 and an optical waveguide 5 including those.

First Embodiment (Basic Structure of Opto-Electric Hybrid Board Connector Kit 1

Figure 3:
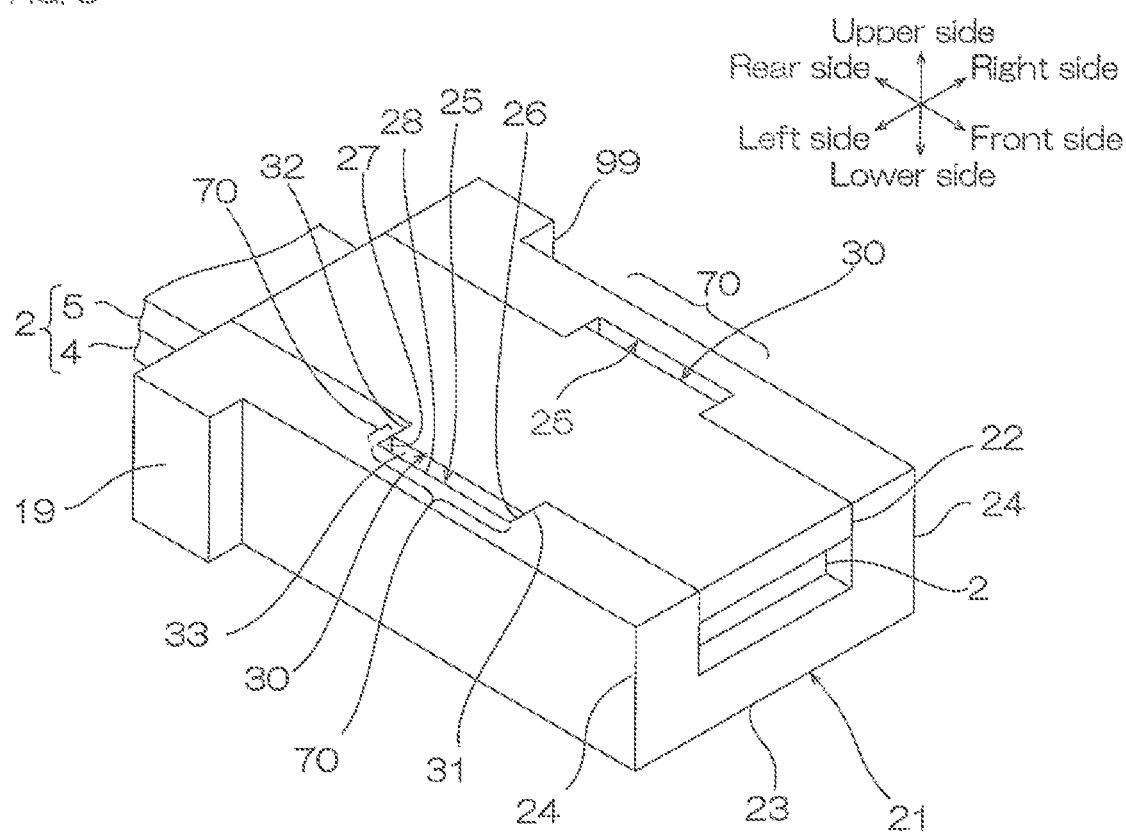
FIG. 3 shows a perspective view of an opto-electric hybrid board connector produced from the opto-electric hybrid board connector kit shown in FIGS. 1A to 2D.

As shown in FIGS. 1 to 3, an opto-electric hybrid board connector kit 1 is a kit for producing the opto-electric hybrid board connector 18 as one example of an optical waveguide member connector by mounting an opto-electric hybrid board 2 as one example of an optical waveguide member on a connector 3. To be specific, the connector kit 1 includes the opto-electric hybrid board 2 and the connector 3 as separate bodies.

The opto-electric hybrid board connector kit 1 is not a completed product and a set of a component of the opto-electric hybrid board connector 18, and the connector 3 and the opto-electric hybrid board 2 are sold as a set.

In the following description, the opto-electric hybrid board connector kit 1 may be simply referred to as the connector kit 1.

Figure 5A:
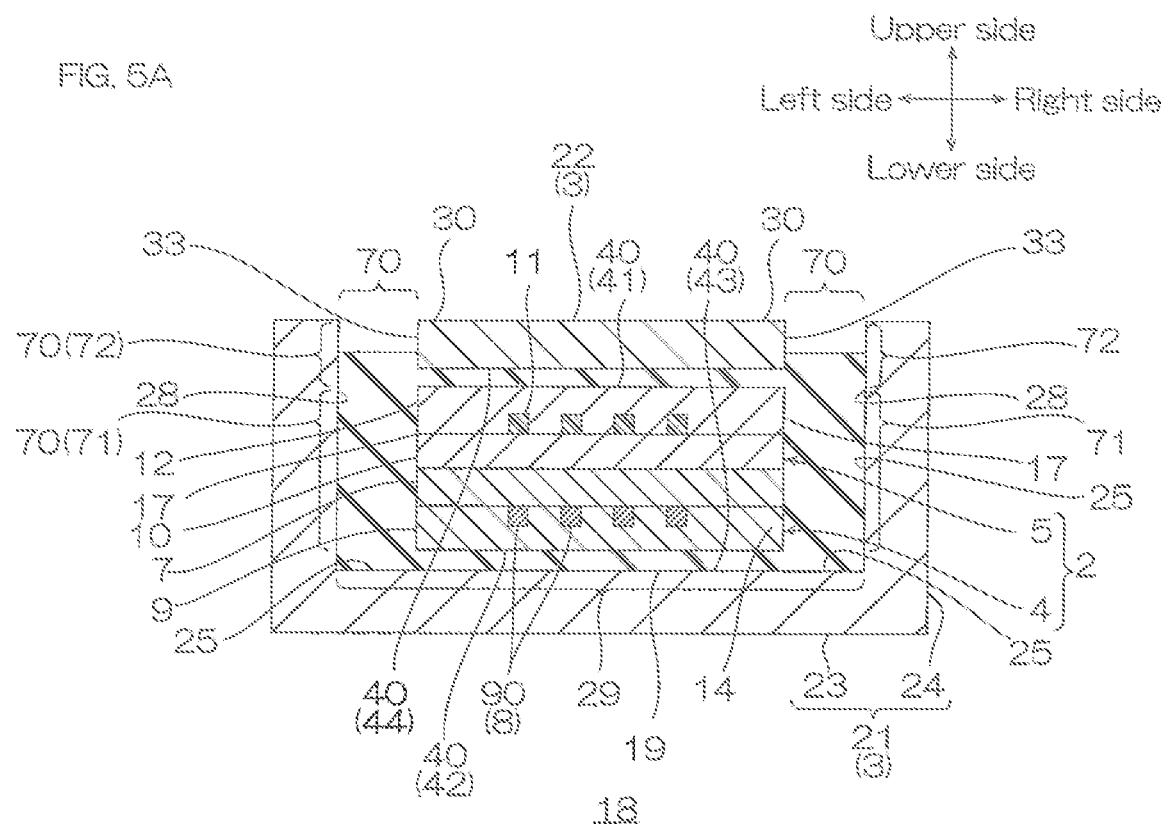
FIG. 5A illustrating a cross-sectional view along an a-a line and
FIG. 5B illustrating a front view.
Figure 5B:
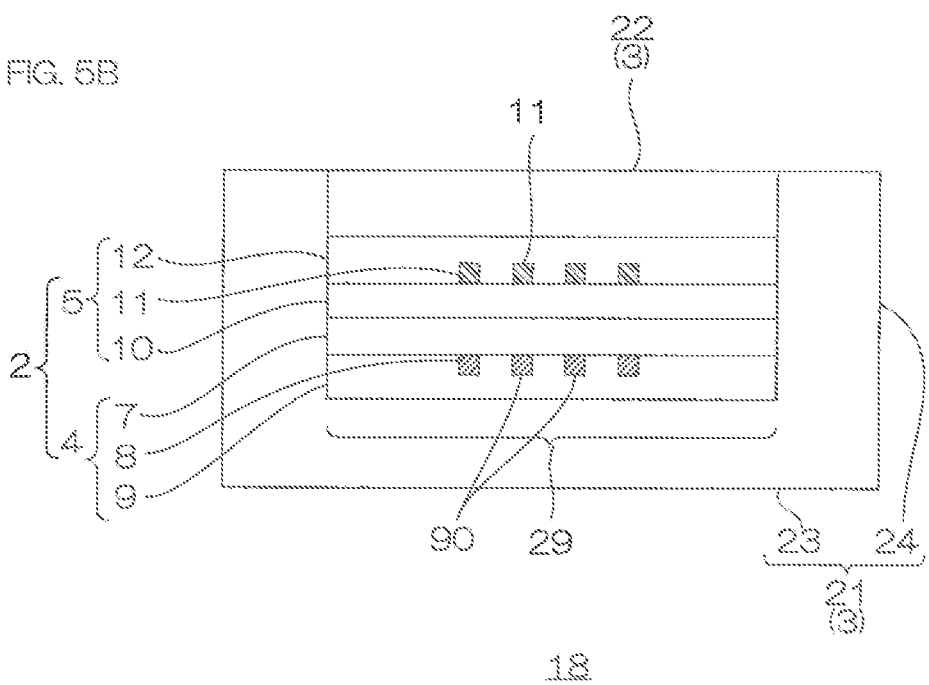
FIG. 5 shows the opto-electric hybrid board connector shown in FIG. 4.
Figure 6:
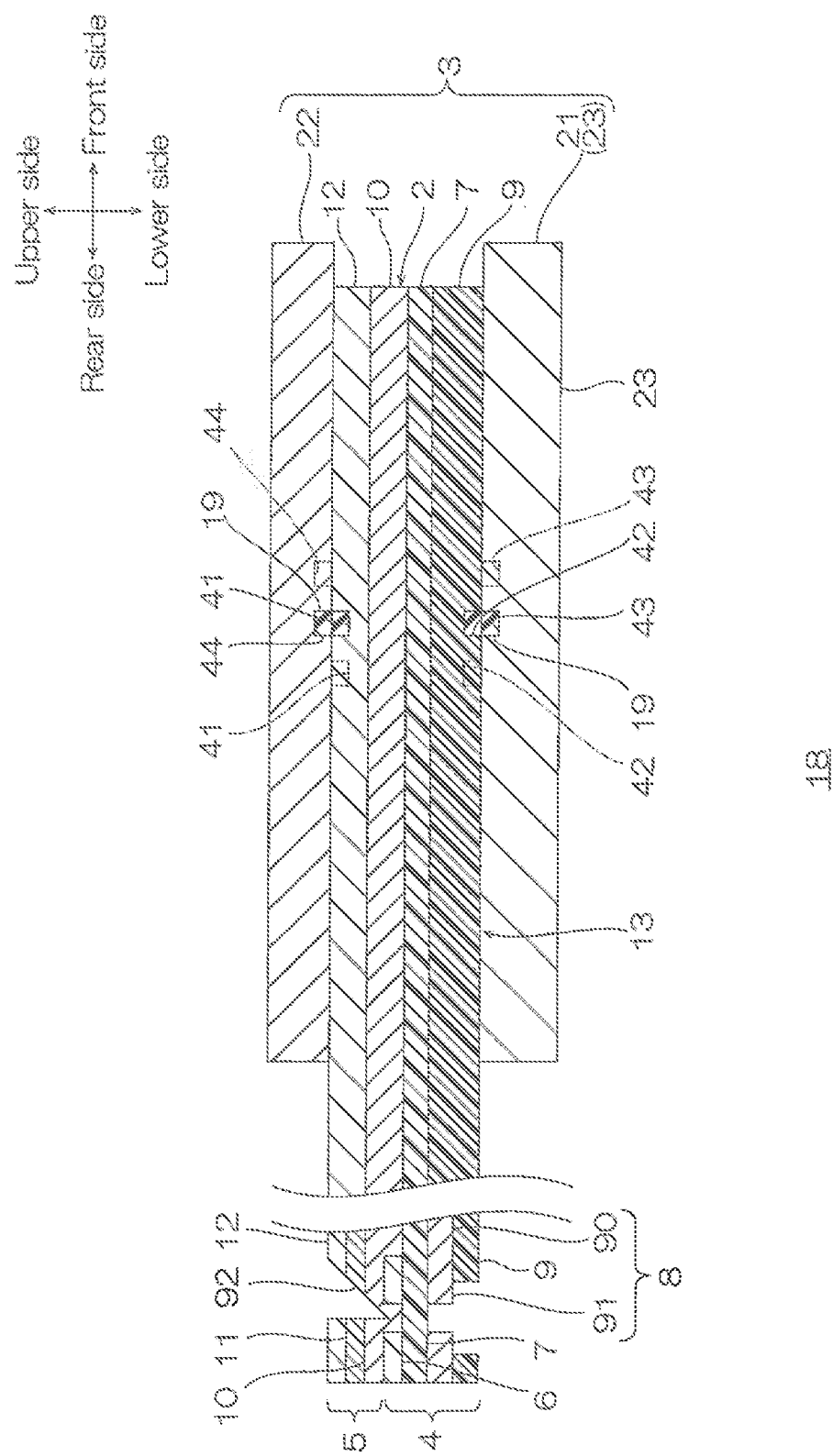
FIG. 6 shows a cross-sectional view along a b-b line of the opto-electric hybrid board connector of FIG. 4.

As shown in FIGS. 1A, 2B, and 2C, the opto-electric hybrid board 2 has a generally flat plate shape extending in the front-rear direction. The opto-electric hybrid board 2 has, for example, flexibility (flexible properties or plasticity). The opto-electric hybrid board 2 has, for example, a shape when viewed from the top in which both end edges in the width direction of the rear end portion and the from end portion (corresponding to a mounting portion 13 to be described later) are positioned at the outer side with respect to both end edges in the width direction other than those. As shown in FIGS. 5A, 5B, and 6, though the details are described later, the opto-electric hybrid board 2 sequentially includes the electric circuit board 4 and the optical waveguide 5 upwardly.

The electric circuit board 4 forms the lower surface of the opto-electric hybrid board 2.

The electric circuit board 4 sequentially includes a metal supporting layer 6, the base insulating layer 7, a conductive layer 8, and the cover insulating layer 9 downwardly in the thickness direction.

The metal supporting layer 6 supports the conductive layer 8. The metal supporting layer 6 is provided in the rear end portion of the electric circuit board 4, and exposes the lower surfaces of the front end portion and the middle portion in the front-rear direction of the base insulating layer 7 to be described next.

The base insulating layer 7 insulates the metal supporting layer 6 from the conductive layer 8. The base insulating layer 7 is provided in the entire region of the electric circuit board 4. Examples of a material for the base insulating layer 7 include resins such as polyimide. The thickness of the base insulating layer 7 is, for example, 2 µm or more, and for example, 60 µm or less, The conductive layer 8 is provided in at least the rear end portion of the electric circuit board 4. The plurality of conductive layers 8 are disposed in parallel at spaced intervals to each other in the width direction. The conductive layer 8 includes a wire 90 and a terminal portion 91 that is provided in the rear end portion thereof. Examples of a material for the conductive layer 8 include conductors. The thickness of the conductive layer 8 is, for example, 2 µm or more, and for example, 100 µm or less.

The cover insulating layer 9 is a protecting layer that covers and protects the wire 90. Meanwhile, the cover insulating layer 9 exposes the terminal portion 91. The material for the cover insulating layer 9 is the same as that for the base insulating layer 7. The thickness of the cover insulating layer 9 is, for example, 2 µm or more, and for example, 60 µm or less.

The optical waveguide 5 forms the upper surface of the opto-electric hybrid board 2. The optical waveguide 5 is positioned on the electric circuit board 4. The optical waveguide 5 is a strip-type optical waveguide, and to be specific, sequentially includes the under clad layer 10, the core layer 11, and the over clad layer 12 upwardly.

The under clad layer 10 has a generally plate shape having the same shape as that of the optical waveguide 5 when viewed from the top. The under clad layer 10 is provided on the upper surfaces of the metal supporting layer 6 and the base insulating layer 7.

The core layer 11 is provided on the upper surface of the under clad layer 10. The plurality of core layers 11 are disposed at spaced intervals to each other in the width direction. The plurality of core layers 11 have linear shapes along the front-rear direction. The core layer 11 has a mirror surface 92 in the rear end portion thereof.

The over clad layer 12 is provided on the upper surface of the under clad layer 10 so as to cover the core layer 11. The over clad layer 12 has a generally plate shape having the same shape as that of the under clad layer 10 when viewed from the top.

Examples of a material for the under clad layer 10, the core layer 11, and the over clad layer 12 include transparent resins such as epoxy resin. Of the under clad layer 10, the core layer 11, and the over clad layer 12, the refractive index of the core layer 11 is high with respect to that of the under clad layer 10 and the over clad layer 12.

Figure 1B:
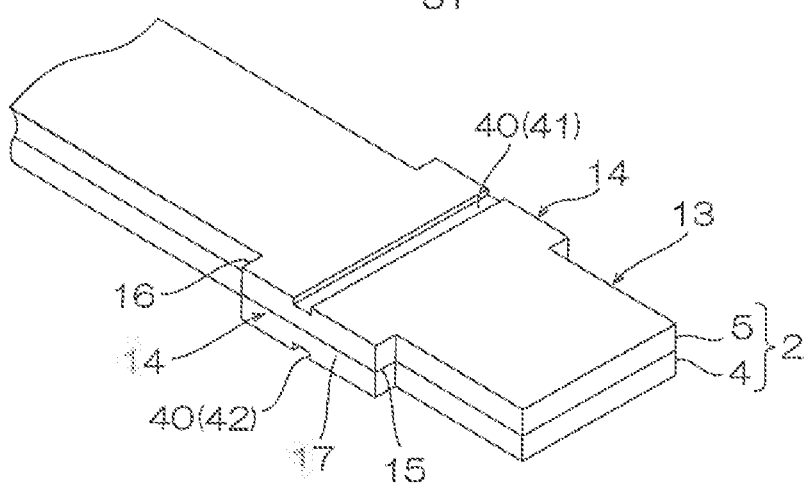

The front end portion of the opto-electric hybrid board 2 is defined as the mounting portion 13 that is mounted on the connector 3, As shown in FIGS. 1B, 2B, and 2C, the central portion in the front-rear direction of both end edges in the width direction of the mounting portion 13 is positioned at both outer sides in the width direction with respect to both end portions in the front-rear direction of both end edges in the width direction of the mounting portion 13. Thus, the mounting portion 13 includes two board protruding portions 14 in which the central portion in the front-rear direction protrudes toward both outer sides in the width direction.

The two board protruding portions 14 have generally rectangular shapes when viewed from the top. To be specific, each of the two board protruding portions 14 has a first front fitting surface 15 that extends in the width direction, a first rear fitting surface 16 that is disposed so as to face the rear side of the first front fitting surface 15 at spaced intervals thereto, and a first connecting surface 17 that connects the outer side end edge in the width direction of the first front fitting surface 15 to that in the width direction of the first rear fitting surface 16.

The length in the width direction of the first front fitting surface 15 and the first rear fitting surface 16 (the protruding length of the board protruding portion 14) is, for example, 0.01 mm or more, preferably 0.05 mm or more, and for example, 1 mm or less, preferably 0.5 mm or less. The length in the front-rear direction of the first connecting surface 17 (the length between the first front fitting surface 15 and the first rear fitting surface 16) is, for example, 0.01 mm or more, preferably 0.1 mm or more, and for example, 5 mm or less, preferably 1 mm or less.

The electric circuit board 4 is provided with the two central horizontal grooves 40 to be described later.

Figure 1C:
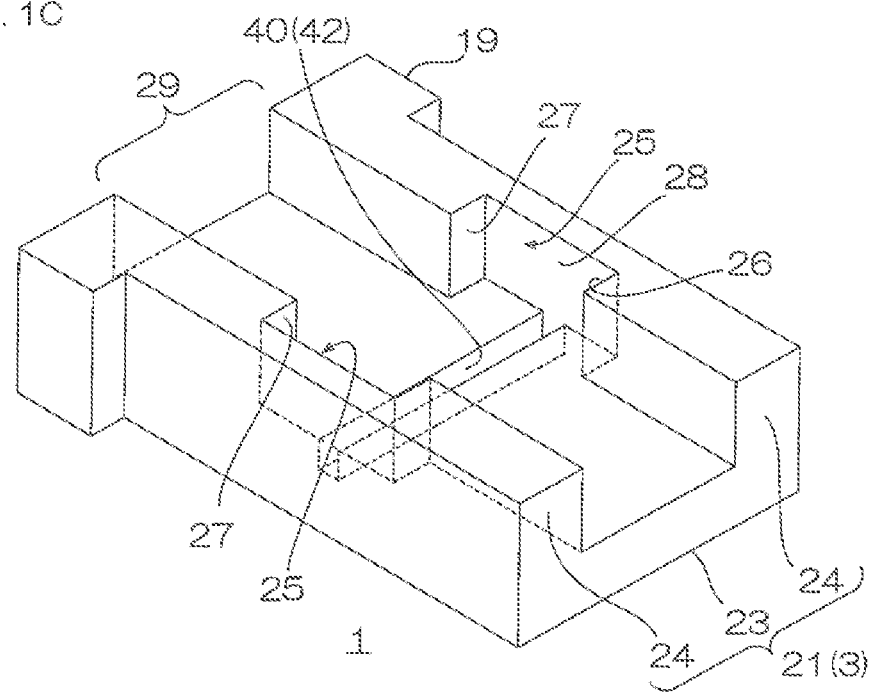

As shown in FIGS. 1A and 1C, in the connector 3, the basic structure except for an opening portion 70 (ref: FIGS. 3 and 4) and a groove 30 to be described later is, for example, the same as that of a PMT optical connector conforming to JPCA standard (detailed standard of PMT optical connector, JPCA-PE03-01-07S-2006, Japan Electronics Packaging and Circuits).

To be specific, the connector 3 includes a main body 21 and a lid 22 as separate bodies.

As shown in FIGS. 1C, 2D, and 5B, the main body 21 has a U-shape when viewed from the front having an opening upwardly. Thus, the main body 21 has an accommodation space 29 at the inside thereof. The main body 21 integrally includes a bottom wall 23 and two extending walls 24 as one example of a wall.

The bottom wall 23 has a generally rectangular flat plate shape extending in the right-left direction.

The extending wall 24 has a shape extending from both end edges in the right-left direction of the bottom wall 23 upwardly. Each of the two extending walls 24 has a generally rectangular flat plate shape extending in the up-down direction. The inner surfaces of the two extending walls 24, along with the bottom surface of the bottom wall 23, define the accommodation space 29 for accommodating the opto-electric hybrid board 2.

The central portion in the front-rear direction of the inner surface of the extending wall 24 is positioned at the outer side in the width direction with respect to both end portions in the front-rear direction of the inner surface of the extending wall 24. In this manner, the central portion in the front-rear direction of the inner surface of the extending wall 24 includes a main body recessed portion 25 that is recessed toward both outer sides in the width direction. The inner surface of the extending wall 24 (the inner surface that faces the accommodation space 29) is recessed toward both outer sides in the width direction, so that the main body recessed portion 25 is formed.

The main body recessed portion 25 has a second front fitting surface 26 that extends in the width direction, a second rear fitting surface 27 that is disposed so as to face the rear side of the second front fitting surface 26 at spaced intervals thereto, and a second connecting surface 28 that connects the outer side end edge in the width direction of the second front fitting surface 26 to that in the width direction of the second rear fitting surface 27.

As shown in FIGS. 3, 4, and 5A, when the opto-electric hybrid hoard 2 is accommodated in the accommodation space 29, the second front fitting surface 26 and the second rear fitting surface 27 are configured to fit in (be in contact with) each of the first front fitting surface 15 and the first rear fitting surface 16, respectively of the opto-electric hybrid board 2. To be specific, the length of the second connecting surface 28 (the length between the first front fitting surface 15 and the first connecting surface 17) is the same as the length of the first connecting surface 17.

When the opto-electric hybrid board 2 is accommodated in the accommodation space 29, the second connecting surface 28 is configured to be capable of forming the opening portion 70 along with the first connecting surface 17 of the opto-electric hybrid board 2 and both outer side portions in the width direction of the second front fitting surface 26 and the second rear fitting surface 27. To be specific, the length of the second front fitting surface 26 and the second rear fitting surface 27 (the depth of the main body recessed portion 25) is longer than the length of the first front fitting surface 15 and the first rear fitting surface 16 (the protruding length of the board protruding portion 14). The entire second connecting surface 28 is an opening portion-forming surface for forming the opening portion 70 (a central lower opening 71 and a central upper opening 72 to be described later). Meanwhile, the entire first connecting surface 17 is an opening portion-forming surface for forming the central lower opening 71.

A brim portion 19 that protrudes toward both outer sides in the width direction is provided in the rear end portion of the extending wall 24.

As shown in FIGS. 1A, 2A, and 4, the lid 22 has a generally rectangular flat plate shape extending in the front-rear direction.

The central portion in the front-rear direction of both end edges in the width direction of the lid 22 is positioned at both outer sides in the width direction with respect to both end portions in the front-rear direction of both end edges in the width direction of the lid 22. In this manner, the lid 22 includes two lid protruding portions 30 in which the central portion in the front-rear direction protrudes toward both outer sides in the width direction. The lid protruding portion 30 has a third front fitting surface 31 that extends in the width direction, a third rear fitting surface 32 that is disposed so as to face the rear side of the third front fitting surface 31 at spaced intervals thereto, and a third connecting surface 33 that connects the outer side end edge in the width direction of the third front fitting surface 31 to that in the width direction of the third rear fitting surface 32.

When the lid 22 is provided in the main body 21, the third front fitting surface 31 and the third rear fitting surface 32 can fit in (be brought into contact with) each of the second front fitting surface 26 and the second rear fitting surface 27 of the main body 21, respectively. When the opto-electric hybrid board 2 is accommodated in the accommodation space 29 and the lid 22 is provided in the main body 21, each of the third front fitting surface 31 and the third rear fitting surface 32 is positioned at the same position as the first front fitting surface 15 and the first rear fitting surface 16 of the opto-electric hybrid board 2.

When the lid 22 is provided in the main body 21, the third connecting surface 33 is configured to be capable of forming the opening portion 70 along with the second connecting surface 28 of the main body 21, and the second front fitting surface 26 and the second rear fitting surface 27 of the main body 21. To be specific, the length of the third front fitting surface 31 and the third rear fitting surface 32 (the protruding length of the lid protruding portion 30) is shorter than the length of the second front fitting surface 26 and the second rear fitting surface 27. The length of the third connecting surface 33 is the same as the length of the second connecting surface 28 and the protruding length of the board protruding portion 14.

The third connecting surface 33 is an opening portion-forming surface for forming the central upper opening 72.

The length in the front-rear direction of the lid 22 is the same as the length in the front-rear direction of the main body 21.

The connector 3 is, for example, hard, and to be specific, as described later, has toughness in which the lid 22 can be pushed toward the opto-electric hybrid board 2 and the lid 22 can be pushed toward the main body 21.

A material for the connector 3 is not particularly limited as long as the above-described shape of the main body 21 and the lid 22 can be accurately molded, furthermore, the mechanical strength that can endure the pushing is achieved, and moreover, excellent connecting properties (compatibility) with respect to the adhesive 19 (described later) is achieved. Examples thereof include resin and metal. Preferably, a resin is used, more preferably a hard resin is used.

(Central Horizontal Groove)

As shown in FIGS. 1A to 2D, the connector kit 1 includes the central horizontal groove 40.

For example, the central horizontal groove 40 is provided in the opto-electric hybrid board 2, the main body 21, and/or the lid 22 in the connector kit 1. For example, the central horizontal groove 40 is provided with at least any one of a first horizontal groove 41 and a second horizontal groove 42 provided in the opto-electric hybrid board 2, a third horizontal groove 43 provided in the main body 21, and a fourth horizontal groove 44 provided in the lid 22.

Next, an example in which the central horizontal groove 40 includes all (four) of the first horizontal groove 41, the second horizontal groove 42, the third horizontal groove 43, and the fourth horizontal groove 44 is described.

As for the second horizontal groove 42, the third horizontal groove 43, and the fourth horizontal groove 44, the description of the structure or the like that is the same as that of the first horizontal groove 41 is omitted.

As shown in FIGS. 1B, 2B, and 6, the first horizontal groove 41 is provided on the upper surface of the opto-electric hybrid board 2. To be specific, the first horizontal groove 41 is provided on the upper surface of the optical waveguide 5 in the mounting portion 13. To be more specific, the first horizontal groove 41 is provided on the upper surface of the over clad layer 12 in the mounting portion 13, and has a shape extending along the width direction. The first horizontal groove 41 has a generally linear shape when viewed from the top extending between the central portions in the front-rear direction of the two first connecting surfaces 17. Each of both end edges in the width direction of the first horizontal groove 41 is exposed toward each of the two first connecting surfaces 17.

The first horizontal groove 41 extends so as to cross the core layer 11 when viewed from the top. The first horizontal groove 41 has, for example, a shape that is cut out into a generally rectangular shape when viewed in cross section on the upper surface of the over clad layer 12. The thickness (depth) of the first horizontal groove 41 is set so as not to reach the core layer 11. That is, the first horizontal groove 41 does not expose (disconnect) the core layer 11, and is spaced apart from the core layer 11.

The depth of the first horizontal groove 41 is, for example, 0.003 mm or more, preferably 0.005 mm or more, more preferably 0.01 mm or more, further more preferably 0.1 mm or more, and for example, 1 mm or less; preferably 0.5 mm or less. The width (the length in the front-rear direction) of the first horizontal groove 41 is, for example, 0.003 mm or more, preferably 0.005 mm or more, more preferably 0.01 mm or more, further more preferably 0.1 mm or more, and for example, 10 mm or less, preferably 3 mm or less.

As shown in FIGS. 2C and 6, the second horizontal groove 42 is provided on the lower surface of the opto-electric hybrid board 2. To be specific, the second horizontal groove 42 is provided on the lower surface of the electric circuit board 4 in the mounting portion 13, and has a shape extending along the width direction. The second horizontal groove 42 has a generally linear shape when viewed from the top extending over the central portions in the front-rear direction of the two first connecting surfaces 17. Each of both end edges in the width direction of the second horizontal groove 42 is exposed toward the two first connecting surfaces 17. The second horizontal groove 42 extends so as to cross the wire 90 (the conductive layer 8) when viewed from the top. The second horizontal groove 42 has, for example, a shape that is cut out into a generally rectangular shape when viewed in cross section on the lower surface of the cover insulating layer 9. The thickness (depth) of the second horizontal groove 42 is set so as not to reach the wire 90. That is, the second horizontal groove 42 does not expose (disconnect) the wire 90, and is spaced apart from the wire 90.

The arrangement and the width of the second horizontal groove 42 when viewed from the top are the same as those of the first horizontal groove 41. The depth of the second horizontal groove 42 is, for example, 0.003 mm or more, preferably 0.005 mm or more, more preferably 0.01 mm or more, further more preferably 0.1 mm or more, and for example, 1 mm or less, preferably 0.5 mm or less.

As shown in FIGS. 1C, 2D, and 6, the third horizontal groove 43 is provided in the main body 21. To be specific, the third horizontal groove 43 is provided on the bottom surface of the bottom wall 23. The third horizontal groove 43 has a generally linear shape when viewed from the top extending over the central portions in the front-rear direction of the two second connecting surfaces 28. The shape in cross section, the depth, and the width of the third horizontal groove 43 are the same as those of the first horizontal groove 41.

As shown in FIGS. 2A and 6, the fourth horizontal groove 44 is provided on the lower surface of the lid 22. To be specific, the fourth horizontal groove 44 has a generally linear shape when viewed from the top extending over the central portions in the front-rear direction of the two third connecting surfaces 33. The arrangement of the fourth horizontal groove 44 when viewed from the top is the same as that of the second horizontal groove 42.

When the opto-electric hybrid board 2 is accommodated in the accommodation space 29 and the lid 22 is provided in the main body 21, the first horizontal groove 41, the second horizontal groove 42, the third horizontal groove 43, and the fourth horizontal groove 44 are completely overlapped in the front-rear direction.

(Producing Method of Opto-Electric Hybrid Board Connector)

Next, a method for producing the opto-electric hybrid board connector 18 is described by using the connector kit 1.

To produce the connector kit 1, as shown in FIGS. 1A to 1D, first, the above-described opto-electric hybrid board 2 and the above-described connector 3 are prepared.

Next, the opto-electric; hybrid board 2 is mounted on the connector 3. To be specific, the mounting portion 13 of the opto-electric, hybrid board 2 is accommodated in the accommodation space 29 of the connector 3 (a first step).

In the first step, first, the opto-electric hybrid board 2 is disposed on the bottom wall 23 of the main body 21 in a state where the electric circuit board 4 faces downwardly and the optical waveguide 5 faces upwardly.

As referred to FIGS. 1B, 1C, and 3, at this time, the board protruding portion 14 is accommodated (fit) in the inner side portion in the width direction of the main body recessed portion 25 so that each of the first front fitting surface 15 and the first rear fining surface 16 of the board protruding portion 14 fits in (is brought into surface-contact with) each of the second front fitting surface 26 and the second rear fitting surface 27 of the main body recessed portion 25, respectively. Meanwhile, as shown in FIG. 4, a gap is formed between the first connecting surface 17 of the board protruding portion 14 and the second connecting surface 28 of the main body recessed portion 25, and in this manner, as shown in FIG. 5A, the central lower opening 71 is formed.

As shown in FIG. 5B, both side surfaces in the width direction of the portion other than the board protruding portion 14 in the mounting portion 13 are in contact with the inner surface of the extending wall 24 of the main body 21.

Thereafter, the lid 22 is pushed toward the opto-electric hybrid board 2.

At this time, as shown in FIGS. 1A to 1C and 5A, the lid protruding portion 30 is accommodated (fit) in the inner side portion in the width direction of the main body recessed portion 25 so that each of the third front fitting surface 31 and the third rear fitting surface 32 of the lid protruding portion 30 fits in (is brought into surface-contact with) each of the second front fitting surface 26 and the second rear fitting surface 27 of the main body recessed portion 25, respectively. Meanwhile, a gap is formed between the third connecting surface 33 of the lid protruding portion 30 and the second connecting surface 28 of the main body recessed portion 25, and in this manner, the central upper opening 72 is formed.

The central lower opening 71 and the central upper opening 72 form the opening portion 70. The central lower opening 71 is communicated with the central upper opening 72 in the up-down direction, so that the opening portion 70 has a shape extending in the up-down direction. To be specific, the opening portion 70 is defined as an adhesive injection hole for injecting the adhesive 19 reaching the opto-electric hybrid board 2 and the main body 21 of the connector 3 from the outside.

As shown in FIG. 4, the two opening portions 70 are provided at both sides in the right-left direction of the lid protruding portion 30 corresponding to the two third connecting surfaces 33, the two first connecting surfaces 17, and the two second connecting surfaces 28.

Then, the central horizontal groove 40 is communicated with the two opening portions 70.

To be specific, each of both end edges in the width direction of the first horizontal groove 41 and the second horizontal groove 42 is communicated with each of the two opening portions 70 from each of the two first connecting surfaces 17, Each of both end edges in the width direction of the third horizontal groove 43 is communicated with each of the two opening portions 70 from the bottom surface of the bottom wall 23.

Each of both end edges in the width direction of the fourth horizontal groove 44 is communicated with each of the two opening portions 70 from the lower surface of the lid 22, As shown in FIG. 6, the first horizontal groove 41 faces the lid 22. To be more specific, the first horizontal groove 41 faces the fourth horizontal groove 44.

Meanwhile, the fourth horizontal groove 44 faces the optical waveguide 5 (the opto-electric hybrid board 2).

The second horizontal groove 42 faces the main body 21 (the bottom wall 23). To be more specific, the second horizontal groove 42 faces the third horizontal groove 43.

Meanwhile, in the third horizontal groove 43, the pressure of the pushing of the lid 22 facing the electric circuit board 4 (the opto-electric hybrid board 2) with respect to the opto-electric hybrid board 2 is set at such a degree that the opto-electric hybrid board 2 does not relatively move with respect to the main body 21 and the lid 22.

By the pushing of the lid 22 with respect to the opto-electric hybrid board 2, the opto-electric hybrid board 2 is positioned with respect to the main body 21 to be temporarily fixed. At this time, when the opto-electric hybrid board 2 has distortion (deflection, warping, or the like) based on the flexibility, by the above-described pushing, the opto-electric hybrid board 2 is subjected to plastic deformation to have a flat plate shape along a plane direction.

Thereafter, as shown in FIG. 5, the adhesive 19 having flowability is injected into only the left-side opening portion 70 of the two opening portions 70, so that the adhesive 19 enters the central horizontal groove 40 from the opening portion 70 (a second step).

The adhesive 19 is, for example, liquid or semi-solid. Preferably, in view of obtaining excellent flowability in the central horizontal groove 40, the adhesive 19 is liquid. Examples of the adhesive 19 include curable type and pressure-sensitive adhesive type. Preferably, in view of obtaining excellent flowability (excellent flowability at the time of uncuring) and high adhesive properties, a curable type is used.

When the adhesive 19 is injected into the left-side opening portion 70 from above, it enters the four central horizontal grooves 40 from the left-side opening portion 70. Then, the adhesive 19 fills the four central horizontal grooves 40. To be specific, the adhesive 19 fills and goes through the four central horizontal grooves 40 from the left-side opening portion 70 to then reach the right-side opening portion 70. The adhesive 19 partially or completely fills the right-side opening portion 70.

As shown in FIG. 6, the adhesive 19 that fills the first horizontal groove 41 and the fourth horizontal groove 44 is in contact with (in tight contact with) both of the opto-electric hybrid board 2 and the lid 22. The adhesive 19 that fills the second horizontal groove 42 and the third horizontal groove 43 is in contact with (in tight contact with) both of the opto-electric hybrid board 2 and the main body 21.

Subsequently, when the adhesive 19 is the curable type, the adhesive 19 is cured.

The opto-electric hybrid board 2 adheres to the main body 21 and the lid 22 (the connector 3) to be fixed by the adhesive 19 (the second step).

In this manner, the opto-electric hybrid board connector 18 including the opto-electric hybrid board 2 and the connector 3 that accommodates the opto-electric hybrid board 2, and filling the central horizontal groove 40 and the opening portion 70 with the adhesive 19 is produced.

Thereafter, the core layer 11 in the opto-electric hybrid board connector 18 is optically connected to an optical member such as another optical waveguide and optical cable.

In the connector kit 1, when the opto-electric hybrid board 2 is accommodated in the accommodation space 29, the opto-electric hybrid board 2 and the connector 3 are communicated with the opening portion 70, and the central horizontal groove 40 that faces both of the opto-electric hybrid board 2 and the connector 3 is included. Thus, when the adhesive 19 is injected into the opening portion 70, the adhesive 19 enters the central horizontal groove 40 from the opening portion 70. As a result, the adhesive 19 fills the opening portion 70 and furthermore, the central horizontal groove 40. The adhesive 19 filling the central horizontal groove 40 faces both of the opto-electric hybrid board 2 and the connector 3, so that the adhesive force of the opto-electric hybrid board 2 with respect to the connector 3 can be improved.

When the air remains in the central horizontal groove 40, the adhesive 19 does not easily enter the central horizontal groove 40. In the connector kit 1, for example, of the two opening portions 70, the adhesive 19 enters the central horizontal groove 40 from the left-side opening portion 70, so that the air can be escaped from the right-side opening portion 40. Thus, the adhesive 19 can efficiently fill the central horizontal groove 40. As a result, the adhesive force of the opto-electric hybrid board 2 with respect to the connector 3 can be furthermore improved.

The connector 3 includes the bottom wall 23 and the lid 22, so that when the opto-electric hybrid board 2 is accommodated in the accommodation space 29, the opto-electric hybrid board 2 is sandwiched between the bottom wall 23 and the lid 22, while the pressure is applied thereto in the up-down direction, and the positioning of the opto-electric hybrid board 2 with respect to the connector 3 can be achieved. Thus, the opto-electric hybrid hoard 2 can accurately adhere to the connector 3.

In the connector kit 1, the adhesive force of the opto-electric hybrid board 2 with respect to the connector 3 can be improved.

According to the method for producing the opto-electric hybrid board connector 18, in the second step, the adhesive 19 can fill the central horizontal groove 40 along with the opening portion 70, so that the adhesive force of the opto-electric hybrid board 2 with respect to the connector 3 can be improved.

In the opto-electric hybrid board connector 18, the adhesive 19 fills the central horizontal groove 40 along with the opening portion 70. Thus, the adhesive force of the opto-electric; hybrid board 2 with respect the connector 3 can be improved.

Modified Example

Next, modified examples of the first embodiment are described. In the following each of the modified examples, the same reference numerals are provided for members and steps corresponding to each of those in the above-described first embodiment, and their detailed description is omitted. Each of the modified examples can be appropriately used in combination. Furthermore, in each of the modified examples, the same function and effect as that of the first embodiment can be achieved unless otherwise specified.

As shown in FIGS. 2A to 2D, in the connector kit 1 of the first embodiment, the central horizontal groove 40 includes the first horizontal groove 41, the second horizontal groove 42, the third horizontal groove 43, and the fourth horizontal groove 44. However, the central horizontal groove 40 is not limited to this. For example, the central horizontal groove 40 can also include any three, any two, or furthermore, any one of those selected from the group consisting of the first horizontal groove 41, the second horizontal groove 42, the third horizontal groove 43, and the fourth horizontal groove 44.

Each of the central horizontal grooves 40, that is, each of the first horizontal groove 41, the second horizontal groove 42, the third horizontal groove 43, and the fourth horizontal groove 44 is one. However, the number thereof is not limited to this, and the number thereof maybe in plural.

In the first embodiment, as shown by a solid line of HG 6, in the cross section along the thickness direction and the front-rear direction, the four central horizontal grooves 40 are disposed at the same position in the front-rear direction.

However, as shown by a phantom line of FIG. 6, the four central horizontal grooves 40 may be, for example, partially or completely displaced.

For example, when the opto-electric hybrid board 2 is accommodated in the accommodation space 29 and the lid 22 is provided in the main body 21, the fourth horizontal groove 44 is, for example, disposed at spaced intervals to the front side with respect to the first horizontal groove 41, in this manner, the first horizontal groove 41 and the fourth horizontal groove 44 are displaced in the front-rear direction. In this case, the fourth horizontal groove 44 faces the upper surface other than the first horizontal groove 41 in the opto-electric hybrid board 2, while the first horizontal groove 41 faces the lower surface other than the fourth horizontal groove 44 in the lid 22.

Meanwhile, as shown by the solid line of FIG. 6, when the first horizontal groove 41 and the fourth horizontal groove 44 are disposed at the same position in the front-rear direction, the first horizontal groove 41 is communicated with the fourth horizontal groove 44. The adhesive 19 filling (a border portion) is not in contact with any one of the opto-electric hybrid board 2 and the lid 22.

On the other hand, as shown by the phantom line of FIG. 6, when the first horizontal groove 41 and the fourth horizontal groove 44 are displaced in the front-rear direction, the adhesive 19 filling the first horizontal groove 41 is brought into contact with the above-described lower surface of the lid 22, and the adhesive 19 filling the fourth horizontal groove 44 is brought into contact with the above-described upper surface of the opto-electric hybrid board 2. Thus, the contact area of the adhesive 19 with respect to the lid 22 and the opto-electric hybrid board 2 can be increased. As a result, the adhesive force of the lid 22 with the opto-electric hybrid board 2 can be furthermore improved.

When the opto-electric hybrid hoard 2 is accommodated in the accommodation space 29 and the lid 2 is provided in the main body 21, the second horizontal groove 42 is, for example, disposed at the rear side with respect to the third horizontal groove 43 at spaced intervals thereto, in this manner, the second horizontal groove 42 and the third horizontal groove 43 are completely displaced in the front-rear direction. In this case, the third horizontal groove 43 faces the lower surface other than the second horizontal groove 42 in the opto-electric hybrid board 2, while the second horizontal groove 42 faces the upper surface other than the third horizontal groove 43 (the bottom surface of the bottom wall 23) in the main body 21.

Meanwhile, as shown by the solid line of FIG. 6, when the second horizontal groove 42 and the third horizontal groove 43 are disposed at the same position in the front-rear direction, the second horizontal groove 42 is communicated with the third horizontal groove 43. The adhesive 19 filling (the border portion) is not in contact with any one of the opto-electric hybrid board 2 and the lid 22.

On the other hand, as shown by the phantom line of FIG. 6, when the second horizontal groove 42 and the third horizontal groove 43 are displaced in the front-rear direction, the adhesive 19 filling the second horizontal groove 42 is brought into contact with the above-described upper surface of main body 21, and the adhesive 19 filling the third horizontal groove 43 is brought into contact with the above-described lower surface of the opto-electric hybrid board 2. Thus, the contact area of the adhesive 19 with respect to the main body 21 and the opto-electric hybrid board 2 can be increased. As a result, the adhesive force of the main body 21 with the opto-electric hybrid board 2 can be furthermore improved.

As shown in FIG. 4, in the first embodiment, the opening portion 70 is formed by the entire second connecting surface 28 in the front-rear direction. However, as shown by the phantom lines of FIGS. 2A to 2C, and the solid line of FIG. 7, by defining a part of the second connecting surface 28 in the front-rear direction as the opening portion-forming surface, the opening portion 70 can be also formed, Each of the two lid protruding portions 30 includes a lid recessed portion 34 that is recessed inwardly in the central portion in the front-rear direction. The lid recessed portion 34 is recessed in a generally rectangular shape when viewed from the top inwardly from the third connecting surface 33, and is cut out along the thickness direction. Meanwhile, when the lid 22 is provided in the main body 21, in the third connecting surface 33, a portion that is positioned at both sides in the front-rear direction with respect to the lid recessed portion 34 is brought into contact with the second connecting surface 28. In this manner, when the lid 22 is provided in the main body 21, the central portion in the front-rear direction of the second connecting surface 28 and the inner surface of the lid recessed portion 34 form the central upper opening 72 (the opening portion 70).

Also, the opening portion 70 can be formed by the second connecting surface 28 of the main body recessed portion 25 without providing the lid protruding portion 30 in the lid 22. In this case, both end surfaces in the width direction of the lid 22 are generally linear shapes when viewed from the top.

Also, the mounting portion 13 can be accommodated in the accommodation space 29 without providing the board protruding portion 14 in the mounting portion 13, In this case, both end surfaces in the width direction of the mounting portion 13 are generally linear shapes when viewed from the top.

Preferably, the board protruding portion 14 is provided in the mounting portion 13. The first front fitting surface 15 and the first rear fitting surface 16 of the board protruding portion 14 fit in the second front fitting surface 26 and the second rear fitting surface 27 of the main body recessed portion 25, and the positioning of the mounting portion 13 with respect to the main body 21 in the front-rear direction can be achieved.

As shown by the phantom lines of FIGS. 2A to 2D, the two board protruding portions 14 can also include a board recessed portion 35 having the same shape as that of the lid recessed portion 34. In this case, when the opto-electric hybrid board 2 is accommodated in the accommodation space 29, the central portion in the front-rear direction of the second connecting surface 28 and the inner surface of the board recessed portion 35 form the central lower opening 71 (the opening portion 70).

As shown by an arrow of FIG. 5A, in the first embodiment, the adhesive 19 is injected into the left-side opening portion 70. However, the injection is not limited to this. For example, the adhesive 19 can be also injected into the opening portions 7 at both sides in the right-left direction.

Preferably, the adhesive 19 is injected into one of the opening portions 70 of the two opening portions 70. According to this, the other opening portion 70 can be also used as an escape (escape path) of the air that remains in the central horizontal groove 40, or as a check window to check the front end of the adhesive 19 that goes through the central horizontal groove 40.

As shown by FIGS. 3 and 4, in the first embodiment, the two opening portions 70 are provided. However, the number thereof is not limited. Although not shown, the opening portion 70 may be any one of the left-side one and the right-side one.

Preferably, the plurality of (two) opening portions 70 are provided. According to this, the one can be used as an opening for injection, and the remaining one (the other one) can be used as the above-described escape of the air or the check window.

As shown by the phantom line of FIG. 7, a first side opening portion 77 can be also provided in the extending wall 24.

In this case, when the lid 22 is provided in the main body 21, the entire second connecting surface 28 of the main body 21 is completely in contact with the entire third connecting surface 33 of the lid 22. In this manner, the central upper opening 72 (ref: FIG. 5) based on the contact of the main body 21 with the lid 22 is not formed.

The first side opening portion 77 is an opening formed by the main body 21 only, and to be specific, is a through hole that passes through the extending wall 24 in the thickness direction (the width direction of the main body 21). The first side opening portion 77 communicates the outside with the opening portion 70.

As shown in FIG. 27A, the two first side opening portions 77 at both sides in the right-left direction may be positioned at a different position in the up-down direction, or as referred to (a code 28 of) FIG. 27B, may be positioned at the same position.

When the two first side opening portions 77 are positioned at the same position, the melding of the main body 21 is easy.

Meanwhile, as shown in FIG. 27A, when the position in the up-down direction of the two first side opening portions 77 is different, in the second step, the adhesive 19 is injected from the first side opening portion 77 that is positioned at a higher position to then enter and fill the central horizontal groove 40. Thereafter, the front end of the adhesive 19 is allowed to spill (leak) from the first side opening portion 77 that is positioned at a lower position and furthermore, it can be checked. Thus, the filling of the adhesive 19 with respect to the central horizontal groove 40 can be easily checked.

In the first embodiment, the electric circuit board 4 sequentially includes the metal supporting layer 6, the base insulating layer 7, the conductive layer 8, and the cover insulating layer 9 downwardly. However, for example, though not shown, the electric circuit board 4 can also sequentially include them upwardly.

In the first embodiment, the optical waveguide 5 sequentially includes the under clad layer 10, the core layer 11, and the over clad layer 12 upwardly. However, for example, though not shown, the optical waveguide 5 can also sequentially include them downwardly.

In the first embodiment, the opto-electric hybrid board 2 sequentially includes the electric circuit board 4 and the optical waveguide 5 upwardly. However, for example, though not shown, the opto-electric hybrid board 2 can also sequentially include them downwardly.

Second Embodiment

Next, the second embodiment is described. In the second embodiment, the same reference numerals are provided for members and steps corresponding to each of those in the above-described first embodiment, and their detailed description is omitted. In the second embodiment, the same function and effect as that of the first embodiment can be achieved unless otherwise specified.

As shown in FIGS. 8A to 8D and 9, the connector kit 1 further includes a rear vertical groove 50 (one example of the other side groove in the first direction that is disposed at the other side in the first direction). The rear vertical groove 50 is, for example, provided in the opto-electric hybrid board 2, the main body 21, and/or the lid 22. To be specific, for example, the rear vertical groove 50 is provided with at least any one of a first rear vertical groove 51 and a second rear vertical groove 52 provided in the opto-electric hybrid board 2, a third rear vertical groove 53 provided in the main body 21, and a fourth rear vertical groove 54 provided in the lid 22.

Next, an example in which the rear vertical groove 50 includes all (four) of the first rear vertical groove 51, the second rear vertical groove 52, the third rear vertical groove 53, and the fourth rear vertical groove 54 is described.

Each of the first rear vertical groove 51, the second rear vertical groove 52, the third rear vertical groove 53, and the fourth rear vertical groove 54 has a shape extending in the front-rear direction.

In the following, the first rear vertical groove 51, the second rear vertical groove 52, the third rear vertical groove 53, and the fourth rear vertical groove 54 are sequentially described. As for the second rear vertical groove 52, the third rear vertical groove 53, and the fourth rear vertical groove 54, the description of the structure or the like that is the same as that of the first rear vertical groove 51 is omitted.

Figure 10:
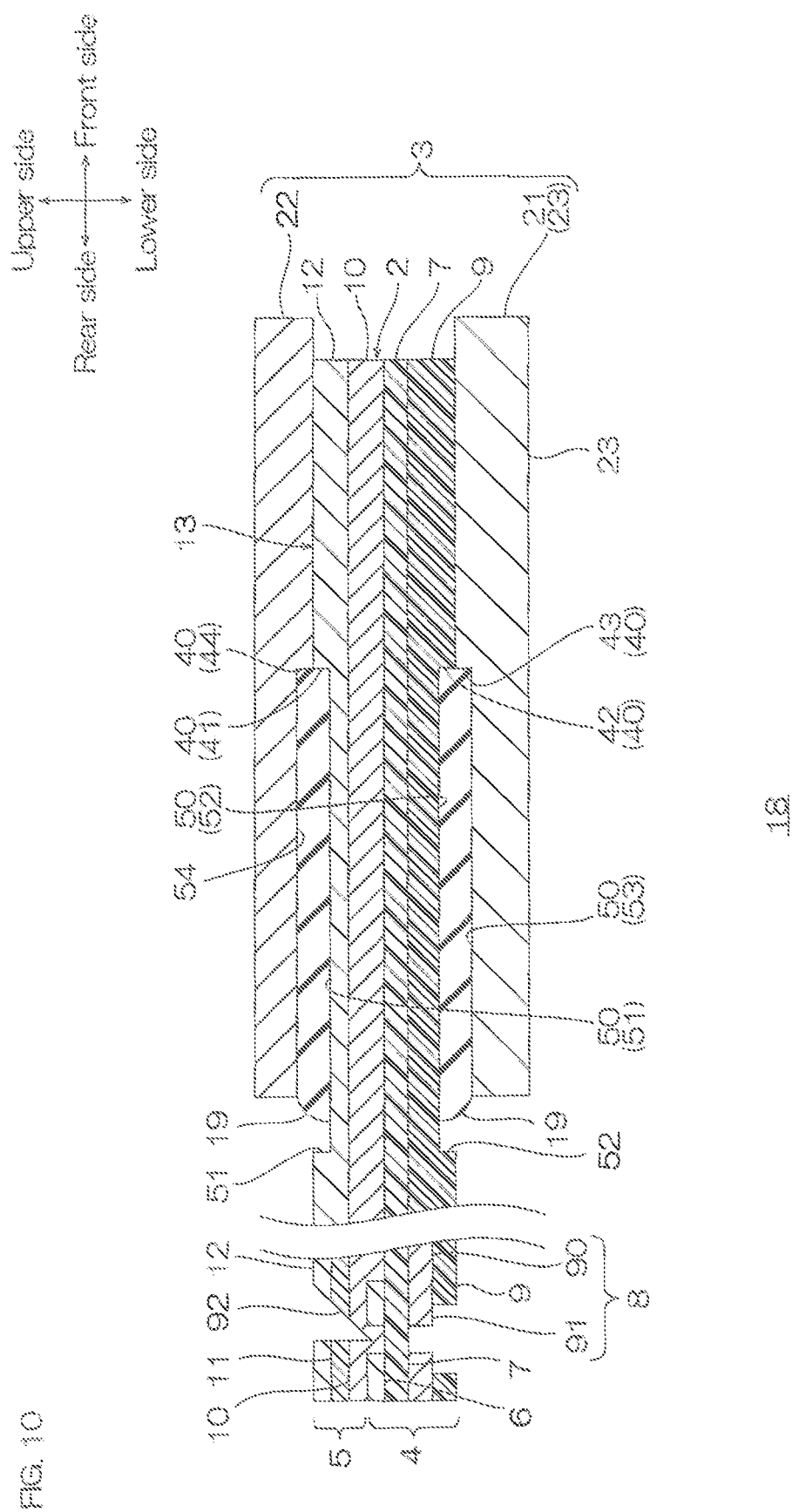
FIG. 10 shows a cross-sectional view along a longitudinal direction of the opto-electric hybrid board connector shown in FIG. 9.
Figure 11:
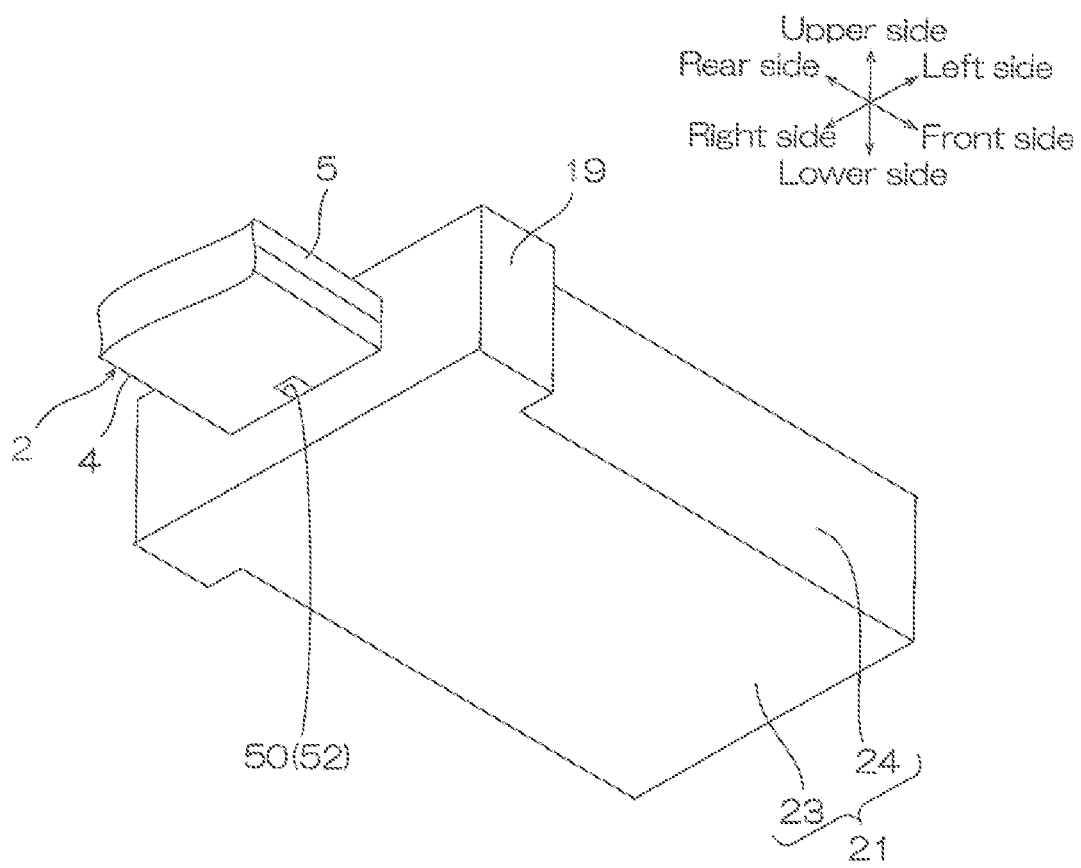
FIG. 11 shows a perspective view of the opto-electric hybrid board connector shown in FIGS. 9 and 10 when viewed from a rearward lower side.
Figure 12A:
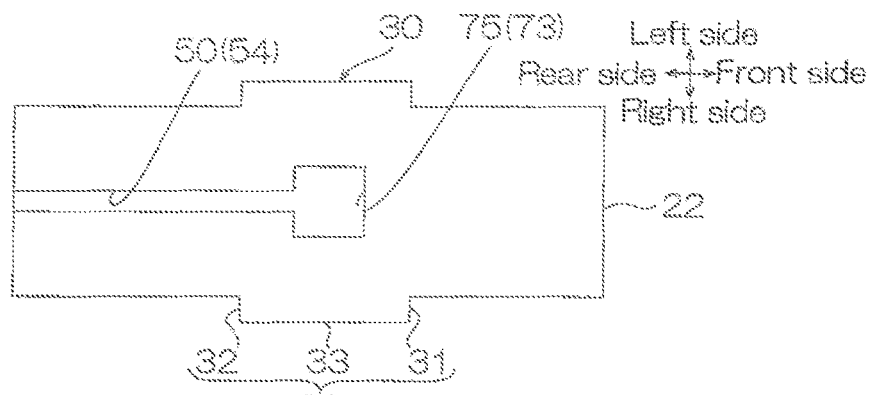
FIGS. 12A to 12D show plan views and bottom views of an opto-electric hybrid board connector kit of a third embodiment of the present invention.
Figure 12B:
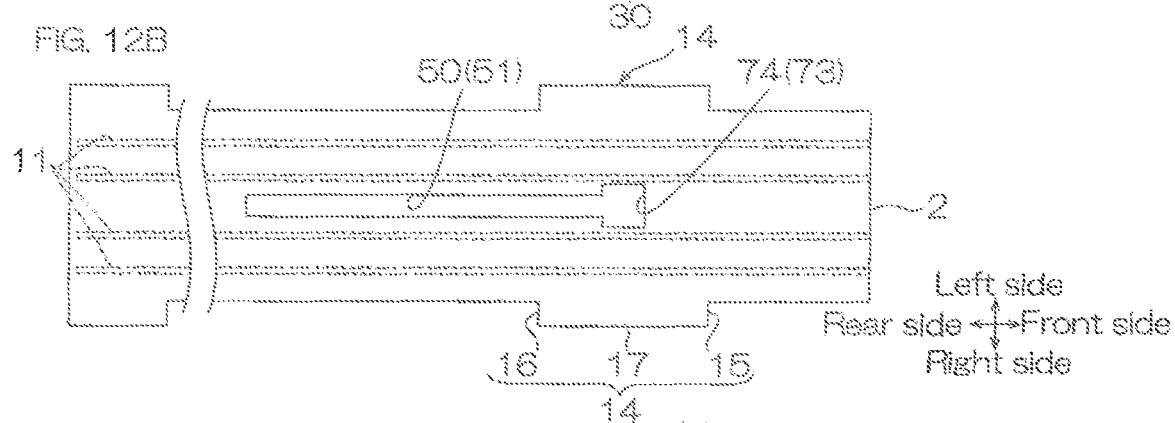
Figure 12C:
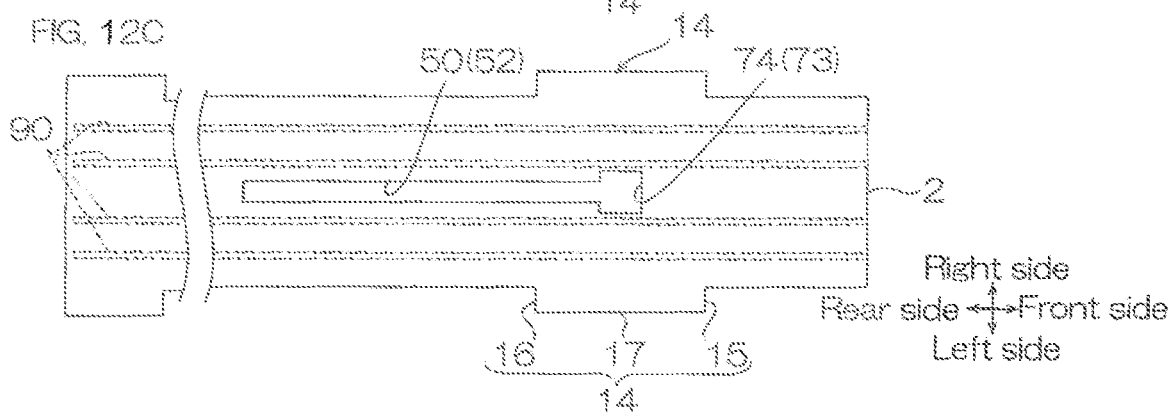
Figure 12D:
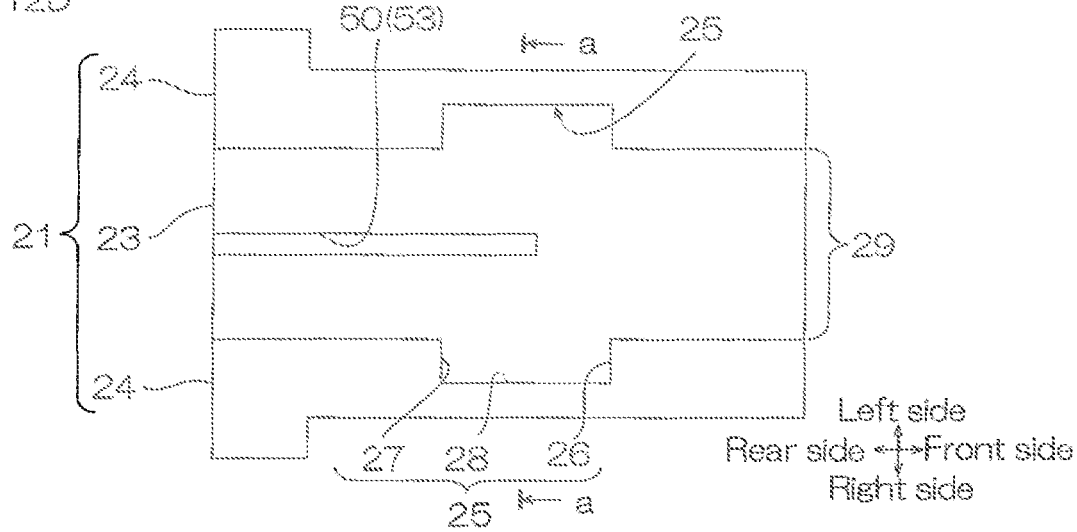
Figure 13:
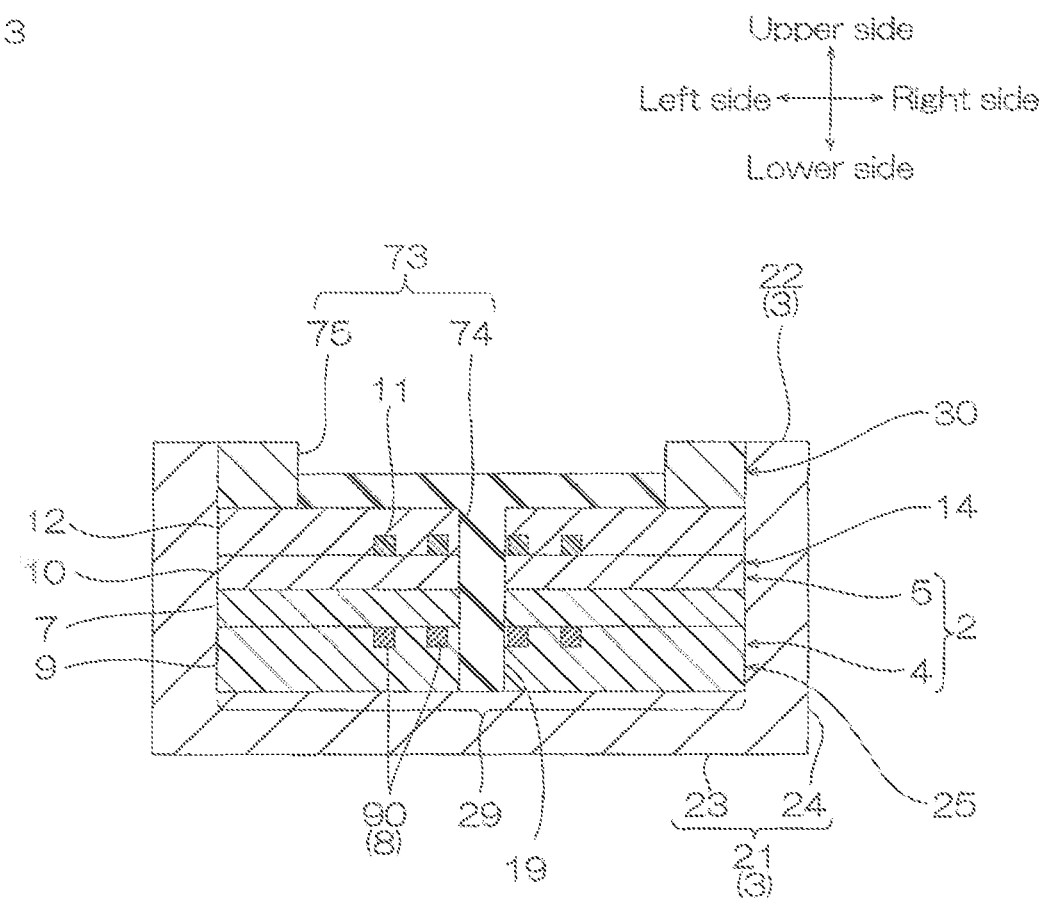
FIG. 13 shows a cross-sectional view corresponding to an a-a line of FIGS. 12A to 12D of opto-electric hybrid board connector produced from the opto-electric hybrid board connector kit shown in FIGS. 12A to 12C.
Figure 14:
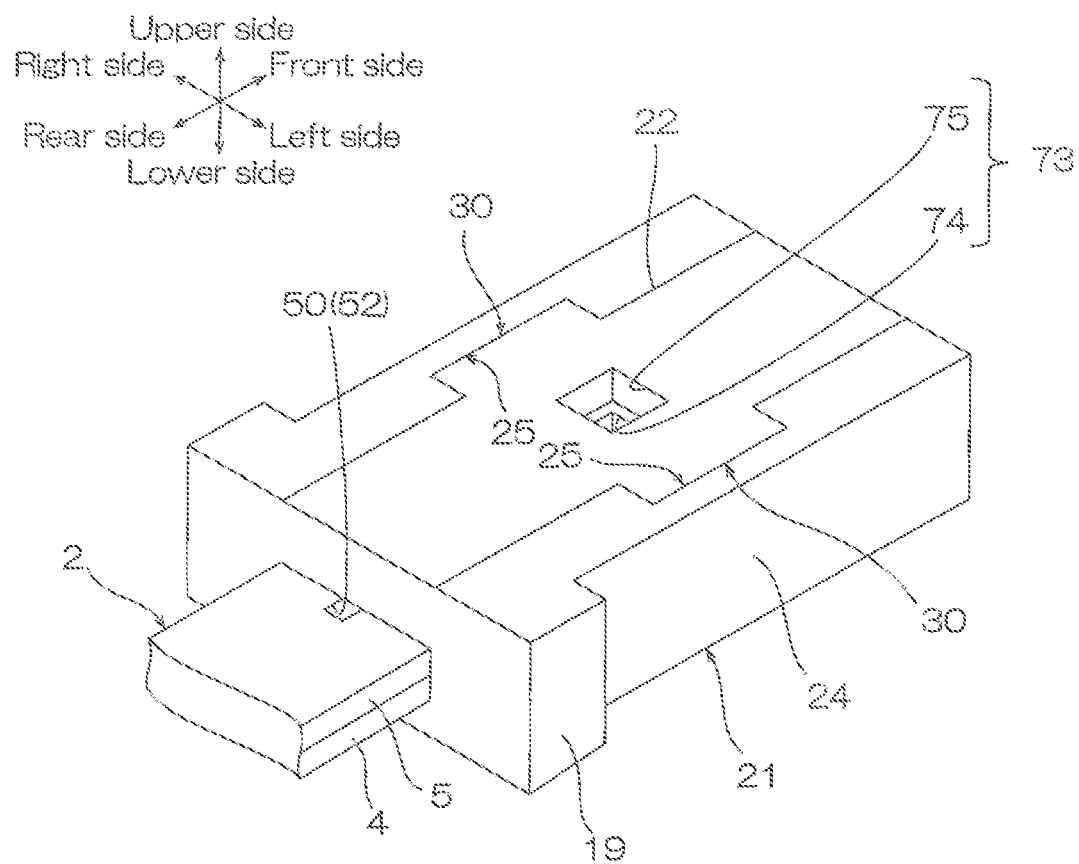
FIG. 14 shows a perspective view of the opto-electric hybrid board connector shown in FIG. 13 when viewed from a rearward upper side.

As shown in FIGS. 8B, 9, and 10, the first rear vertical groove 51 is provided on the upper surface of the opto-electric hybrid board 2. To be specific, the first rear vertical groove 51 is provided on the upper surface of the mounting portion 13 and the optical waveguide 5 at the immediately rear side of the mounting portion 13. The first rear vertical groove 51 has a generally linear shape when viewed from the top extending from the central portion of the mounting portion 13 rearwardly. The front end portion of the first rear vertical groove 51 is communicated with the first horizontal groove 41. Meanwhile, the rear end portion of the first rear vertical groove 51 is disposed at the rear side from the rear end surface of the lid 22, The first rear vertical groove 51 is parallel with the core layer 11 when viewed from the top.

The thickness (depth) of the first rear vertical groove 51 is the same as that of the first horizontal groove 41.

As shown in FIGS. 8C, 9, and 10, the second rear vertical groove 52 is provided on the lower surface of the opto-electric hybrid hoard 2. The second rear vertical groove 52 is provided on the lower surface of the mounting portion 13 and the optical waveguide 5 at the immediately rear side of the mounting portion 13. The second rear vertical groove 52 has a generally linear shape when viewed from the top extending from the central portion of the mounting portion 13 rearwardly. The front end portion of the second rear vertical groove 52 is communicated with the second horizontal groove 42. Meanwhile, the rear end portion of the second rear vertical groove 52 is disposed at the rear side from the rear end surface of the main body 21. The second rear vertical groove 52 is parallel with the core layer 11 and the wire 90 when viewed from the top. In short, the second rear vertical groove 52 is disposed and formed plane-symmetrically with respect to a phantom plane along the center in the up-down direction of the opto-electric hybrid board 2.

As shown in FIGS. 8D, 9, and 10, the third rear vertical groove 53 is provided in the main body 21. To be specific, the third rear vertical groove 53 is provided on the bottom surface of the bottom wall 23. To be specific, the third rear vertical groove 53 has a generally linear shape when viewed from the top extending from the central portion of the bottom wall 23 rearwardly. The front end portion of the third rear vertical groove 53 is communicated with the third horizontal groove 43. Meanwhile, the rear end edge of the third rear vertical groove 53 is exposed from the rear end surface of the bottom wall 23. When the opto-electric hybrid board 2 is accommodated in the accommodation space 29, the third rear vertical groove 53 is parallel with the core layer 11 when viewed from the top. The shape in cross section, the depth, and the width of the third rear vertical groove 53 are the same as those of the first rear vertical groove 51.

As shown in FIGS. 8A, 9, and 10, the fourth rear vertical groove 54 is provided on the lower surface of the lid 22. To be specific, the fourth rear vertical groove 54 has a generally linear shape when viewed from the top extending from the central portion of the lid 22 rearwardly. The rear end portion of the fourth rear vertical groove 54 is exposed toward the rear end surface of the lid 22. The front end portion of the fourth rear vertical groove 54 is communicated with the fourth horizontal groove 44. The shape in cross section, the depth, and the width of the fourth rear vertical groove 54 are the same as those of the first rear vertical groove 51.

As shown in FIGS. 9 and 10, when the opto-electric hybrid board 2 is stored in the storage space 29 and the lid 22 is provided in the main body 21, the first rear vertical groove 51, the second rear vertical groove 52, the third rear vertical groove 53, and the fourth rear vertical groove 54 are completely overlapped in the width direction.

Meanwhile, as shown in FIG. 10, the rear end portion of the first rear vertical groove 51 is exposed from the lid 22 upwardly. The rear end portion of the second rear vertical groove 52 is exposed from the main body 21 downwardly.

In the second embodiment, in the second step, the adhesive 19 enters the rear vertical groove 50 via the opening portion 70 and the central horizontal groove 40. To be more specific, the adhesive 19 reaches the front end portion of the rear vertical groove 50 from the central portion in the width direction of the central horizontal groove 40, and thereafter, the adhesive 19 fills the rear vertical groove 50, and progresses rearwardly.

Thereafter, when the excessive adhesive 19 spills (is escaped) from the rear end edges of the fourth rear vertical groove 54 and the first rear vertical groove 51, the rear end portion of the lid 22 is not used in the above-described connection, while the front end surfaces of the opto-electric hybrid board 2 and the lid 22 are connected to another optical member, so that the spilling (escape) does not cover (contaminate) the front end surface of the optical waveguide 5.

When the excessive adhesive 19 is spilled (escaped) from the rear end edges of the second rear vertical groove 52 and the third rear vertical groove 53, the rear end portion of the main body 21 is not used in the above-described connection, while the front end surfaces of the opto-electric hybrid board 2 and the main body 21 are connected to another optical member, so that the spilling (escape) does not cover (contaminate) the front end surface of the optical waveguide 5.

According to the second embodiment, when the excessive adhesive 19 having an amount more than necessary (required amount) for the adhesion of the connector 3 to the opto-electric hybrid board 2 is injected into the opening portion 70, the central horizontal groove 40, and the rear vertical groove 50, the above-described spilling of the excessive adhesive 19 is allowed. Thus, the required amount thereof can fill the rear vertical groove 50. As a result, the connector 3 can strongly adhere to the opto-electric hybrid board 2.

Modified Example

Next, modified examples of the second embodiment are described. In the following each of the modified examples, the same reference numerals are provided for members and steps corresponding to each of those in the above-described second embodiment, and their detailed description is omitted. Each of the modified examples can be appropriately used in combination. Furthermore, in each of the modified examples, the same function and effect as that of the second embodiment can be achieved unless otherwise specified.

As shown in FIGS. 8A to 8D, in the connector kit 1 of the second embodiment, the rear vertical groove 50 includes the first rear vertical groove 51, the second rear vertical groove 52, the third rear vertical groove 53, and the fourth rear vertical groove 54. However, the rear vertical groove 50 is not limited to this. For example, the rear vertical groove 50 can also include any three, any two, or furthermore, any one of those selected from the group consisting of the first rear vertical groove 51, the second rear vertical groove 52, the third rear vertical groove 53, and the fourth rear vertical groove 54.

Each of the rear vertical grooves 50, that is, each of the first rear vertical groove 51, the second rear vertical groove 52, the third rear vertical groove 53, and the fourth rear vertical groove 54 is one. However, the number thereof is not limited to this, and the number thereof may be in plural.

In the second embodiment, as shown in FIG. 9, in the cross section along the thickness direction and the width direction, the four rear vertical grooves 50 are disposed at the same position in the width direction.

However, as shown by the phantom line of FIG. 9, the four rear vertical grooves 50 may be, for example, partially or completely displaced.

For example, when the opto-electric hybrid board 2 is accommodated in the accommodation space 29 and the lid 22 is provided in the main body 21, the fourth rear vertical groove 54 is, for example, disposed at the right side with respect to the first rear vertical groove 51 at spaced intervals thereto. In this manner, the first rear vertical groove 51 and the fourth rear vertical groove 54 are displaced in the right-left (width) direction. In this case, the fourth rear vertical groove 54 faces the upper surface other than the first rear vertical groove 51 in the opto-electric hybrid board 2, while the first rear vertical groove 51 faces the lower surface other than the fourth rear vertical groove 54 in the lid 22.

Meanwhile, as shown by the solid line of FIG. 9, when the first rear vertical groove 51 and the fourth rear vertical groove 54 are disposed at the same position in the width direction, the first rear vertical groove 51 is communicated with the fourth rear vertical groove 54. The adhesive 19 filling (the border portion) is not in contact with any one of the opto-electric hybrid board 2 and the lid 22.

On the other hand, as shown by the phantom line of FIG. 9, when the first rear vertical groove 51 and the fourth rear vertical groove 54 are displaced in the width direction, the adhesive 19 filling the first rear vertical groove 51 is brought into contact with the above-described lower surface of the lid 22, and the adhesive 19 filling the fourth rear vertical groove 54 is brought into contact with the above-described upper surface of the opto-electric hybrid board 2. Thus, the contact area of the adhesive 19 with respect to the lid 22 and the opto-electric hybrid board 2 can be increased. As a result, the adhesive force of the lid 22 with the opto-electric hybrid board 2 can be furthermore improved.

When the opto-electric hybrid board 2 is accommodated in the accommodation space 29 and the lid 22 is provided in the main body 21, the second rear vertical groove 52 is, for example, disposed at the left side with respect to the third rear vertical groove 53 at spaced intervals thereto. In this manner, the second rear vertical groove 52 and the third rear vertical groove 53 are completely displaced in the right-left (width) direction. In this case, the third rear vertical groove 53 faces the lower surface other than the second rear vertical groove 52 in the opto-electric hybrid board 2, while the second rear vertical groove 52 faces the upper surface other than the third rear vertical groove 53 (the bottom surface of the bottom wall 23) in the main body 21.

Meanwhile, as shown by the solid line of FIG. 9, when the second rear vertical groove 52 and the third rear vertical groove 53 are disposed at the same position in the front-rear direction, the second rear vertical groove 52 is communicated with the third rear vertical groove 53. The adhesive 19 filling (the border portion) is not in contact with any one of the opto-electric hybrid board 2 and the lid 22.

On the other hand, as shown by the phantom line of FIG. 9, when the second rear vertical groove 52 and the third rear vertical groove 53 are displaced in the front-rear direction, the adhesive 19 filling the second rear vertical groove 52 is brought into contact with the above-described upper surface of the main body 21, and the adhesive 19 filling the third rear vertical groove 53 is brought into contact with the above-described lower surface of the opto-electric hybrid board 2. Thus, the contact area of the adhesive 19 with respect to the main body 21 and the opto-electric hybrid board 2 can be increased. As a result, the adhesive force of the main body 21 with the opto-electric hybrid board 2 can be furthermore improved.

As shown by the solid line of FIG. 8D, in the second step, the third rear vertical groove 53 is provided in the bottom wall 23. However, as shown by the phantom line of FIG. 8D and the solid line of FIG. 8E, the third rear vertical groove 53 can be also provided in the extending wall 24.

The third rear vertical groove 53 is provided in each of the inner surfaces of the two extending walls 24.

Also, when the third rear vertical groove 53 is provided in the extending wall 24, and furthermore, the thickness (height) of the third rear vertical groove 53 is thicker than or the same as the thickness of the mounting portion 13 (the opto-electric hybrid board 2), in the first step, the connector 3 in which the main body 21 and the lid 22 are unified can be also made. In this case, both end portions in the right-left direction of the mounting portion 13 are inserted forwardly into the third rear vertical groove 53 from the rear side.

Preferably, the main body 21 and the lid 22 as separate bodies constitute the connector 3. According to this, the mounting portion 13 can be pushed by the lid 22, so that the displacement of the mounting portion 13 with respect to the main body 21 is suppressed, and the opto-electric hybrid board 2 can accurately adhere to the connector 3 to be mounted.

In the second embodiment, the connector 3 includes the central horizontal groove 40.

However, as shown in FIGS. 12A to 14, the connector 3 can also include a third opening portion 73 instead of the central horizontal groove 40. When the opto-electric hybrid board 2 is accommodated in the accommodation space 29 and the lid 22 is provided in the main body 21, the third opening portion 73 is communicated with the front end portion of the rear vertical groove 50. The third opening portion 73 includes a fourth opening portion 74 and a fifth opening portion 75.

The fourth opening portion 74 is provided in the opto-electric hybrid board 2. The fourth opening portion 74 is a through hole that passes through the opto-electric hybrid board 2 in the thickness direction in the central portion of the mounting portion 13 in the opto-electric hybrid board 2. The fourth opening portion 74 is spaced apart from the inner side in the width direction with respect to both end edges in the width direction of the mounting portion 13. The fourth opening portion 74 has a generally rectangular shape when viewed from the top. The fourth opening portion 74 is continuous to the front end portions of the first rear vertical groove 51 and the second rear vertical groove 52.

The fifth opening portion 75 is provided in the lid 22. The fifth opening portion 75 is a through hole that passes through the lid 22 in the thickness direction in the central portion of the lid 22. The fifth opening portion 75 is spaced apart from the inner side in the width direction with respect to both end edges in the width direction of the lid 22. When the opto-electric hybrid board 2 is accommodated in the accommodation space 29 and the lid 22 is provided in the main body 21, the fifth opening portion 75 has a generally rectangular shape when viewed from the top that includes the fourth opening portion 74 and is larger than the fourth opening portion 74 when viewed from the top. The fifth opening portion 75 is continuous to the front end portion of the fourth rear vertical groove 54.

When the opto-electric hybrid board 2 is accommodated in the accommodation space 29 and the lid 22 is provided in the main body 21, the third opening portion 73 is communicated with the rear vertical groove 50.

In the modified example, in the second step, the adhesive 19 is injected into the third opening portion 73. Then, the adhesive 19 enters the rear vertical groove 50 from the third opening portion 73.

The shape of the third opening portion 73 is not particularly limited, and may have, for example, a generally circular shape when viewed from the top.

In the above-described modified example, as shown in FIGS. 12A to 14, the third opening portion 73 is provided in the lid 22. However, though not shown, for example, the third opening portion 73 can be also provided in the bottom wall 23. The third opening portion 73 (not shown in FIGS. 12A to 14) provided in the bottom wall 23 is defined as a seventh opening portion. The seventh opening portion, along with the fourth opening portion 74 of the opto-electric hybrid board 2, is included in the third opening portion 73. That is, the third opening portion 73 includes the seventh opening portion (not shown) and the fourth opening portion 74.

The seventh opening portion is a through hole that passes through the bottom wall 23 in the thickness direction in the central portion of the bottom wall 23. When the opto-electric hybrid board 2 is accommodated in the accommodation space 29 and the lid 22 is provided in the main body 21, the seventh opening portion has a generally rectangular shape when viewed from the top that includes the fourth opening portion 74 and is larger than the fourth opening portion 74 when viewed from the top. The seventh opening portion is continuous to the front end portion of the third rear vertical groove 53 shown in FIG. 12D. The seventh opening portion exposes the front end portion of the second rear vertical groove 52 in the opto-electric hybrid board 2 downwardly.

Meanwhile, the third opening portion 73 is not provided in the lid 22. Thus, the lid 22 closes the opto-electric hybrid board 2 from above.

In the modified example, the adhesive 19 enters the third rear vertical groove 53 of the bottom wall 23, the first rear vertical groove 51 and the second rear vertical groove 52 of the opto-electric hybrid board 2, and the fourth rear vertical groove 54 of the lid 22 via the seventh opening portion.

The third opening portion 73 can also consist of only the seventh opening portion without including the fourth opening portion 74. In this case, the adhesive 19 enters the third rear vertical groove 53 of the bottom wall 23 and the first rear vertical groove 51 of the opto-electric hybrid board 2 via the seventh opening portion.

Also, only any one of the first rear vertical groove 51 and the third rear vertical groove 53 is provided, and the adhesive 19 can also enter the one of these via the seventh opening portion.

Third Embodiment

Next, the third embodiment is described. In the third embodiment, the same reference numerals are provided for members and steps corresponding to each of those in the above-described first and second embodiments, and their detailed description is omitted. In the third embodiment, the same function and effect as that of the first and second embodiments can be achieved unless otherwise specified.

In FIGS. 15A to 15D, the core layer 11 is omitted to clearly show the arrangement and the shape of the central horizontal groove 40, a front vertical groove 60, and a front horizontal groove 80 (described later).

As shown in FIGS. 15A to 15D, the connector kit 1 includes the front vertical groove 60 (one example of a one side groove in the first direction disposed at one side in the first direction) instead of the rear vertical groove 50.

The front vertical groove 60 is provided in the opto-electric hybrid board 2, the main body 21, and/or the lid 22. The front vertical groove 60 is provided with at least any one of a first front vertical groove 61 and a second front vertical groove 62 provided in the opto-electric hybrid board 2, a third front vertical groove 63 provided in the main body 21, and a fourth front vertical groove 64 provided in the lid 22.

Next, an example in which the front vertical groove 60 includes all (four) of the first front vertical groove 61, the second front vertical groove 62, the third front vertical groove 63, and the fourth front vertical groove 64 is described.

Each of the first front vertical groove 61, the second front vertical groove 62, the third front vertical groove 63, and the fourth front vertical groove 64 has a shape extending in the front-rear direction.

In the following, the first front vertical groove 61, the second front vertical groove 62, the third front vertical groove 63, and the fourth front vertical groove 64 are sequentially described. As for the second front vertical groove 62, the third front vertical groove 63, and the fourth front vertical groove 64, the description of the structure or the like that is the same as that of the first front vertical groove 61 is omitted.

The first front vertical groove 61 is provided on the upper surface of the opto-electric hybrid board 2. The rear end portion of the first front vertical groove 61 is positioned at the central portion of the mounting portion 13. In this manner, the rear end portion of the first front vertical groove 61 is communicated with the first horizontal groove 41. Meanwhile, the front end portion of the first front vertical groove 61 is the front end portion of the mounting portion 13, and is positioned at the immediately front of the front end edge. That is, the front end portion of the first front vertical groove 61 is spaced apart from the front end surface of the mounting portion 13 in the front-rear direction. In short, the first front vertical groove 61 extends from the central portion of the mounting portion 13 until the immediately front of the front end edge, and does not reach the front end surface of the mounting portion 13. The shape in cross section of the first front vertical groove 61 is the same as that of the first horizontal groove 41.

The second front vertical groove 62 is provided on the lower surface of the opto-electric hybrid board 2. The rear end portion of the second front vertical groove 62 is positioned at the central portion of the mounting portion 13. In this manner, the rear end portion of the second front vertical groove 62 is communicated with the second horizontal groove 42. Meanwhile, the front end portion of the second front vertical groove 62 is the front end portion of the mounting portion 13, and is positioned at the immediately front of the front end edge. That is, the front end portion of the second front vertical groove 62 is spaced apart from the front end surface of the mounting portion 13 in the front-rear direction. The second front vertical groove 62 extends from the central portion of the mounting portion 13 until the immediately front of the front end edge, and does not reach the front end surface of the mounting portion 13. In short, the second front vertical groove 62 is disposed and formed plane-symmetrically with respect to the phantom plane along the center in the up-down direction of the opto-electric hybrid board 2.

The third front vertical groove 63 is provided on the bottom surface of the bottom wall 23. The rear end portion of the third front vertical groove 63 is communicated with the third horizontal groove 43. Meanwhile, when the opto-electric hybrid board 2 is accommodated in the accommodation space 29, the front end portion of the third front vertical groove 63 is disposed at the rear side of the front end edge of the mounting portion 13 at spaced intervals thereto. In short, when the opto-electric hybrid board 2 is accommodated in the accommodation space 29, the third front vertical groove 63 has a shape of being overlapped with the second front vertical groove 62 when viewed from the top. The shape in cross section of the third front vertical groove 63 is the same as that of the first front vertical groove 61.

The fourth front vertical groove 64 is provided on the lower surface of the lid 22. The rear end portion of the fourth front vertical groove 64 is communicated with the fourth horizontal groove 44. Meanwhile, when the opto-electric hybrid board 2 and the main body 21 are accommodated in the accommodation space 29, the front end portion of the fourth front vertical groove 64 is disposed at the rear side of the front end edge of the mounting portion 13 at spaced intervals thereto. In short, when the opto-electric hybrid board 2 and the main body 21 are accommodated in the accommodation space 29, the fourth front vertical groove 64 has a shape of being overlapped with the third front vertical groove 63 when viewed from the top. The shape in cross section of the fourth front vertical groove 64 is the same as that of the second front vertical groove 62.

In the third embodiment, in the second step, the adhesive 19 enters the front vertical groove 60 via the opening portion 70 and the central horizontal groove 40. To be more specific, the adhesive 19 reaches the front end portion of the front vertical groove 60 from the central portion in the width direction of the central horizontal groove 40, and in this manner, the adhesive 19 fills the front vertical groove 60.

A gap is formed in the front-rear direction between the front end portions of the first front vertical groove 61 and the fourth front vertical groove 64, and the front end surface of the mounting portion 13. A gap is formed in the front-rear direction between the front end portions of the second front vertical groove 62 and the third front vertical groove 63, and the front end surface of the mounting portion 13. In the gap, the upper surface of the opto-electric hybrid board 2 is in contact with the lower surface of the lid 22, and the lower surface of the opto-electric hybrid board 2 is in contact with the upper surface of the main body 21. Thus, the adhesive 19 is controlled to contaminate the front end surface of the optical waveguide 5.

When the opto-electric hybrid board 2 is accommodated in the accommodation space 29 and the lid 22 is provided in the main body 21, the front vertical groove 60 can be also overlapped with the front end surface of the opto-electric hybrid board 2. For example, the front end portions of the second front vertical groove 62 and the third front vertical groove 63 can be exposed from the front end surface of the opto-electric hybrid board 2. The front end edges of the first front vertical groove 61 and the fourth front vertical groove 64 can be also positioned at the front side with respect to the front end surface of the opto-electric hybrid board 2.

Preferably, the front end portion of the front vertical groove 60 is positioned at the rear side with respect to the front end surface of the opto-electric hybrid board 2. In this manner, the contamination of the above-described adhesive 19 to the front end surface of the optical waveguide 5 can be prevented.

Also, by the tight contact of the lid 22 with the opto-electric hybrid board 2 and the main body 21 based on the pushing of the lid 22 with respect to the opto-electric hybrid board 2, the above-described contamination can be furthermore prevented.

In the second step, the adhesive 19 can be also injected into the opening portion 70 without pushing the opto-electric hybrid board 2 by the lid 22.

Preferably, the opto-electric hybrid board 2 is pushed by the lid 22. In this manner, the lid 22, the opto-electric hybrid board 2, and the main body 21 are brought into tight contact with each other, and the spilling of the above-described adhesive 19 toward the front side can be furthermore prevented.

Modified Example

Next, modified examples of the third embodiment are described. In the following each of the modified examples, the same reference numerals are provided for members and steps corresponding to each of those in the above-described third embodiment, and their detailed description is omitted. Each of the modified examples can be appropriately used in combination. Furthermore, in each of the modified examples, the same function and effect as that of the third embodiment can be achieved unless otherwise specified.

As shown in FIGS. 15A to 15D, in the connector kit 1 of the third embodiment, the front vertical groove 60 includes the first front vertical groove 61, the second front vertical groove 62, the third front vertical groove 63, and the fourth front vertical groove 64. However, the front vertical groove 60 is not limited to this. For example, the front vertical groove 60 can also include any three, any two, or furthermore, any one of those selected from the group consisting of the first front vertical groove 61, the second front vertical groove 62, the third front vertical groove 63, and the fourth front vertical groove 64.

Each of the front vertical grooves 60, that is, each of the first front vertical groove 61, the second front vertical groove 62, the third front vertical groove 63, and the fourth front vertical groove 64 is one. However, the number thereof is not limited to this, and the number thereof maybe in plural.

In the cross section along the thickness direction and the width direction, the four front vertical grooves 60 are disposed at the same position in the width direction. However, the four front vertical grooves 60 may be, for example, partially or completely displaced.

For example, as shown in FIG. 9, when the opto-electric hybrid board 2 is accommodated in the accommodation space 29 and the lid 22 is provided in the main body 21, the fourth front vertical groove 64 is, for example, disposed at the right side with respect to the first front vertical groove 61 at spaced intervals thereto. In this manner, the first front vertical groove 61 and the fourth front vertical groove 64 are displaced in the right-left (width) direction. In this case, the fourth front vertical groove 64 faces the upper surface other than the first front vertical groove 61 in the opto-electric hybrid board 2, while the first front vertical groove 61 faces the lower surface other than the fourth front vertical groove 64 in the lid 22.

Meanwhile, when the first front vertical groove 61 and the fourth front vertical groove 64 are disposed at the same position in the width direction, the first front vertical groove 61 is communicated with the fourth front vertical groove 64. The adhesive 19 filling (the border portion) is not in contact with any one of the opto-electric hybrid board 2 and the lid 22.

On the other hand, when the first front vertical groove 61 and the fourth front vertical groove 64 are displaced in the width direction, the adhesive 19 filling the first front vertical groove 61 is brought into contact with the above-described lower surface of the lid 22, and the adhesive 19 filling the fourth front vertical groove 64 is brought into contact with the above-described upper surface of the opto-electric hybrid board 2. Thus, the contact area of the adhesive 19 with respect to the lid 22 and the opto-electric hybrid board 2 can be increased. As a result, the adhesive force of the lid 22 with the opto-electric hybrid board 2 can be furthermore improved.

When the opto-electric hybrid board 2 is accommodated in the accommodation space 29 and the lid 22 is provided in the main body 21, the second front vertical groove 62 is, for example, disposed at the left side with respect to the third front vertical groove 63 at spaced intervals thereto. In this manner, the second front vertical groove 62 and the third front vertical groove 63 are completely displaced in the right-left (width) direction. In this case, the third front vertical groove 63 faces the lower surface other than the second front vertical groove 62 in the opto-electric hybrid board 2, while the second front vertical groove 62 faces the upper surface other than the third front vertical groove 63 (the bottom surface of the bottom wall 23) in the main body 21.

Meanwhile, when the second front vertical groove 62 and the third front vertical groove 63 are disposed at the same position in the front-rear direction, the second front vertical groove 62 is communicated with the third front vertical groove 63. The adhesive 19 filling (the border portion) is not in contact with any one of the opto-electric hybrid board 2 and the lid 22.

On the other hand, when the second front vertical groove 62 and the third front vertical groove 63 are displaced in the front-rear direction, the adhesive 19 filling the second front vertical groove 62 is brought into contact with the above-described upper surface of the main body 21, and the adhesive 19 filling the third front vertical groove 63 is brought into contact with the above-described lower surface of the opto-electric hybrid board Thus, the contact area of the adhesive 19 with respect to the main body 21 and the opto-electric hybrid board 2 can be increased. As a result, the adhesive force of the main body 21 with the opto-electric hybrid board 2 can be furthermore improved.

As shown by the bold phantom lines of FIGS. 15A to 15D and the solid line of FIG. 15E, in the front end portion of the front vertical groove 60, the front horizontal groove 80 that is communicated with the front end portion thereof can be also provided.

The front horizontal groove 80 is a groove along the width direction, and has the same shape as that of the central horizontal groove 40 when viewed in cross section. The front horizontal groove 80 is provided in the front end portion of the front vertical groove 60. The front horizontal groove 80 is provided with at least any one of a first front horizontal groove 81 provided on the upper surface of the opto-electric hybrid board 2, a second front horizontal groove 82 provided on the lower surface of the opto-electric hybrid board 2, a third front horizontal groove 83 provided on the upper surface of the bottom wall 23 of the main body 21, and a fourth front horizontal groove 84 provided on the lower surface of the lid 22.

Furthermore, as shown by the phantom line of FIG. 15E, an up-down groove 85 can be also provided at the inner surface of the extending wall 24 so as to be continuous to the lower end portion of the third front horizontal groove 83.

Figure 16:
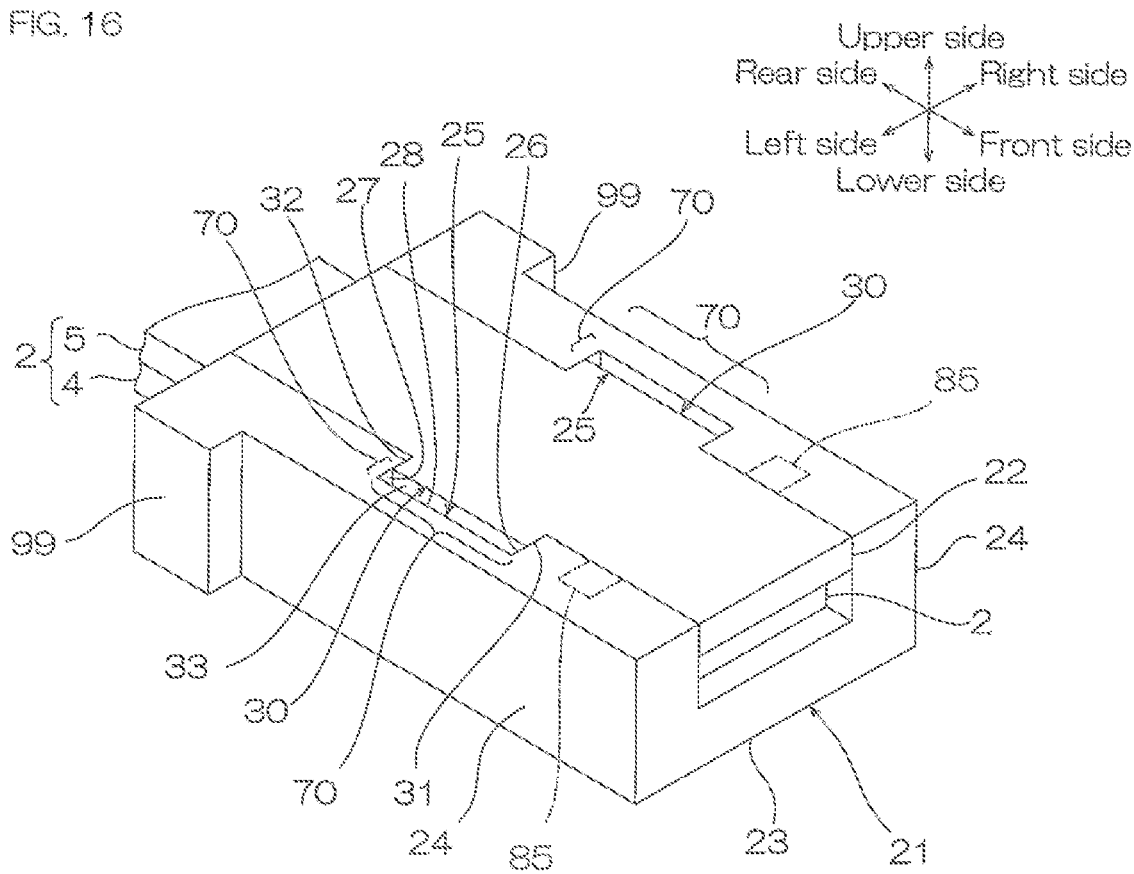
FIG. 16 shows a perspective view of an opto-electric hybrid board connector produced from the opto-electric hybrid board connector kit shown in FIGS. 15A to 15E when viewed from an upward front side.

As shown in FIG. 16, the up-down groove 85 extends in the up-down direction, and is exposed on the upper surface of the extending wall 24.

According to the modified example, the adhesive 19 that reaches the front of the front vertical groove 60 subsequently enters the front horizontal groove 80. Thereafter, the adhesive 19 can progress (rise) upwardly in the front horizontal groove 80.

As shown in FIGS. 17A to 17C, the third opening portion 73 can be also provided instead of the central horizontal groove 40. As shown in FIGS. 17A to 17C, the core layer 11 is omitted to clearly show the arrangement and the shape of the central horizontal groove 40 and the rear vertical groove 50.

Furthermore, as shown by the thin phantom lines of FIGS. 15A to 15C, a sixth opening portion 76 can be also provided in the front end portion of the front vertical groove 60.

The sixth opening portion 76 is provided in the lid 22 and/or the opto-electric hybrid board 2. For example, the sixth opening portion 76 is provided with at least any one of a front lower opening 66 provided in the opto-electric hybrid board 2 and a front upper opening 67 provided in the lid 22.

The front lower opening 66 is provided in the front end portion of the opto-electric hybrid board 2. The front lower opening 66 is a through hole that passes through the opto-electric hybrid board 2 in the thickness direction in a generally rectangular shape when viewed from the top. The front lower opening 66 is communicated with the front end portions of the second front vertical groove 62 and the third front vertical groove 63.

The front upper opening 67 is provided in the front end portion of the lid 22. The front upper opening 67 is a through hole that passes through the lid 22 in the thickness direction in a generally rectangular shape when viewed from the top. The front tipper opening 67 is communicated with the front end portion of the fourth front vertical groove 64.

As shown by the phantom lines of FIGS. 17A to 17C, both of the third opening portion 73 and the sixth opening portion 76 can be also provided.

Other modified examples are described. In the following, the same reference numerals are provided for members and steps corresponding to each of those in the above-described first to third embodiments and the modified examples thereof, and their detailed description is omitted. Each of the modified examples can be appropriately used in combination. Furthermore, in each of the following modified examples, the same function and effect as that of the first to third embodiments and the modified examples thereof can be achieved unless otherwise specified.

Figure 18A:
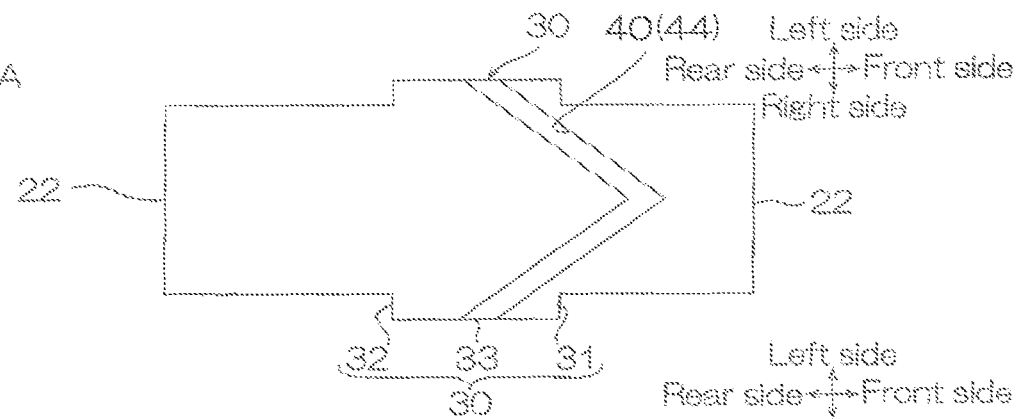
FIGS. 18A to 18D show plan views and bottom views of the opto-electric hybrid board connector kit of the further modified example.
Figure 18B:
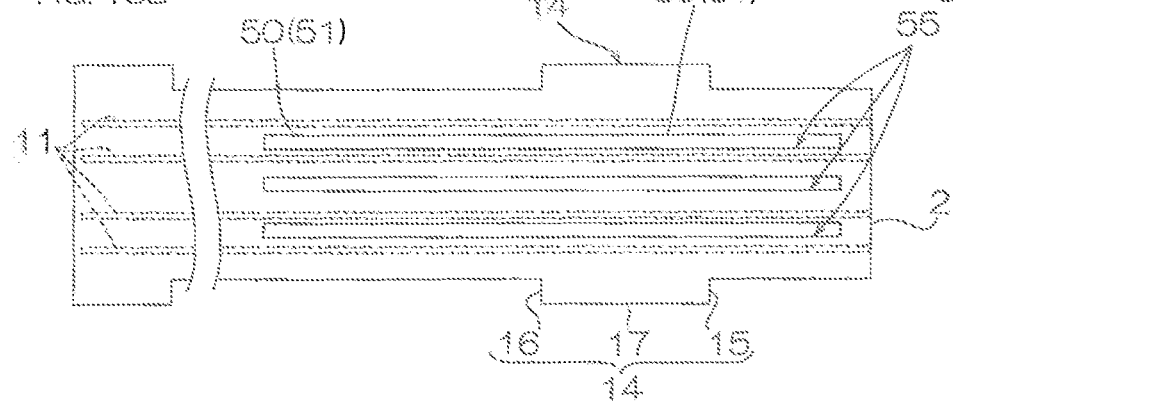
Figure 18C:
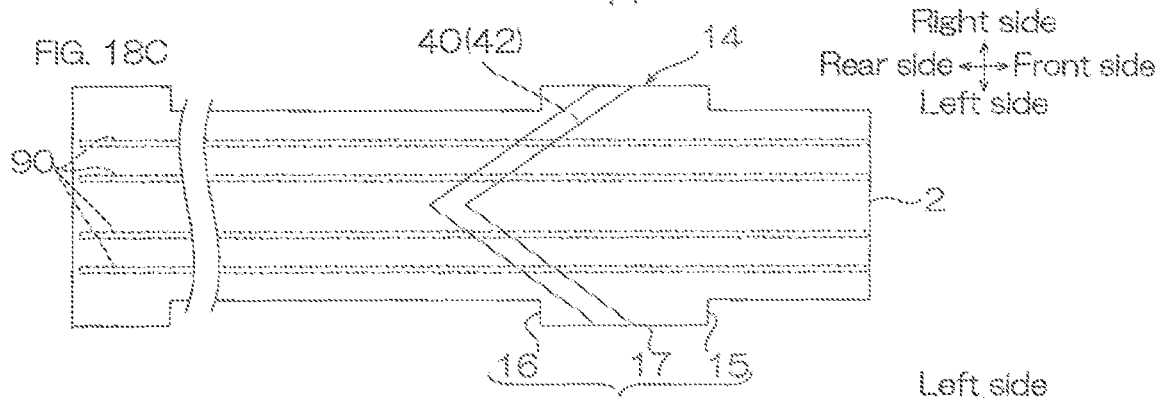

As shown in FIGS. 18A and 18C, the central horizontal groove 40 can also bend.

As shown in FIG. 18A, the fourth horizontal groove 44 (the central horizontal groove 40) is, for example, included in the lid 22, and has a generally L-shape when viewed from the top in which a bending point is positioned at the front side with respect to the lid protruding portion 30. In this case, when the opto-electric hybrid board 2 is accommodated in the accommodation space 29 and the lid 22 is provided in the main body 21, in the central horizontal groove 40, the bending point is disposed at the rear side with respect to the front end surface of the opto-electric hybrid board 2 at spaced intervals thereto, so that the same function as that of the fourth front vertical groove 64 (the front vertical groove 60) shown in FIG. 15A and illustrated in the third embodiment can be achieved.

As shown in FIG. 18C, the bending point of the central horizontal groove 40 can be also positioned at the rear side with respect to the board protruding portion 14.

Figure 18D:
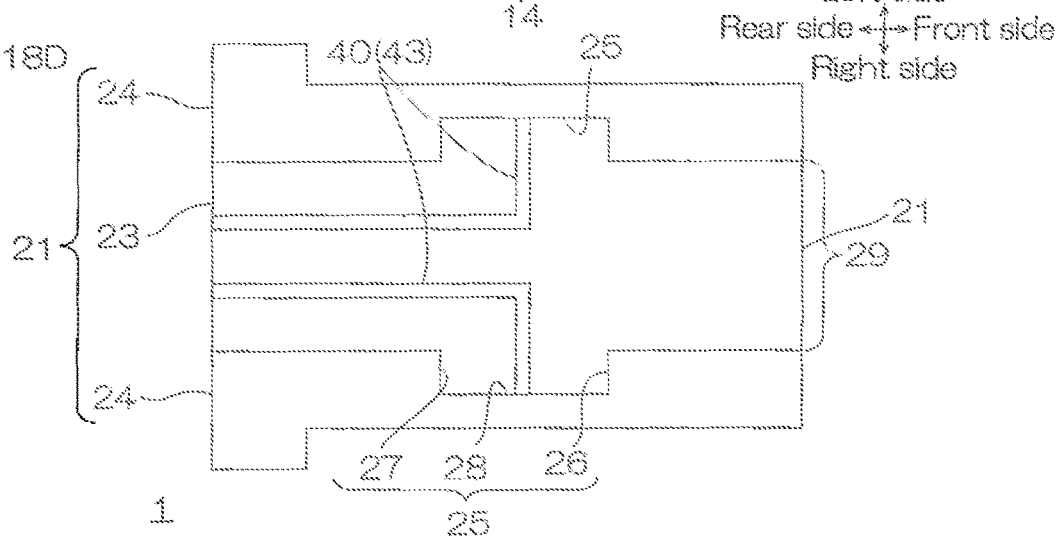

Furthermore, as shown in FIG. 18D, when projected in the width direction, the bending point of the central horizontal groove 40 can be overlapped with the main body recessed portion 25, and the rear end portion can be also exposed on the rear end surface of the main body 21. Thus, the central horizontal groove 40 can achieve the same function as that of the third rear vertical groove 53 (the rear vertical groove 50) shown in FIG. 8D and illustrated in the second embodiment.

As shown in FIG. 18B, the rear vertical groove 50 is continuous to the front vertical groove 60 in the front-rear direction, so that a vertical groove 55 can be also formed.

When the opto-electric hybrid board 2 is accommodated in the accommodation space 29 and the lid 22 is provided in the main body 21, in the opto-electric hybrid board 2, the front end portion of the vertical groove 55 is positioned at the immediately rear side of the front end surface of the opto-electric hybrid board 2, and the rear end portion thereof is positioned at the immediately rear side of the rear end surface of the connector 3 (or the rear end edge of the mounting portion 13).

Figure 19A:
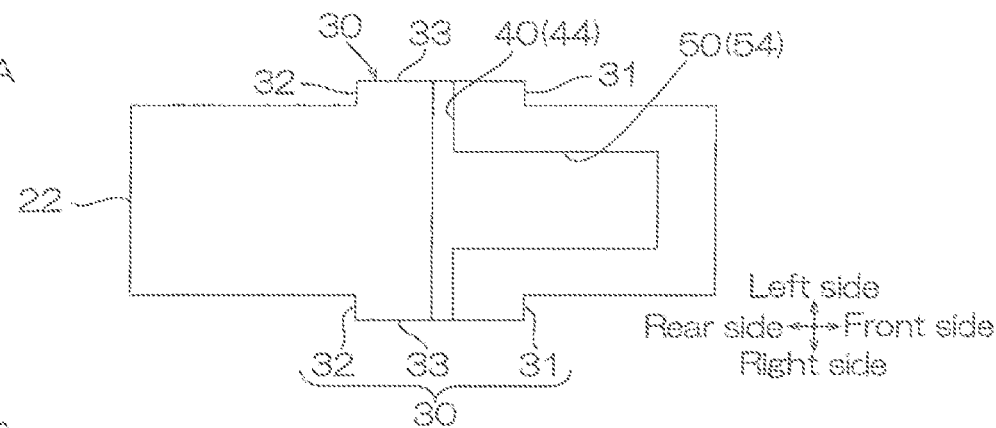
FIGS. 19A to 19D show plan views and bottom views of the opto-electric hybrid board connector kit of the further modified example.

As shown in FIG. 19A, the front vertical groove 60 (the fourth front vertical groove 64, ref FIG. 15A) may be formed wide.

Figure 19B:
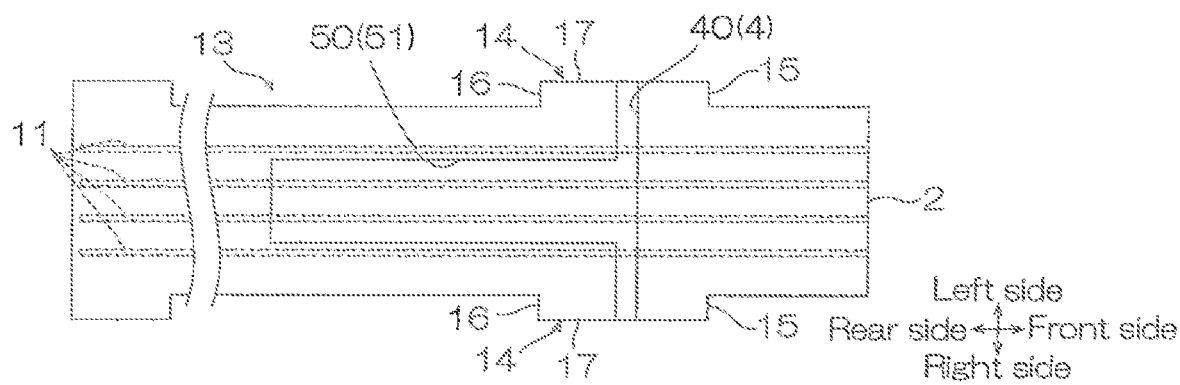

As shown in FIG. 19B, the rear vertical groove 50 (the first rear vertical groove 51, ref FIG. 8B) may be formed wide.

Figure 19C:
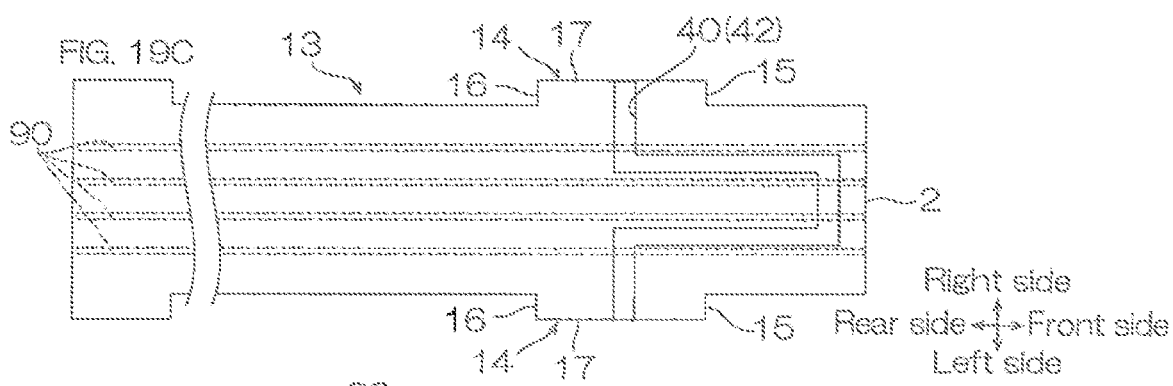
Figure 19D:
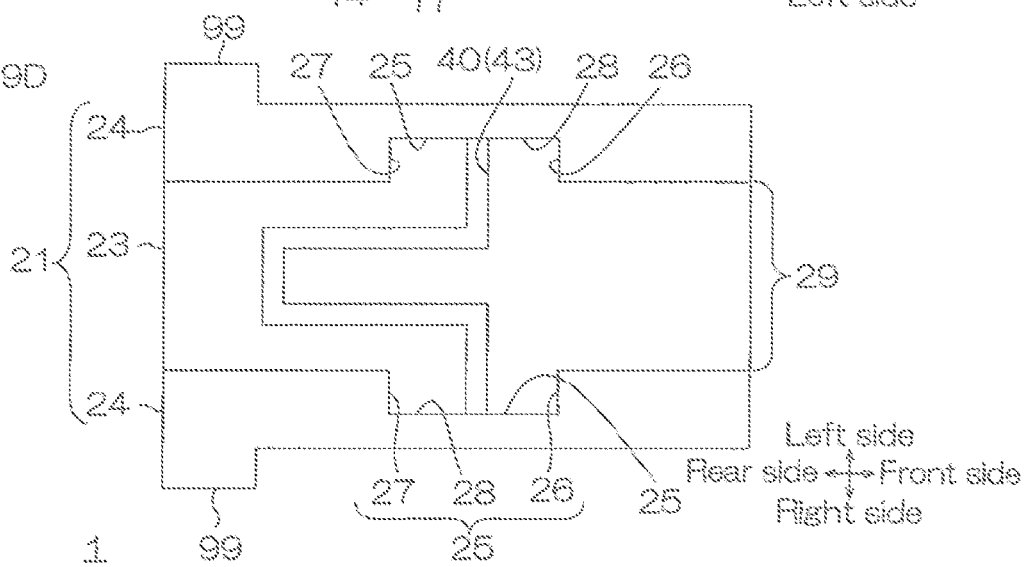

As shown in FIGS. 19C and 19D, the central horizontal groove 40 (the second horizontal groove 42, ref FIG. 18A) can also have the plurality of bending points. The central horizontal groove 40 has the plurality of (four) bending points, and has a meandering shape when viewed from the top.

As shown in FIG. 19C, when projected in the width direction, the bending point is positioned at a position that is overlapped with the board protruding portion 14, and a position that is the front side with respect to the overlapped position.

Meanwhile, as shown in FIG. 19C, when projected in the width direction, the bending point is positioned at a position that is overlapped with the main body recessed portion 25, and a position that is the rear side with respect to the overlapped position.

SPECIFIC EXAMPLES

Each of the embodiments and each of the modified examples described above may be used in any combination.

Preferable specific examples are shown in the following.

Specific Example 1

As shown in FIGS. 20A to 23C, the connector kit 1 includes the vertical groove 55, the third horizontal groove 43, the third rear vertical groove 53, and the fourth horizontal groove 44.

The vertical groove 55 is provided on the upper surface of the opto-electric hybrid board 2. The lower surface of the opto-electric hybrid board 2 does not include a groove.

The third horizontal groove 43 and the third rear vertical groove 53 are provided on the bottom wall 23.

The fourth horizontal groove 44 is provided in the lid 22.

In Specific Example 1, in the first step, when the opto-electric hybrid board 2 is accommodated in the accommodation space 29 and the lid 22 is provided in the main body 21, each of both end portions in the right-left direction of the third horizontal groove 43 is communicated with each of the two opening portions 70, and each of both end portions in the right-left direction of the fourth horizontal groove 44 is communicated with each of the two opening portions 70. The central portion in the front-rear direction of the vertical groove 55 is communicated with the fourth horizontal groove 44. Furthermore, the front end portion of the third rear vertical groove 53 is communicated with the third horizontal groove 43.

In the second step, when the adhesive 19 is injected into the left-side opening portion 70, the adhesive 19 reaches each of the insides of the fourth horizontal groove 44 and the third horizontal groove 43 from each of the left end portions of the fourth horizontal groove 44 and the third horizontal groove 43, subsequently, fills and goes through each of the fourth horizontal groove 44 and the third horizontal groove 43, and thereafter, reaches the right-side opening portion 70.

Meanwhile, the adhesive 19 filling the fourth horizontal groove 44 reaches the central portion in the front-rear direction of the vertical groove 55, branches off from the central portion in the front-rear direction of the vertical groove 55 in the front-rear direction, progresses to fill the vertical groove 55 toward both sides in the front-rear direction, and then, reaches both end portions in the front-rear direction of the vertical groove 55. Among all, in the rear end portion of the vertical groove 55, the adhesive 19 is allowed to spill from the rear end surface of the lid 22. However, the adhesive 19 does not contaminate the front end surface of the opto-electric hybrid board 2.

On the other hand, the adhesive 19 filling the third horizontal groove 43 progresses to fill the third rear vertical groove 53 from the front end portion of the third rear vertical groove 53 rearwardly, and reaches the rear end portion of the third rear vertical groove 53. At this time, in the rear end portion of the third rear vertical groove 53, the adhesive 19 is allowed to spill from the rear end surface of the main body 21.

Figure 20A:
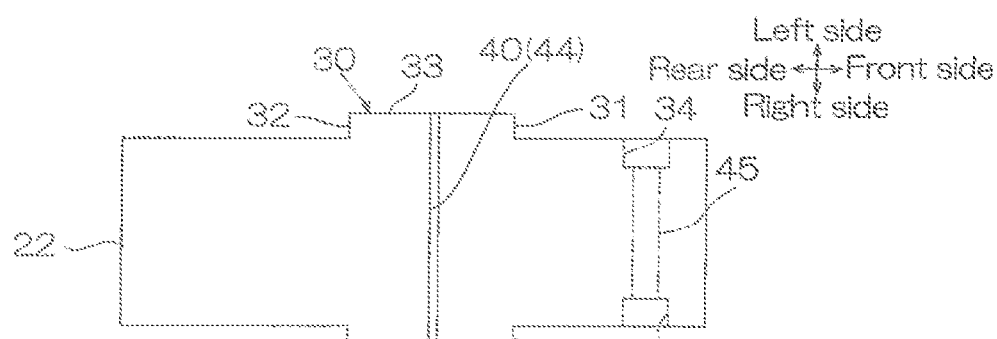
FIGS. 20A to 20D show plan views and bottom views of an opto-electric hybrid board connector kit of Specific Example 1 of the present invention.
Figure 20B:
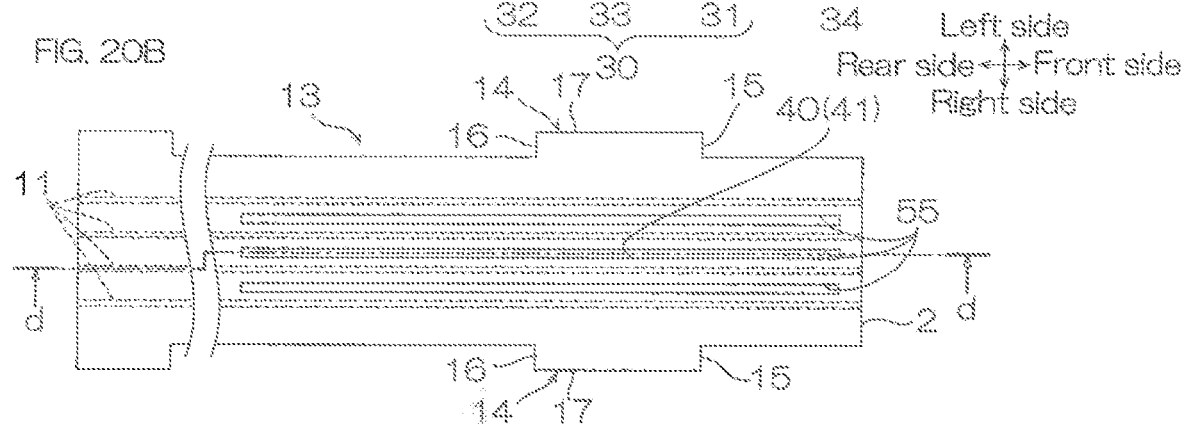
Figure 20C:
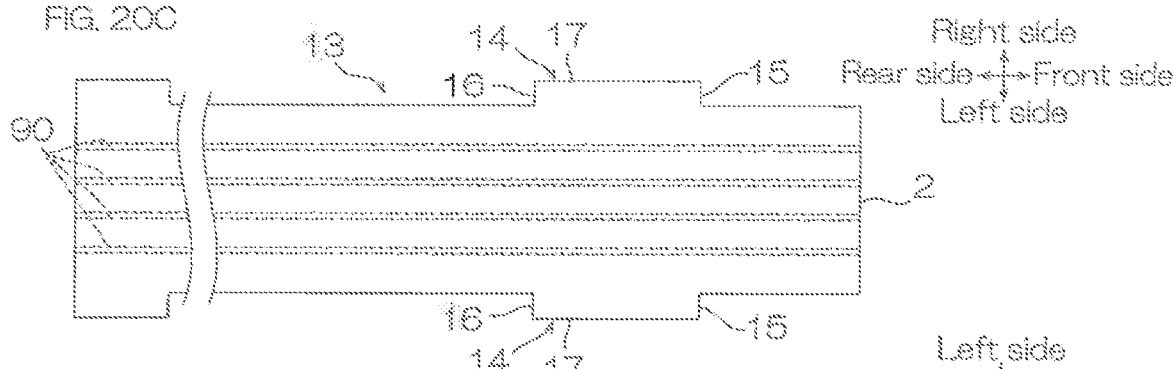
Figure 20D:
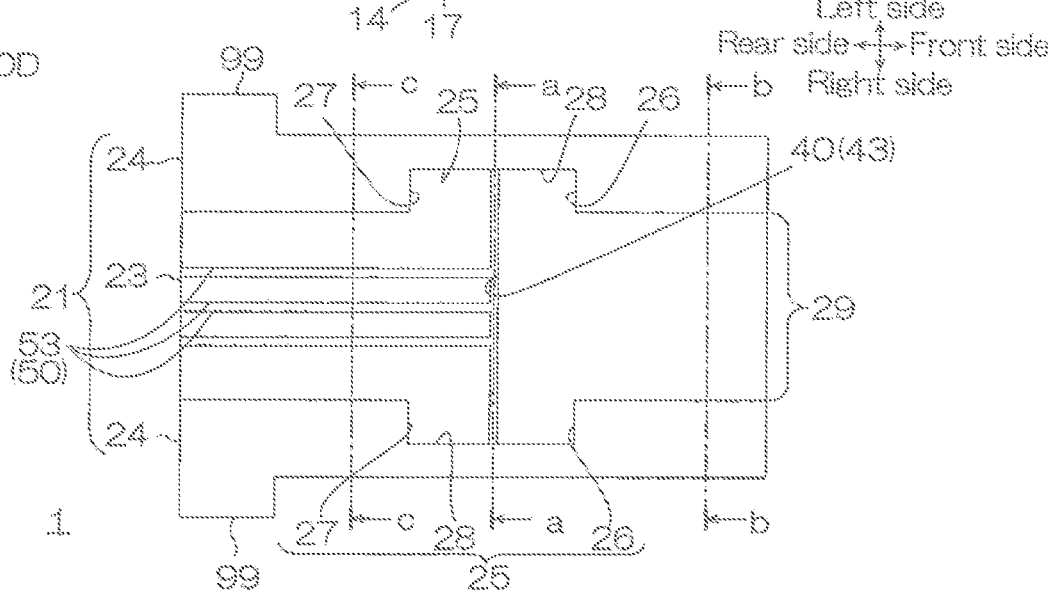
Figure 23A:
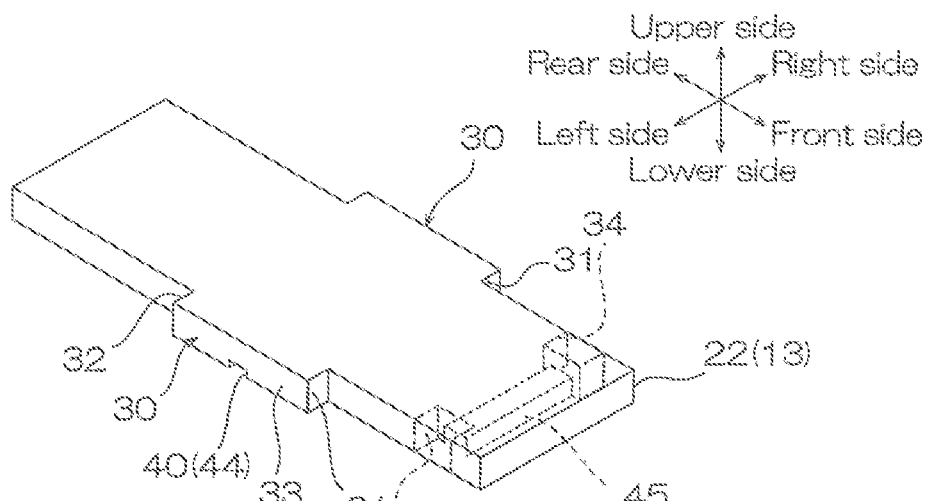
FIGS. 23A to 23C show perspective views of the opto-electric hybrid board connector kit shown in FIGS. 20A to 20D.
Figure 23B:
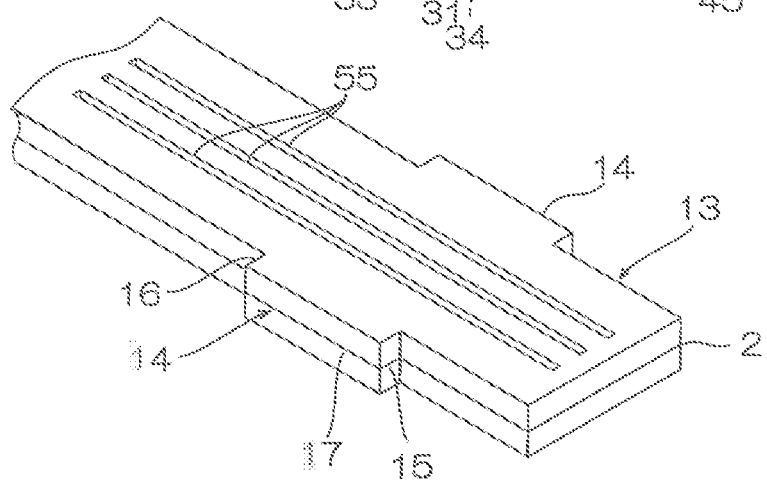
Figure 23C:
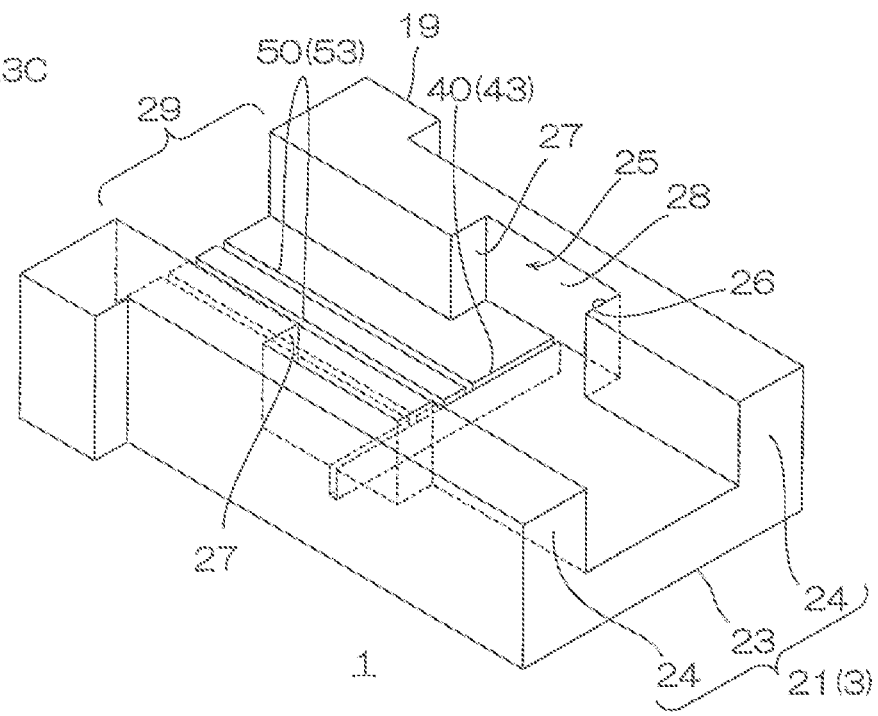

As shown by the phantom lines of FIGS. 20A, 23A, and 24, furthermore, the lid 22 can also include the two lid recessed portions 34 and the fifth horizontal groove 45.

When the opto-electric hybrid board 2 is accommodated in the accommodation space 29 and the lid 22 is provided in the main body 21, the fifth horizontal groove 45 is positioned so as to be overlapped with the front end portion of the vertical groove 55.

The two lid recessed portions 34 are continuous to both end portions in the right-left direction of the fifth horizontal groove 45.

In this case, in the first step, when the opto-electric hybrid board 2 is accommodated in the accommodation space 29 and the lid 22 is provided in the main body 21, the front end portion of the vertical groove 55 is communicated with the fifth horizontal groove 45. The fifth horizontal groove 45 is communicated with the outside via the lid recessed portion 34.

In the second step, the adhesive 19 goes through the front end portion of the vertical groove 55 to reach the fifth horizontal groove 45. That is, the adhesive 19 completely fills the front end portion of the vertical groove 55.

Subsequently, the adhesive 19 progresses (so as to branch off) toward both sides in the right-left direction of the fifth horizontal groove 45, and fills the inside of the lid recessed portion 34 to rise.

According to the structure, the contact area of the adhesive 19 with respect to the opto-electric hybrid board 2 and the connector 3 is increased, and the adhesive force of the opto-electric hybrid board 2 with respect to the connector 3 is improved.

Specific Example 2

Figure 22:
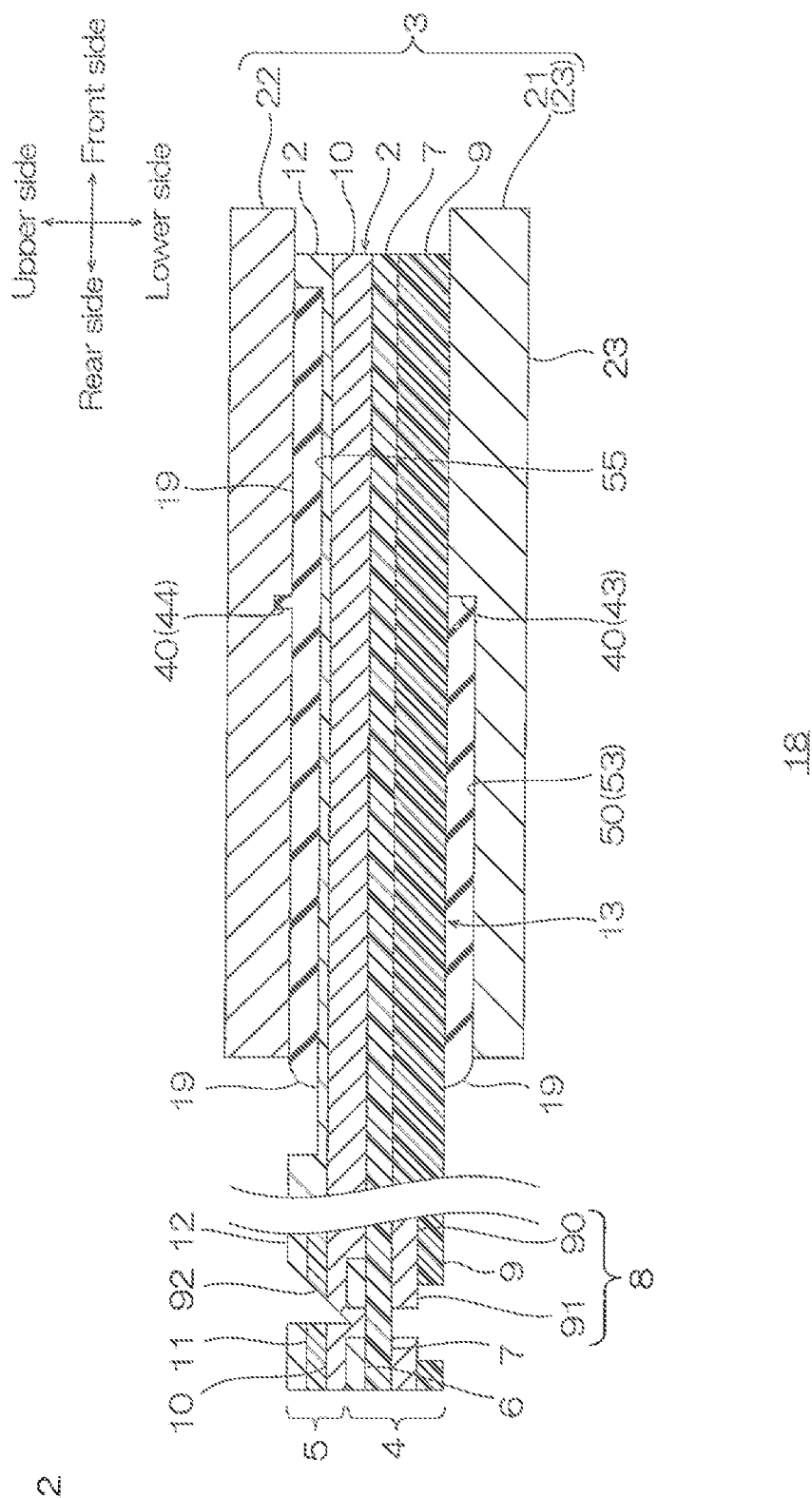
FIG. 22 shows a cross-sectional view along a d-d line of the opto-electric hybrid board connector produced from the opto-electric hybrid board connector kit shown in FIGS. 20A to 20D.

As shown in FIG. 22, in Specific Example 1, as one example of an optical waveguide member, the opto-electric hybrid board 2 is illustrated. For example, in Specific Example 2, as shown in FIG. 25, one example of the optical waveguide member includes the optical waveguide 5 without including the electric circuit board 4. Preferably, one example of the optical waveguide member consists of only the optical waveguide 5.

The optical waveguide 5 and the connector 3 that accommodates the optical waveguide 5 are provided in an optical waveguide connector 88. The optical waveguide connector 88 preferably consists of only the optical waveguide 5, the connector 3, and the adhesive 19.

Specific Example 3

As shown in FIGS. 26A to 28, the connector kit 1 includes the first horizontal groove 41, the first rear vertical groove 51, the third horizontal groove 43, and the third front vertical groove 63. The connector kit 1 includes the first side opening portion 77. Furthermore, the connector kit 1 includes the front horizontal groove 80 and the up-down groove 85. The lid 22 does not include a groove.

The first horizontal groove 41 and the first rear vertical groove 51 are provided on the upper surface of the opto-electric hybrid board 2. The lower surface of the opto-electric hybrid board 2 does not have a groove.

The third front vertical groove 63 and the third horizontal groove 43 are provided on the bottom surface of the bottom wall 23 of the main body 21.

The first side opening portion 77, the third front horizontal groove 83, and the up-down groove 85 are provided on the extending wall 24 of the main body 21.

As shown by the phantom line of FIG. 26D and the phantom line of FIG. 27B, a second side opening portion 78, in addition to the first side opening portion 77, can be provided on the extending wall 24.

The two second side opening portions 78 are provided in the central portions in the up-down direction of the two up-down grooves 85 so as to be exposed. The two second side opening portions 78 are overlapped when projected in the right-left direction.

In Specific Example 3, in the first step, when the opto-electric hybrid board 2 is accommodated in the accommodation space 29 and the lid 22 is provided in the main body 21, each of both end portions in the right-left direction of the first horizontal groove 41 is communicated with each of the two opening portions 70, and each of both end portions in the right-left direction of the third horizontal groove 43 is communicated with each of the two opening portions 70. The front end portion of the first rear vertical groove 51 is communicated with the first horizontal groove 41, The rear end portion of the third front vertical groove 63 is communicated with the third horizontal groove 43. The front end portion of the third front vertical groove 63 is communicated with the third front horizontal groove 83. The upper end portion of the third front horizontal groove 83 is communicated with the outside. The opening portion 70 is communicated with the outside via the two second side opening portions 78. The third front horizontal groove 83 is communicated with the outside via the up-down groove 85.

In the second step, when the adhesive 19 is injected into the right-side first side opening portion 77 that is positioned at a higher position, the adhesive 19 reaches each of the insides of the third horizontal groove 43 and the first horizontal groove 41 from each of the right end portions of the third horizontal groove 43 and the first horizontal groove 41, subsequently, fills and goes through each of the third horizontal groove 43 and the first horizontal groove 41, and thereafter, reaches the left-side first side opening portion 77 that is positioned at a lower position. At this time, the adhesive 19 is allowed to spill to the outside from the left-side first side opening portion 77.

Meanwhile, the adhesive 19 filling the third horizontal groove 43 progresses to fill the third front vertical groove 63 from the rear end portion of the third front vertical groove 63 forwardly, and reaches the front end portion of the third front vertical groove 63. However, the adhesive 19 does not contaminate the front end surface of the opto-electric hybrid board 2. The adhesive 19 reaches the third front horizontal groove 83 from the front end portion of the third front vertical groove 63 to progress toward both sides (so as to branch of) in the right-left direction of the third front horizontal groove 83, and reaches both end portions in the right-left direction of the third front horizontal groove 83. Subsequently, the adhesive 19 enters the lower end portion of the up-down groove 85 and rises at the inside of the up-down groove 85.

On the other hand, the adhesive 19 filling the first horizontal groove 41 reaches the front end portion of the first rear vertical groove 51, progresses to fill the first rear vertical groove 51 from the front end portion of the first rear vertical groove 51 rearwardly, and reaches the rear portion of the first rear vertical groove 51. Among all, in the rear end portion of the first rear vertical groove 51, the adhesive 19 is allowed to spill from the rear end surface of the main body 21.

According to the structure, the contact area of the adhesive 19 with respect to the opto-electric hybrid board 2 and the connector 3 is increased, and the adhesive three of the opto-electric hybrid board 2 with respect to the connector 3 is improved.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The opto-electric hybrid board connector kit is used in the production of the opto-electric hybrid board connector.

DESCRIPTION OF REFERENCE NUMERALS

1 Connector kit
2 Opto-electric hybrid board
3 Connector
4 Electric circuit board
22 Lid
21 Main body
23 Bottom wall
29 Accommodation space
40 Central horizontal groove
41 First horizontal groove
42 Second horizontal groove
43 Third horizontal groove
44 Fourth horizontal groove
50 Rear vertical groove
51 First rear vertical groove
52 Second rear vertical groove
53 Third rear vertical groove
54 Fourth rear vertical groove
60 Front vertical groove
61 First front vertical groove
62 Second front vertical groove
63 Third front vertical groove
64 Fourth front vertical groove
70 Opening portion
73 Third opening portion 76 Sixth opening portion
77 First side opening portion
78 Second side opening portion
88 Optical waveguide connector

The invention claimed is:

1. An optical waveguide member connector kit comprising:
   an optical waveguide member including an optical waveguide and
   a connector having an accommodation space that is capable of accommodating the optical waveguide member, wherein
   when the optical waveguide member is accommodated in the accommodation space, the connector has an opening portion reaching the optical waveguide member from the outside of the connector and
   when the optical waveguide member is accommodated in the accommodation space, at least one of the optical waveguide member and the connector includes a groove, transverse to the longitudinal direction of the waveguide member, communicating with the opening portion and facing at least the other side of the optical waveguide member and the connector.

2. The optical waveguide member connector kit according to claim 1, wherein
   the plurality of opening portions are provided so as to communicate with each other via the groove when the optical waveguide member is accommodated in the accommodation space.

3. The optical waveguide member connector kit according to claim 1, wherein
   the connector includes
   a main body having a wall, and
   a lid that sandwiches the optical waveguide member between the wall and the lid, when the optical waveguide member is accommodated in the accommodation space.

4. The optical waveguide member connector kit according to claim 1, wherein
   the optical waveguide member is an opto-electric hybrid board further including an electric circuit board.

5. A method for producing an optical waveguide member connector comprising:
   a first step of accommodating an optical waveguide member of the optical waveguide member connector kit according to claim 1 in the accommodation space and
   a second step of after the first step, adhering the optical waveguide member to a connector by injecting an adhesive having flowability into an opening portion and allowing the adhesive to enter a groove from the opening portion.

6. An optical waveguide member connector comprising:
   an optical waveguide member and
   a connector accommodating the optical waveguide member, wherein
   the connector has an opening portion reaching the optical waveguide member from the outside of the connector,
   at least one of the optical waveguide member and the connector includes a groove, transverse to the longitudinal direction of the waveguide member, communicating with the opening portion and facing at least the other side of the optical waveguide member and the connector, and
   an adhesive fills the opening portion and the groove.

* * * * *